US010756916B2

(12) United States Patent
Kane

(10) Patent No.: US 10,756,916 B2
(45) Date of Patent: Aug. 25, 2020

(54) DISTRIBUTED PROCESSING NETWORK SYSTEM, INTEGRATED RESPONSE SYSTEMS AND METHODS PROVIDING SITUATIONAL AWARENESS INFORMATION FOR EMERGENCY RESPONSE

(71) Applicant: Intrepid Networks, LLC, Clermont, FL (US)

(72) Inventor: Brittin Kane, Clermont, FL (US)

(73) Assignee: Intrepid Networks, LLC, Orlando, FL (US)

( * ) Notice: Subject to any disclaimer, the term of this patent is extended or adjusted under 35 U.S.C. 154(b) by 192 days.

(21) Appl. No.: 14/739,342

(22) Filed: Jun. 15, 2015

(65) Prior Publication Data

US 2015/0365246 A1  Dec. 17, 2015

Related U.S. Application Data

(60) Provisional application No. 62/013,235, filed on Jun. 17, 2014.

(51) Int. Cl.
| | |
|---|---|
| *H04L 12/58* | (2006.01) |
| *H04W 4/90* | (2018.01) |
| *H04L 12/18* | (2006.01) |
| *H04W 4/08* | (2009.01) |
| *H04W 4/021* | (2018.01) |
| *H04L 29/06* | (2006.01) |

(52) U.S. Cl.
CPC ........ *H04L 12/1895* (2013.01); *H04L 51/046* (2013.01); *H04W 4/021* (2013.01); *H04W 4/08* (2013.01); *H04W 4/90* (2018.02); *H04L 51/20* (2013.01); *H04L 65/403* (2013.01)

(58) Field of Classification Search
None
See application file for complete search history.

(56) References Cited

U.S. PATENT DOCUMENTS

| | | |
|---|---|---|
| 2002/0177428 A1 | 11/2002 | Mendard |
| 2002/0194351 A1 | 12/2002 | Nishimura |
| 2004/0100868 A1 | 5/2004 | Patterson, Jr. |
| 2004/0165789 A1 | 8/2004 | Li |
| 2004/0192329 A1 | 9/2004 | Barbosa |
| 2005/0057359 A1 | 3/2005 | Coffey |

(Continued)

*Primary Examiner* — Joshua Joo
(74) *Attorney, Agent, or Firm* — Accel IP Law; Ferdinand M. Romano

(57) ABSTRACT

A distributed processing network system (10), an integrated response system (50) comprising multiple distributed processing network systems and related methods providing situational awareness information for emergency responses. In one embodiment there is disclosed a response system (50) comprising first and second server based systems (10, 11) each providing real time awareness of personnel (18, 19) for different organizations, the first system receiving information for a first organization and the second system receiving information for a second organization, the first system coupled to the second system to communicate information generated in the first system to personnel in the second organization via the second system to facilitate timely and appropriate response by personnel in the second organization to an emergency situation in the first organization.

12 Claims, 35 Drawing Sheets

(56) References Cited

U.S. PATENT DOCUMENTS

| | | | |
|---|---|---|---|
| 2006/0068752 A1 | 3/2006 | Lin | |
| 2007/0173224 A1* | 7/2007 | Buckley | H04L 51/14 |
| | | | 455/404.1 |
| 2007/0201627 A1* | 8/2007 | Lin | H04M 3/4872 |
| | | | 379/67.1 |
| 2007/0255147 A1 | 11/2007 | Drew | |
| 2008/0155529 A1 | 6/2008 | Kang | |
| 2008/0168152 A1 | 7/2008 | Weizman | |
| 2009/0222896 A1 | 9/2009 | Ichikawa | |
| 2010/0064054 A1 | 3/2010 | Karlsson | |
| 2011/0046920 A1* | 2/2011 | Amis | G01S 19/16 |
| | | | 702/181 |
| 2011/0169633 A1 | 7/2011 | Lauder | |
| 2012/0087212 A1 | 4/2012 | Vartanian | |
| 2012/0154141 A1 | 6/2012 | Piccolo | |
| 2012/0203836 A1 | 8/2012 | Nishimura | |
| 2012/0208493 A1* | 8/2012 | Park | H04W 4/90 |
| | | | 455/404.2 |
| 2012/0275766 A1 | 11/2012 | Woodward | |
| 2013/0084896 A1* | 4/2013 | Barkie | H04W 12/02 |
| | | | 455/466 |
| 2013/0202120 A1* | 8/2013 | Bickel | G08B 13/1672 |
| | | | 381/56 |
| 2013/0246511 A1* | 9/2013 | Brown | H04L 67/28 |
| | | | 709/203 |
| 2014/0059594 A1* | 2/2014 | Stein | H04N 21/6405 |
| | | | 725/33 |
| 2014/0120863 A1* | 5/2014 | Ferguson | H04M 1/72541 |
| | | | 455/404.2 |
| 2014/0132393 A1* | 5/2014 | Evans | G08B 21/02 |
| | | | 340/6.11 |
| 2014/0143801 A1* | 5/2014 | Russell | H04N 21/25883 |
| | | | 725/33 |
| 2014/0203908 A1* | 7/2014 | Miasnik | G08B 5/222 |
| | | | 340/7.61 |
| 2014/0285341 A1* | 9/2014 | Gitau | G08B 25/005 |
| | | | 340/540 |
| 2014/0364081 A1* | 12/2014 | Rauner | H04L 12/1895 |
| | | | 455/404.2 |
| 2015/0199896 A1* | 7/2015 | Estes | G08B 27/001 |
| | | | 340/541 |
| 2015/0249904 A1* | 9/2015 | Weiss | H04W 4/023 |
| | | | 455/456.1 |
| 2015/0359013 A1* | 12/2015 | Krizik | H04W 76/007 |
| | | | 370/341 |
| 2016/0110991 A1* | 4/2016 | Hunter | G09F 27/00 |
| | | | 340/539.13 |
| 2017/0105108 A1* | 4/2017 | South | H04W 4/021 |

* cited by examiner

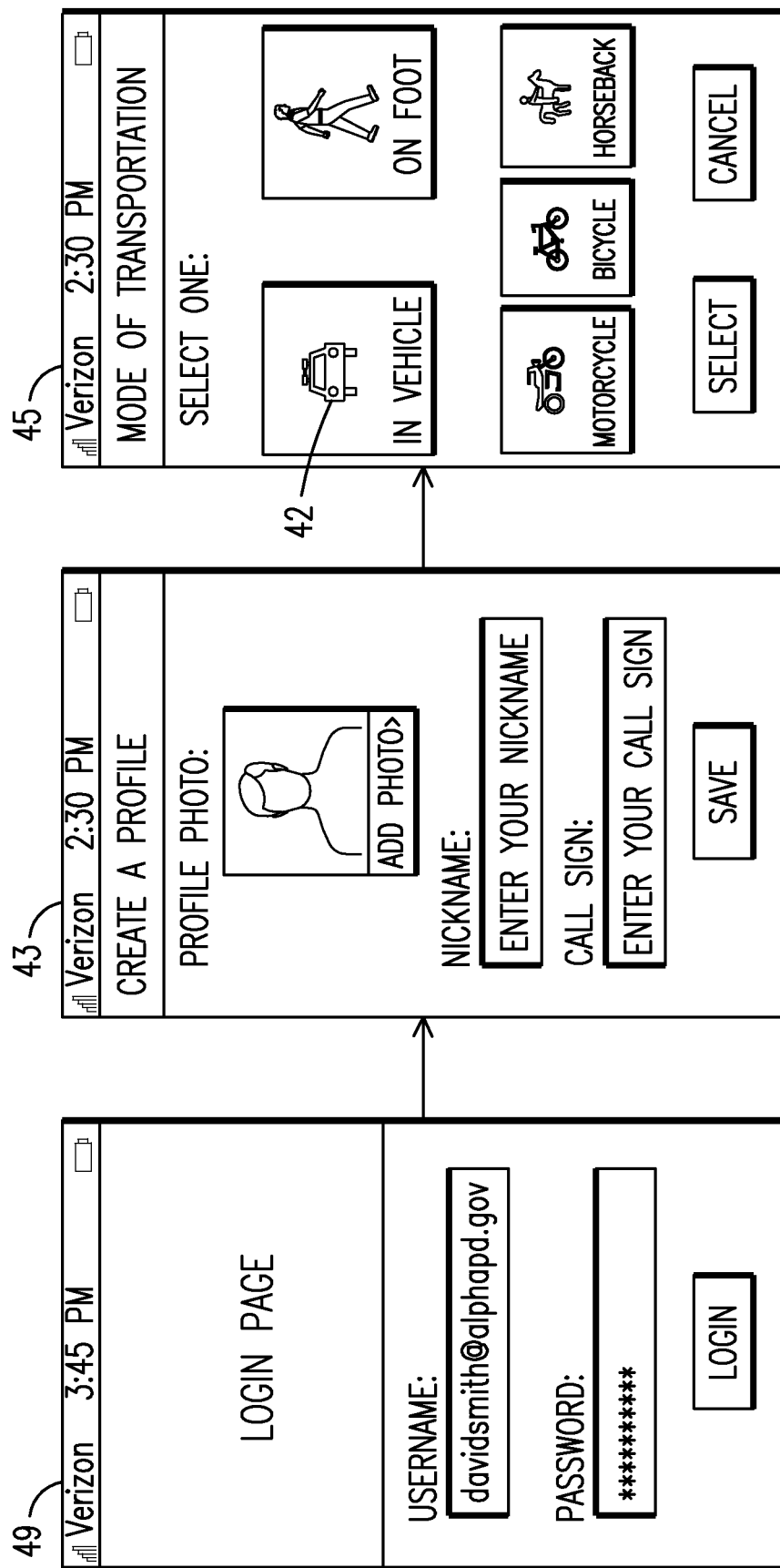

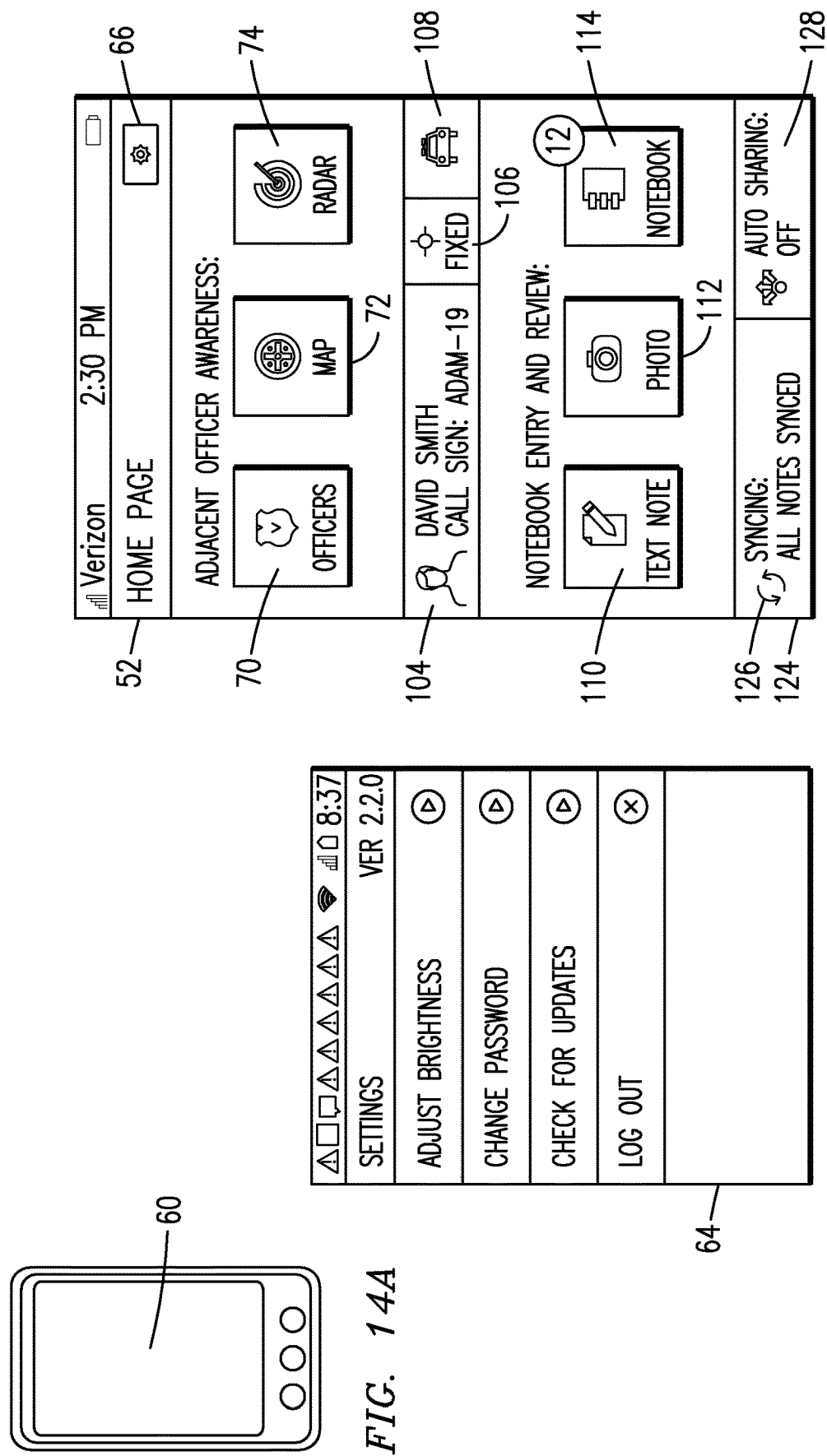

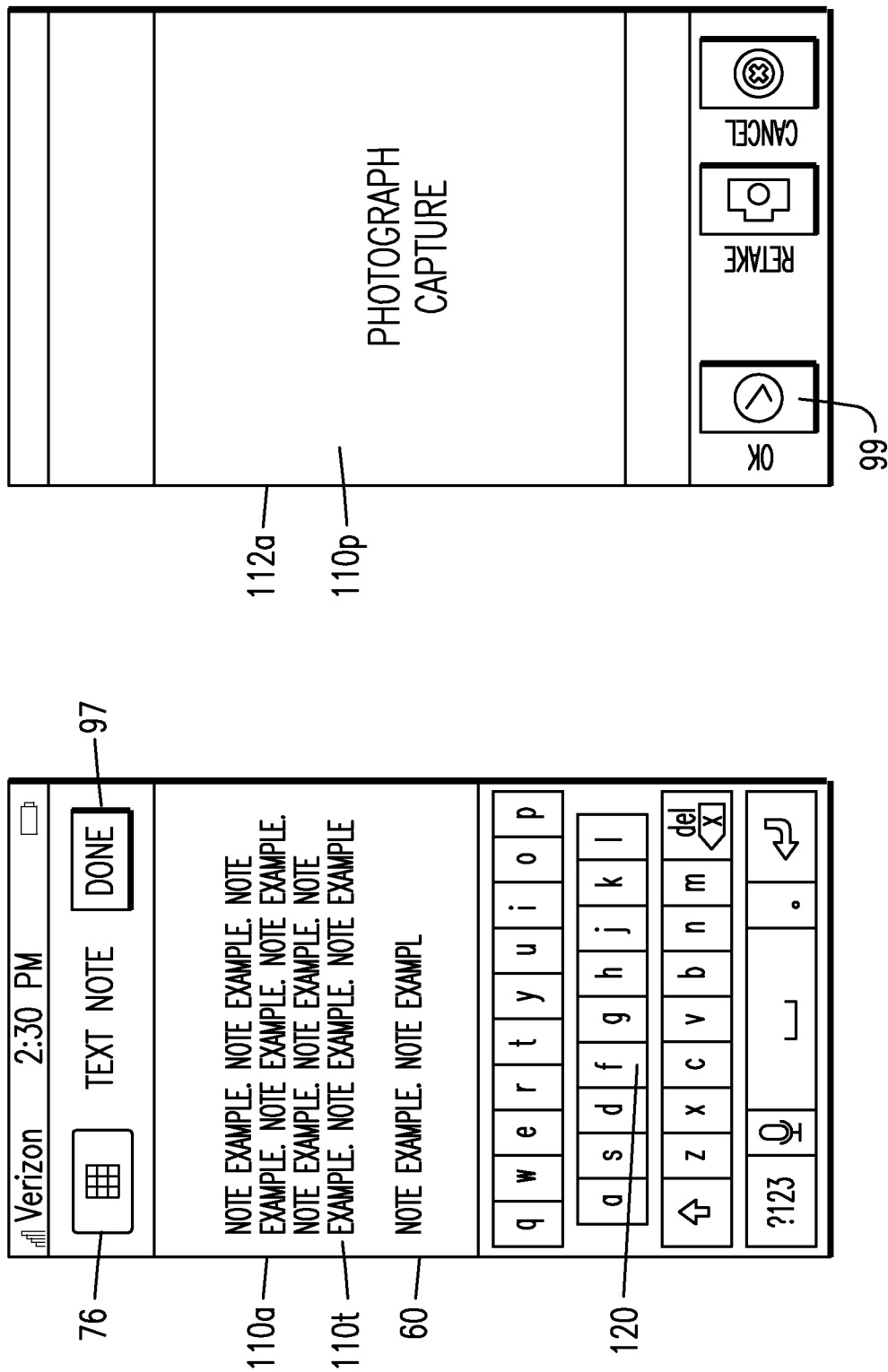

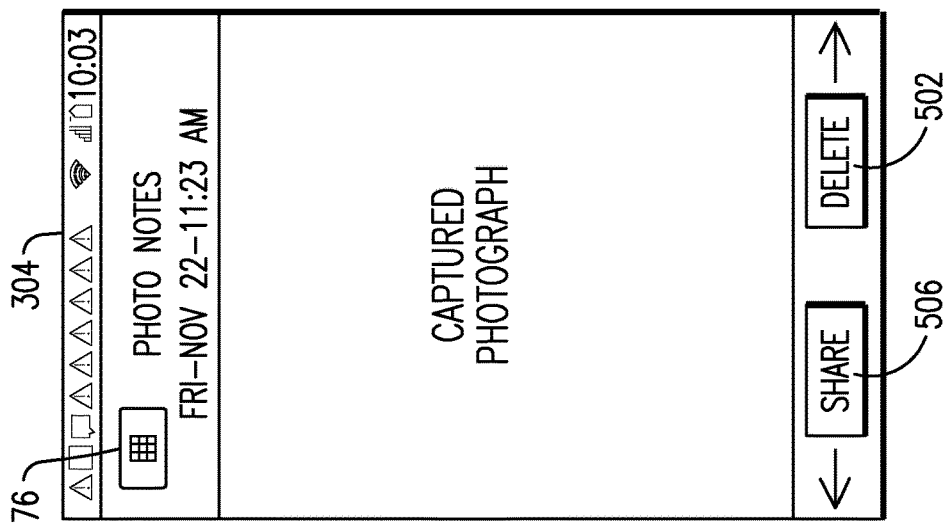
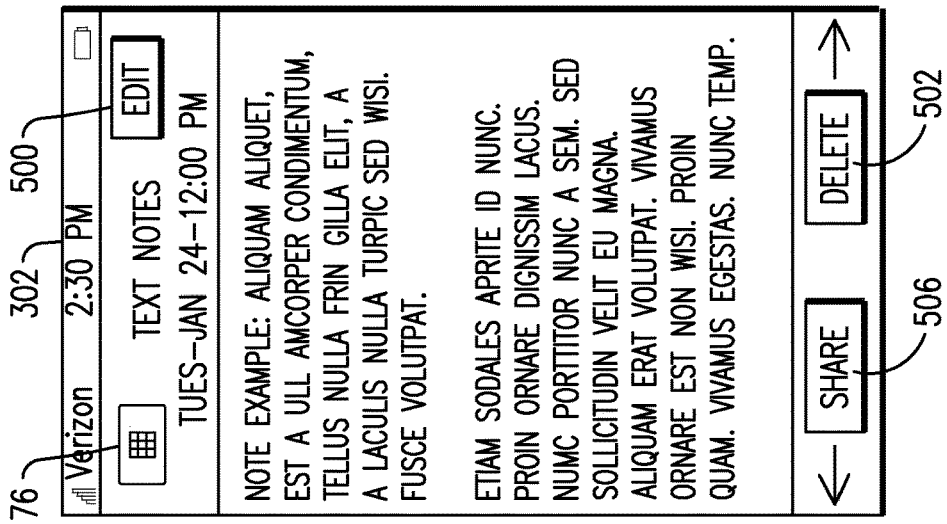
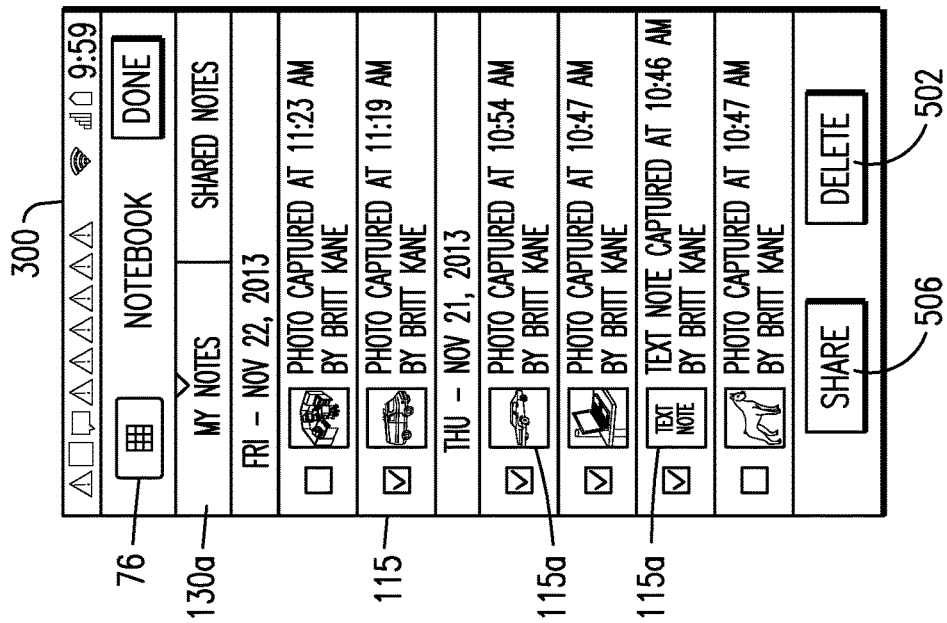
FIG. 18C
FIG. 18B
FIG. 18A

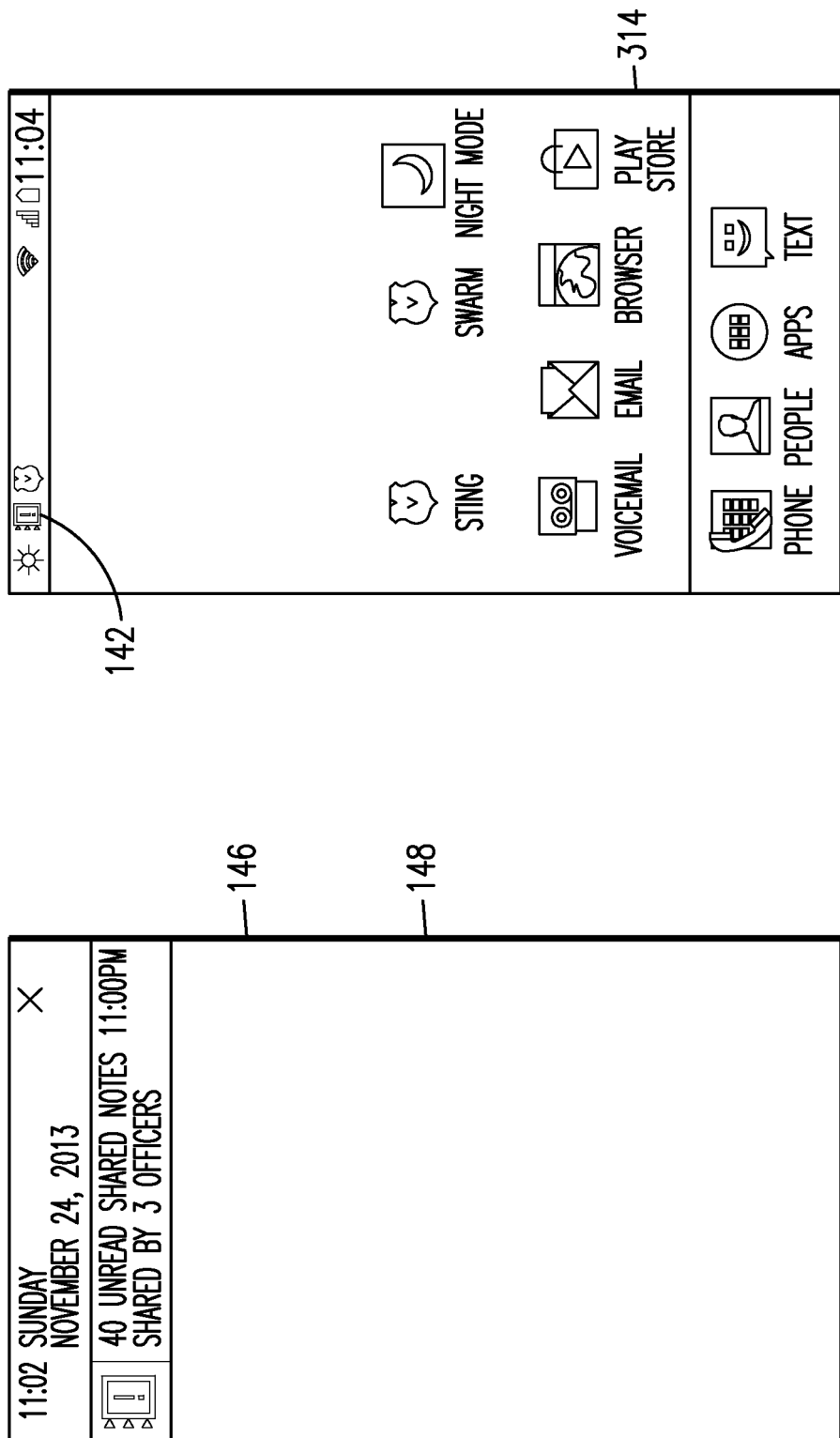

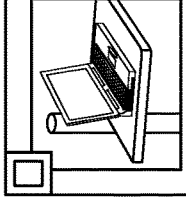

FIG. 20C

SEPTEMBER 9, 2012 AT 3: 08 PM
SAMPLE: SUSPICIOUS PACKAGE
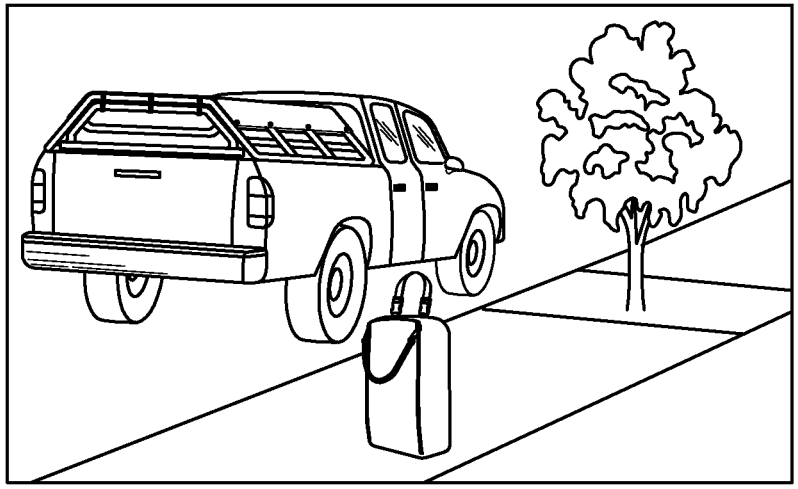
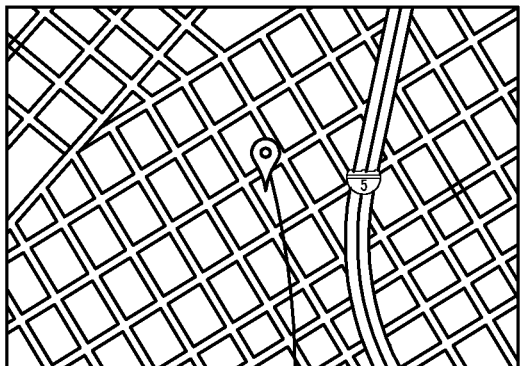
FILE INFO:
CAPTURE DATE: SUN-SEP 9, 2012
CAPTURE TIME: 3:08 PM
UPLOADED: SEP 9, 2012 AT 3:08 PM
DEVICE ID: 99000118970350
OFFICER INFO:
OFFICER: BRIT KANE
BADGE: 1010
LOCATION INFO:
LAT/LNG: 47.610945,-122.333937
ACCURACY: SEP 9, 2012 AT 3:08 PM
LATENCY: 0s
POSITION INFO:
AZIMUTH: 244.328125 DEGREES
PITCH: -20.703125 DEGREES
ROLL: -4.234375 DEGREES
*FIG. 21*

202

| SHARING 3 NOTES | ✕ |

SELECT PERSONNEL TO SHARE WITH:     0/10 SELECTED

| EVERYBODY (ACTIVE AND INACTIVE) | SUPERVISORS | |
| EVERYBODY (ACTIVE ONLY) | ☐ BOBBY BAKER | INACTIVE |
| ACTIVE SUPERVISORS ONLY | ☐ SUMMER BOURNE | INACTIVE |
| | ☐ ERICA HERNANDEZ | INACTIVE |
| ☐ SHARE WITH AN ALERT | ☐ BRITT KANE | INACTIVE |
| | ☑ JEFF MCDOWELL | INACTIVE |
| | ☑ EDUARDO MCKLINTOCK | INACTIVE |
| | NON-SUPERVISORS | |
| | ☑ JOSEPHINE ROBERTSON | INACTIVE |
| | ☐ JIM SCHMORDE | INACTIVE |
| | ☐ JASON STONEBRAKER | INACTIVE |

204

[ SHARE ]  [ CANCEL ]

*FIG. 22*

DISTRIBUTED PROCESSING NETWORK SYSTEM, INTEGRATED RESPONSE SYSTEMS AND METHODS PROVIDING SITUATIONAL AWARENESS INFORMATION FOR EMERGENCY RESPONSE

RELATED APPLICATIONS

This application claim priority to U.S. Provisional Application No. 62/013,235 filed Jun. 17, 2014. This application is related to and incorporates herein by reference: U.S. National Stage application Ser. No. 14/648,076 filed on May 28, 2015 and U.S. Continuation application Ser. Nos. 14/727,174; 14/727,247 and 14/727,305 filed Jun. 1, 2015 and U.S. Continuation application Ser. Nos. 14/730,310 and 14/730,352 filed Jun. 4, 2015 which claim priority to International Patent Application Serial No. PCT/US113/77260 filed Nov. 27, 2015. This application is also related to International Patent Application Serial No. PCT/US14/33837 filed Apr. 11, 2014.

FIELD OF THE INVENTION

The invention relates to organizations and, more particularly, to situational awareness, command and control, coordination of information among personnel, acquiring and preserving integrity of information and improving the safety and efficiency of an organization's operations. Features of the invention are especially applicable to: improving the safety and efficiency of an organization during an emergency to which public or private personnel respond; and facilitating communication between separate operations to enhance responsiveness within individual organizations, and flexibility and cooperation among different organizations in public, military and private sectors.

BACKGROUND OF THE INVENTION

Law enforcement operations and organizations which support other first responders typically have fixed assets which operate independently from assets of other organizations. Although assets in each organization may generate information vital to successful operations, it is desirable to provide even more information to enhance performance and efficiency or improve public safety. Systems according to the invention not only generate more useful information, but also make that information more broadly available across organizations in an optimal manner with the goal of providing greater utility to responders. Numerous operations would benefit from an ability to generate and share situational information by making that information immediately available to members in different organizations who can use the information to more effectively perform their line or supervisory duties. In many instances, personnel are at risk for encountering unanticipated dangers which have been difficult to monitor. It is desirable to provide improved techniques for more comprehensive monitoring, more timely generation of alerts to first responders and improved command and control in these circumstances.

Many patrol officers spend a large percent of duty time in association with an assigned patrol vehicle. Typically, the patrol vehicle serves as a mobile center for enhanced communication, information acquisition, generation of GPS information and video monitoring. However, when an officer steps out of a patrol vehicle far fewer resources are at hand, and many private security personnel have more limited resources. Some security personnel never have access to a vehicle, and may have little more to communicate with than a service radio or a personal hand-held device.

Educational organizations are typically spread over multiple locations. Even facilities on a single campus may place a large set of school faculty (e.g. teachers, professors, principals, deans, and administrative assistants) across over multiple buildings into which hundreds or thousands of students move throughout a day. Support personnel could be responsible for responding to emergencies (e.g., relating to medical, security and facilities problems). Although some of the organization assets could generate information vital for day to day operations (e.g., location of school faculty for impromptu meetings), having even more useful information is desirable to enhance performance or improve safety in an emergency response. Systems according to the invention not only generate information of great utility for emergency responses, but also make that information broadly and rapidly available for optimal use by members of the operation. Responding personnel would benefit from a system which generates and transmits to them timely situational information and makes the information immediately available to all members of the operation who can potentially use the information to more effectively perform their duties. In many instances, these responding personnel (e.g., public and private security personnel and first responders) are at risk as they encounter unanticipated dangers which cannot be easily monitored. Thus it is desirable to provide improved techniques for more comprehensive monitoring both within and across organizations to timely generate precautionary information (e.g., alerts and situational awareness information).

With increasing violence in schools, educational institutions deserve improved emergency response times. Schools are often soft targets for terrorists, extremists and others to maximize devastation among the innocent. In the United States a series of attacks on school campuses has raised awareness of the need for improved security and responsiveness to protect the lives of students and faculty. The reality is that a large number of casualties can occur quickly and before responding organizations arrive, thereby maximizing psychological damage across an entire community.

It is recognized that there are no simple solutions to prevent these horrific events. Proposals such as placing full time private security or police on site are not cost effective and have not been shown to be complete solutions when implemented. The effectiveness of large scale, protective infrastructure, such as fences has also been questioned. Nor does it seem feasible to place a camera or other similar security devices in every classroom or location of concern. Without fully comprehensive monitoring, there are weak spots in the security solution. Generally, these solutions require expensive investments which have to be both operated and maintained under constraints of limited public funding.

In the past, most security personnel embedded within schools have only had voice communications through private Push to Talk (PTT) radios (also known as LMR: Land Mobile Radios) to communicate emergency information and elicit responses. An associated central dispatch office may have some network based infrastructure security solutions at its disposal, but the direct communications with security personnel in the field has typically been limited to voice communications. This severely constrains the type and volume of information which can be communicated between one responder and a dispatch office and constrains dissemination of optimal information between field personnel. Moreover, in many instances, timely critical communication with those in emergency situations has not been possible.

For example, real time communication with school faculty or students requiring urgent medical attention has generally not been possible; and there have been limited means to acquire informative responses from those most in need. Regarding responding organizations other than security or campus police, many individuals in responding organizations do not even have PTT radios and are not equipped to receive information from a network when an urgency arises. Rather, they are usually contacted from a call list, via a landline or a cell phone. As a result they may have such insufficient knowledge about the situation that their arrival and ability to assist can be suboptimal. However, a technology common among many individuals in each of these groups is that the majority of persons are likely to possess smart phones, either privately owned or provided as employer-owned assets.

SUMMARY OF THE INVENTION

Features of the invention are not simply premised on recognition that, by improving response times to emergency events, more lives can be saved or property damage can be minimized. It is well known that by responding even a few seconds sooner than existing operations have been capable of, innocent lives can be saved, especially in gunfire situations. Yet, many educational institutions simply cannot afford expensive solutions such as full time security departments. Further, responsiveness to save lives may not measurably improve by simply increasing the number of responders.

The invention relates to organizations and, more particularly, to situational awareness, coordination of information among personnel, acquiring and preserving integrity of information and improving the safety and efficiency of an organization during an emergency to which public or private personnel respond. The personnel may be internal to an organization, e.g., employees of a school system or on site security personnel or may be external to the organization, e.g., law enforcement or fire department personnel. A feature of the invention is an ability to integrate, or enable communication between, separate operations to enhance responsiveness within individual organizations and to enhance both flexibility and cooperative responsiveness among different organizations. These organizations may comprise government assets (e.g., a city hall, courts, and public education), critical infrastructure (e.g., oil refineries, power plants, transportation facilities and water treatment centers) and medical resources (e.g. hospitals, triage posts, or national disease centers). Commercial organizations (e.g. banks, large retailers, and stock exchanges) may also benefit from use of such a system. Features of the invention are especially applicable to organizations and operations whose security relies upon a responding Public Safety operation. Both in this context and more generally, the invention facilitates cooperation among discrete organizational operations including any combination of organizations in the public, military and private sectors. Public and private education facilities and campuses are exemplary of organizations which rely on the support of other organizations during crises. Although the invention is described in the context of an informed response to an emergency, embodiments of the system may generally promote organizational efficiency through coordination of personnel and timely sharing of information in routine operations and job functions.

Responsive to a need to provide and share more useful information in a timely manner, a systems according to the invention employ an integrated architecture of networked equipment and distributed software operations with which persons in an organization can obtain timely situational information. In one embodiment, the information is displayed as text and graphic presentations, including use of icons and a variety of map views, which keep members of a group informed about, for example, the status of variable tactical dispositions of other members of the organization.

The systems also enable acquisition and display of proximity and directional awareness (e.g., locations within a building or a stadium, or distances and directions relative to other personnel) and provide rapid awareness of critical events such as the occurrence of a threat in a classroom. Embodiments of the system make use of sensors to rapidly detect and alert members of the organization about temporal conditions or occurrence of life threatening incidents. This can enable the most rapid initiation of informed responses possible across relevant organizations. Another feature of the system is a distributed arrangement for secure collection and retention of information generated by members of an organization or members of the public (e.g., school faculty, students, security personnel, law enforcement officers and first responders), including time stamped notes and captured multimedia data. This and other information can be disseminated to members in multiple organizations immediately, can be stored for later generation of reports, and can be transferred to secure databases for preservation of legal evidence.

The invention provides a set of low cost solutions that are easy to maintain, enabling more public and private entities to acquire more effective resources, bringing an ability to better deter adverse occurrences. With solutions that are effective without overburdening limited budgets all educational institutions and many other private and public organizations may realize the benefits. Further, for those institutions already having made substantial investments to provide other solutions which enhance safety or reduce emergency response times, the invention can augment these solutions. Even in the private sector, such low cost solutions are needed to provide more comprehensive security and to prevent pass through of costs, resulting inflationary occurrences which impact competitiveness. It can be generally unacceptable to a society if lifesaving solutions are only available to segments of industry and society which can afford the high costs. Therefore solutions which can be made generally available by low entry costs to improve response times (e.g., by improved alert systems and increased situational awareness) are extremely useful to all facets of society.

With the proliferation of smart phones, an embodiment of the invention provides employees of an organization and other individuals an infrastructure to create and share situational awareness information. Availability of information, which includes location, environmental data and multiple individual reports about an emergency situation, can result in rapid communication to, for example, first responders, within a very low cost deployment model. In one example embodiment, school employees can create and arm a wireless alarm. The alarm may be manually or automatically triggered upon occurrence of an event to generate notifications of emergency situations and send the notifications to target recipients. By providing mobile applications that run on personal phones of school faculty and/or students it becomes possible to provide a large number of persons with the means for generating notifications from or near the site of an emergency and effectively communicate information on events in a timely manner. By sending the data to a central dispatch office or control room within a school facility and/or to local law enforcement or other public safety personnel in external responding organizations, improved response times and higher quality responses can be achieved based on greater situational awareness.

Responsive to a need to provide and share more useful information in a more timely and informed manner, there is also provided a novel, integrated architecture of networked equipment and software systems in which responding personnel can obtain real time information about emergency conditions. The information includes precise details of an event (e.g., location, visual/audio reports, sensor information such as temperature) and information as to which persons are in peril. This information can also be relayed to non-responding personnel (e.g. school faculty, students, or groups not essential for response) to create a better informed organization on alert for danger.

Accordingly, in one embodiment, the information is displayed as text and graphic presentations, including use of icons and a variety of map views, which keep members of the entire organization (e.g., a law enforcement organization) informed about, for example, variable location dispositions of the individuals having initiated each alarm as well as the locations of other members in a group. The system also enables acquisition and display of proximity and directional information (e.g., providing awareness of distances and directions relative to all other users). Security personnel and first responders are also provided with rapid awareness of, and time critical updates on, emergency events such as fires, medical conditions, explosions, active shooter status and other critical emergency information.

Generally, systems according to the invention may make use of embedded phone sensors (e.g., for temperature, altitude, and audio) and data from external sources (e.g., emergency weather reports) to automatically initiate an alert, or augment a manual alert, sent to members of one or more responding groups about life threatening incidents occurring in the presence of one or more persons. Use of acoustic and vibration sensors to detect an occurrence of gunfire is exemplary. Combining a sensing capability with data communications enables alerted personnel and first responders to quickly initiate the most appropriate and informed responses possible.

Another feature of the system is a distributed arrangement for secure collection and retention of information from all users about an emergency, including time stamped notes and captured multimedia data. This and other information can be disseminated to other members of the group immediately for real time response conditions to manage these critical incidents. The information can be later used for general accountability of the incident. This includes generating reports from the responding organizations, and performing after-action reviews for improving responses and investigations of criminal activity. All data and information is transferred and stored in secure databases for preservation of evidence.

In one embodiment the system administration is server based with the system comprising a series of smart phones and computers each linked to a set of services software running on a server and a database stored within the server. A first series of system application functions are most optimally performed locally, i.e., running on the smart phones, and a second series of application functions are most optimally performed on web based applications utilizing any browser enabled device. A central processor within the server processes service requests from the smart phone utilizing the services software and host web based applications. The general architecture of the system enables a heretofore unknown level of enhanced information awareness, including real time reporting of situational status through several awareness resources. With respect to real time reporting, by "real time, it is meant that information is delivered to members of the organization, e.g., via displays on the smart phones or computers, in a relatively rapid manner that enables timely and, preferably, optimal use of information to provide a most expedient response to an urgent situation. The term "situational awareness" refers to an awareness of a temporal condition in a variety of contexts, including health, safety, security and the general conditions of assets or operating functions, including the condition of equipment, the availability of resources and information concerning incidents such as fires, explosions and roadway traffic problems.

BRIEF DESCRIPTION OF THE DRAWINGS

These and other features, of the invention will become better understood when the following detailed description is read with reference to the accompanying drawings in which like characters represent like parts throughout, wherein:

FIGS. 13A, 13B and 13C illustrate completion of a first time user profile on a SWARM Mobile application.

FIGS. 14A, 14B and 14C illustrate screens of the SWARM Mobile application.

FIGS. 16A and 16B illustrate text note creation and photo note creation options for the SWARM Mobile Application.

FIGS. 16C and 16D illustrate the my notes and shared notes tabs in the SWARM Mobile Application.

FIGS. 18A, 18B and 18C illustrate screen views for features relating to viewing notes, sharing notes and deleting notes with the SWARM Mobile application.

FIGS. 18G, 18H, 18I and 18J illustrate the home screen of the SWARM Mobile application, viewing shared notes from a pull down screen and options.

FIGS. 20A, 20B, 20C and 20D illustrate the screens and functionality of a SWARM Information Manager application.

FIG. 21 illustrates a sample report output from the SWARM Information Manager application.

FIG. 22 illustrates the Share Notes page within the SWARM Information Manager application.

DETAILED DESCRIPTION OF THE INVENTION

Figure 1A:
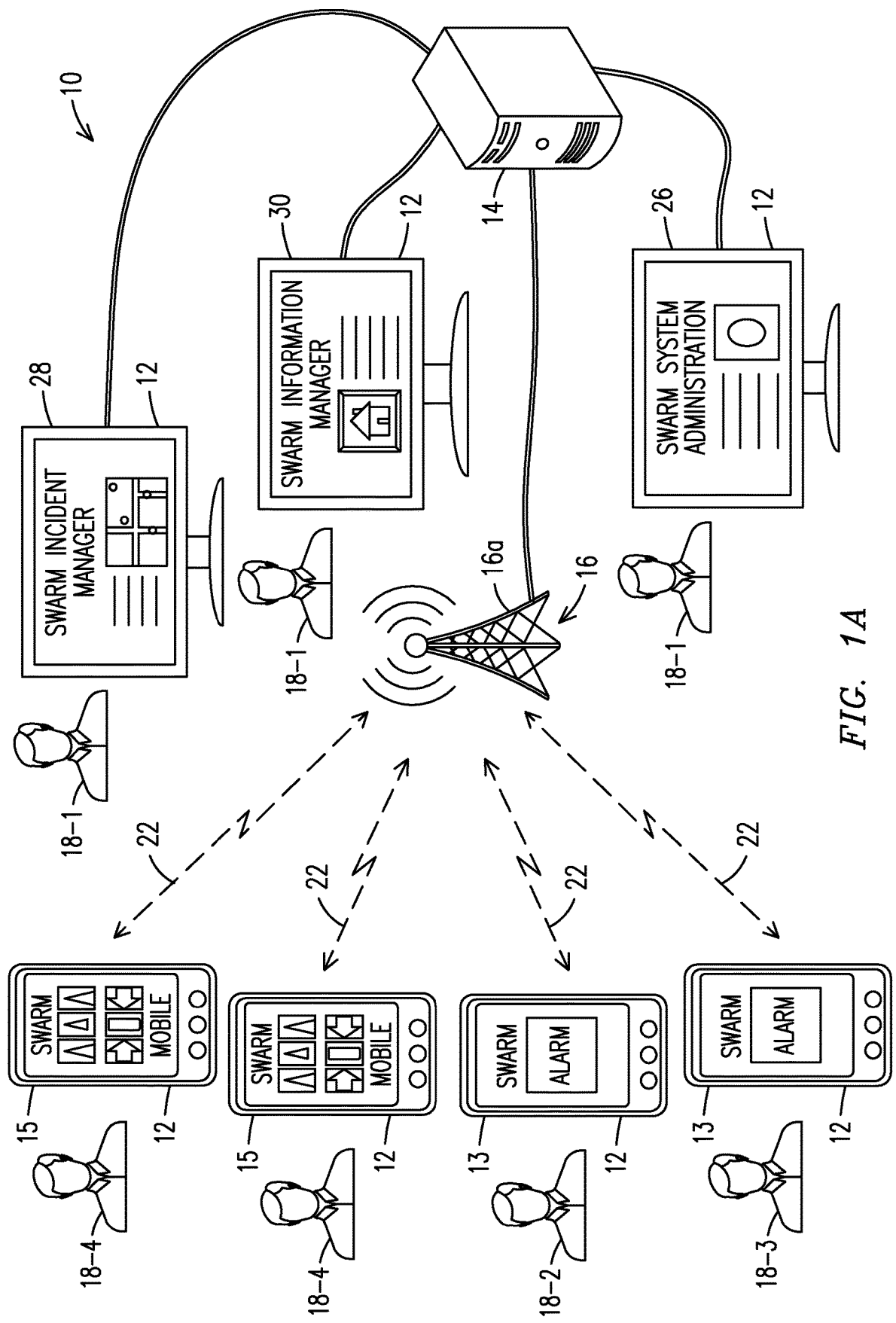
FIG. 1A illustrates a distributed processing network system according to an embodiment of the invention, referred to as the SWARM system, having both static and mobile client devices connected to a server.

According to an embodiment of the invention, a situational awareness system 10, referred to herein as the SWARM system 10, shown in FIG. 1A, is a derivative of the situational awareness system described in the '260 patent, embodiments of which are referred to herein as the STING system 11. Like the STING system 11, the SWARM system 10 is based on a distributed software architecture comprising an administrative function, an information management function and an incident management function which are all server based applications and displayed on internet browser capable devices connected to the server. Exemplary applications as shown in FIG. 1A are SWARM Administration Manager 26, SWARM Incident Manager 28 and SWARM Information Manager 30. The term server as used herein with reference to all situational awareness systems means a computer system having a computer processor, volatile memory and storage for a database and executable instructions which run on the processor.

The SWARM system 10 also comprises multiple applications which may run exclusively on clients logged into the server to provide distributed processing on a local level. This enhances performance for mobile users in particular. Exemplary client-based applications discussed herein are the SWARM Alarm application 13 and the SWARM Mobile application 15.

The STING system 11 is used in a variety of contexts, including law enforcement and public safety operations. The SWARM system 10 may range in level of functionality up to that of the STING system, and its functionality can vary depending on the size and nature of the organization the SWARM system supports. For example, the SWARM system may include all of the functionality of a STING system when deployed in a large college campus or corporate setting, but for purposes of describing features according to the present invention, embodiments of the SWARM system having less functionality are described. The disclosed embodiments of the SWARM system may provide a stand-alone service or permit use of information originating in the SWARM system to be utilized within a STING system 11. This facilitates receiving support from a public safety operation (e.g., a law enforcement or fire and rescue operation utilizing a situational awareness distributed network system.

Although the SWARM system is described in the context of a school system, the concepts are not so limiting. The SWARM system may be utilized in any organization requiring a subset of members to provide various situational awareness data for the purpose of responding to a condition or monitoring a subset of the organization for a variety of purposes, e.g. security, operational efficiency, or documentation of personnel.

The illustrated SWARM system 10 comprises a distributed software architecture and a group of static and mobile clients 12. The software includes both native user applications for smart phones and tablet computers, and web based applications for laptop, desktop and tablet computers, as well as smart phones and other terminals. Illustrative of the SWARM system method and software architecture, a SWARM alarm software application 13 is installed to run on each client 12 while the core functionality of the SWARM system 10 provides shared information and situational awareness to users logged into the system server 14. This enables rapid collection, sharing and analysis of information obtained from locations about which the smart phones are positioned. A key feature of the collection, sharing and analysis is the ability for school faculty and students to be able to immediately notify responding organizations of impending or existing danger.

The client devices 12 include hand-held devices (e.g. smart phones, tablets and tactical radios), also referred to as mobile clients, and notebook, laptop and desktop computers in Internet Protocol (IP) network architecture. Each client 12 is linked to a server 14 in a network 16 comprising an rf communications tower 16a and wireless data links 22. The server may be centralized or distributed. System administration is server based. As used herein, the terms client and client device refer to a processor-based device on a node of the network. The term user refers to a person in the organization who is logged into the network through a client 12. The server 14 stores profiles of all users 18 in the network 16, performs calculations necessary for whole system performance and stores data collected or created by the clients in a database 24. The illustrated users include a security dispatcher 18-1, school faculty members 18-2, students 18-3 (optional) and other responding personnel in addition to the dispatcher, including school security guards 18-4. Additional embodiments not illustrated in FIG. 1A include other users 18 in the school organization, e.g. medical staff, facilities management or other operational staff who may be given a SWARM alarm application 13 or a SWARM mobile application 15 or both depending on their needs. The school security dispatcher 18-1 may also be a control room operator or a supervisor in charge of campus security. The users 18 who are mobile can remotely receive and transmit information and alerts via hand-held clients 12, e.g., using smart-phones, laptop computers and tablet computers, through wireless network links 22 (e.g., RF or WiFi links), while users 18 who are stationary can receive and transmit information through standard wired network interfaces. Many of the hand-held clients 12 may have touch-screen interfaces.

Figure 1B:
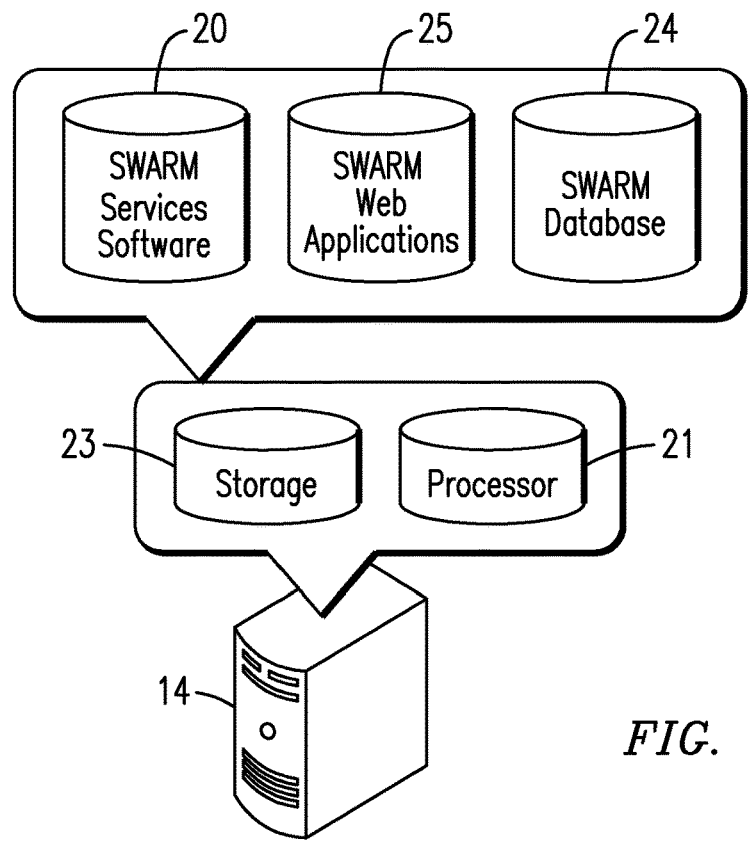
FIG. 1B illustrates components and functions of a SWARM server.
Figure 1D:
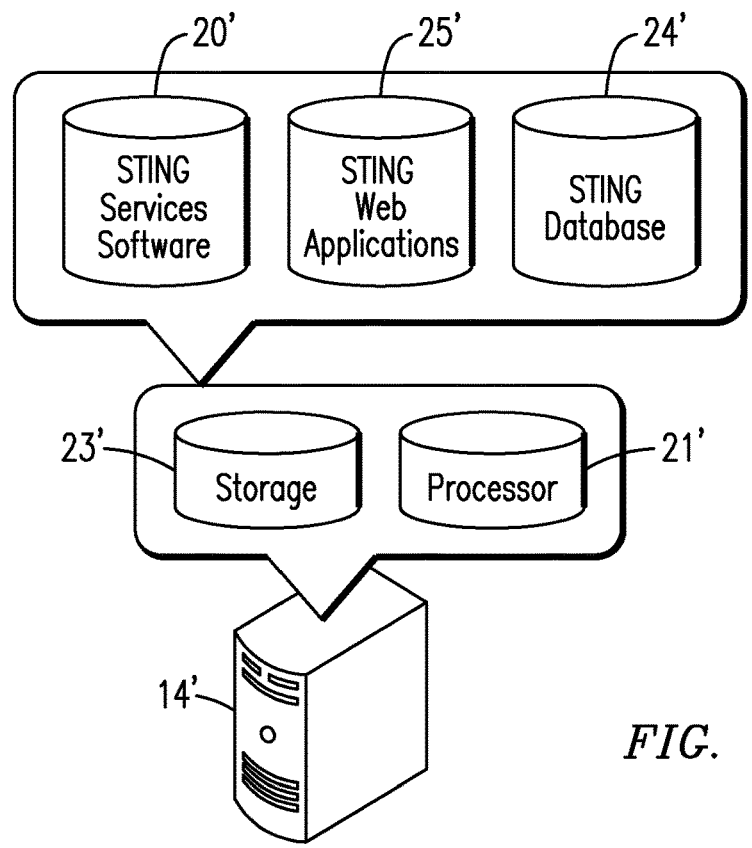
FIG. 1D illustrates the components and functions of a STING server.

FIG. 1B displays the internal components of a computer system which operates as the server 14, including a storage component 23 and a processor 21. Individual portions of the storage component are each referred to herein as a non-transitory computer readable medium. Located on the storage components 23 of the server 14 are the SWARM Services software 20, the SWARM Web Applications 25 and the SWARM Database 24. The SWARM Web Applications storage block 25 comprises the SWARM Administration Manager 26, the SWARM Incident Manager 28 and the SWARM Information Manager 30. The client based applications as well as the SWARM Web Applications request services from the SWARM Services Software 30 to perform various tasks such as store, erase, compute, send or update.

The database 24 stores all of the pertinent system and user data that the various applications would use from time to time in operation of the system. Information in the database 24 is accessible to the clients through the server 14 utilizing the SWARM Services software 20 in order to access and share information between and amongst users 18. Information that may be transmitted and received by clients and/or stored within the server database may include, but is not limited to, user profile information, user preferences, location data of users, text notes authored by the users 18 and photographs. The user profile information may include information specific to the health history of a user 18 to facilitate emergency assistance.

Figure 2:
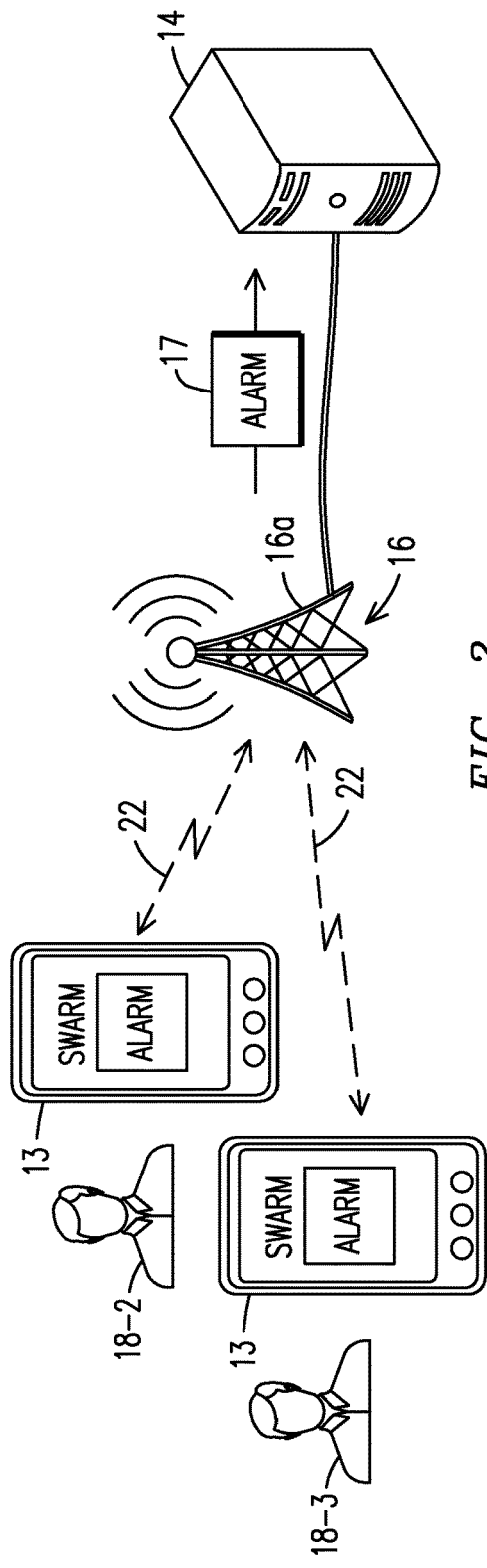
FIG. 2 illustrates setting of an alarm in the SWARM system.
Figure 3:
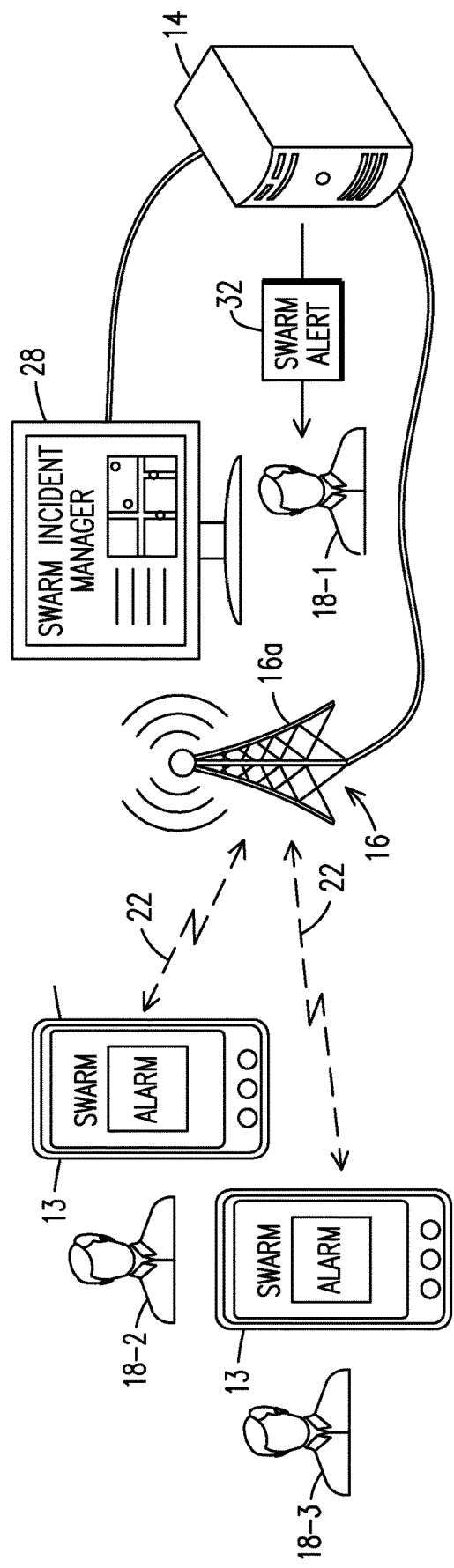
FIG. 3 illustrates a dispatcher receiving an alert concerning an alarm set within the SWARM system.
Figure 4:
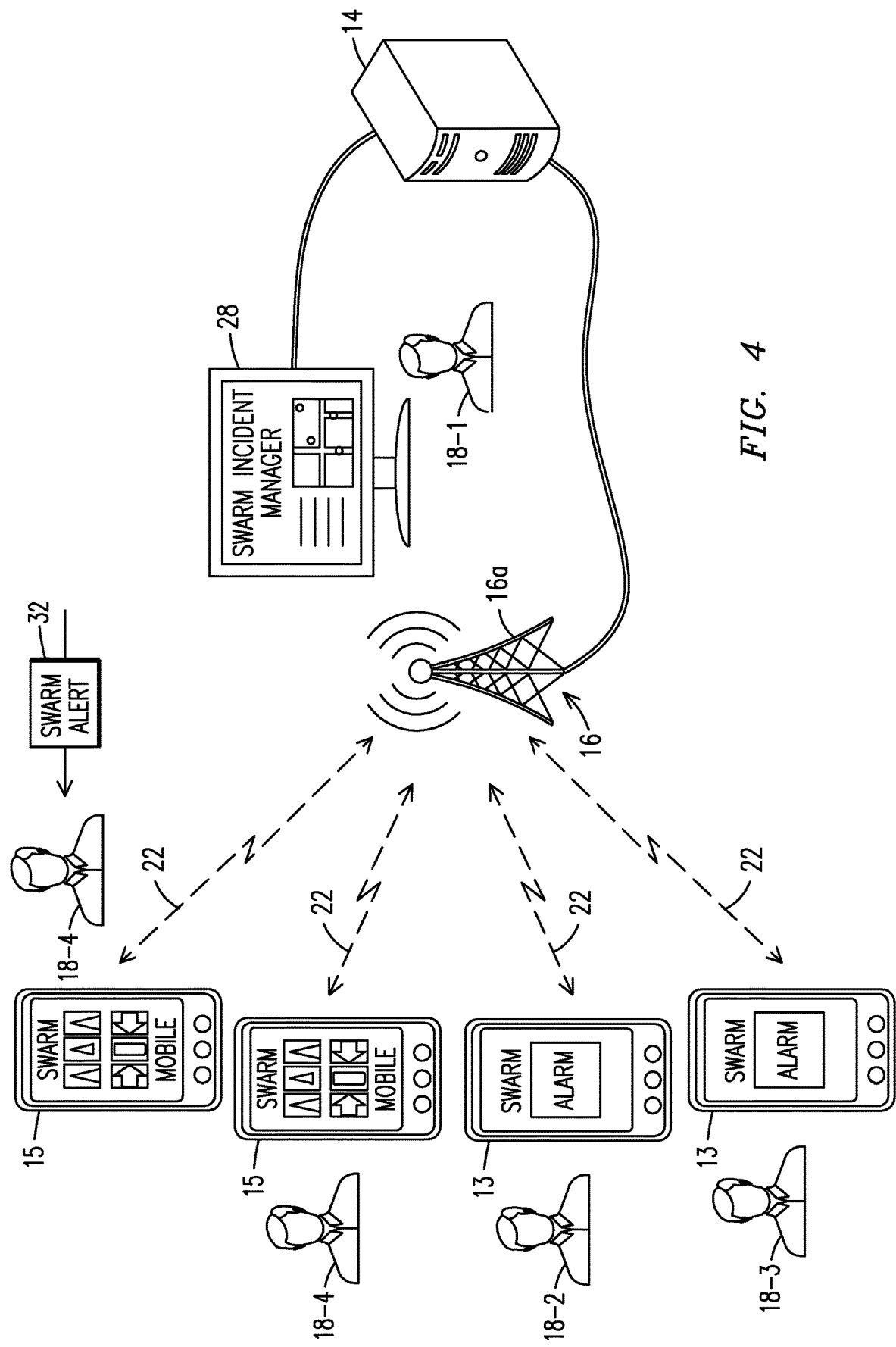
FIG. 4 illustrates mobile users in the SWARM receiving alerts of an alarm.

FIGS. 2 through 4 illustrate initiation and notification of an alarm which is transferred through the SWARM system 10 to create an effective response. FIG. 2 illustrates the SWARM alarm software application 13 running on each client 12, assigned to a faculty member 18-2 or student 18-3. When an alarm is initiated by a faculty member, the SWARM alarm application 13 sends a service request to the SWARM services software 20 located within the server 14 which contains an alarm signal 17. In one embodiment, the services software 20 has set an alarm flag for the user 18 within the database 24. As shown in FIG. 3, the service request also contains instructions to send a SWARM alert signal 32 to the dispatcher 18-1 informing the dispatcher that an alarm was created by a specified faculty member 18-2 and/or student 18-3. The dispatcher 18-1 reviews information associated with the received alarm signal (e.g., location information and any additional information sent by the faculty member) and sends responding personnel assigned to the school to the location of the faculty member 18-2 and/or student 18-3. In another embodiment the responding personnel may be automatically dispatched by the system 10 based on proximity of responders to the location. FIG. 4 illustrates this embodiment with two security personnel 18-4 who utilize the SWARM mobile application 15 on a mobile client device 12. A similar alert signal 32 as received by the dispatcher 18-1 may be also sent to the SWARM Mobile application 15 by the SWARM Services software 20 on the server 14.

The SWARM system 10 brings this enhanced capability into environments characterized by high levels of threat, requiring quick reaction by responding personnel in the organization. Unlike exemplary embodiments of the STING system 11 described in the '260 patent, not all information needs to be provided to all members of the organizations all of the time. Rather, selective communication of information at select times may be more appropriate depending on the nature of the organization. For example, the facilities management personnel in a school may not need to know where school faculty are located during routine activities, but might need this information during an emergency. Students 18-3 possessing mobile phones serving as clients 12 may have the SWARM alarm software applications 13 running on their mobile phones, but may never be given permission to access information in addition to what they are normally allowed to receive after initiating an alarm.

Further, because the SWARM system 10 may operate cooperatively with the STING system 11, (e.g., dedicated to law enforcement or public safety operations), not all information generated within the SWARM system 10 may be sent to members in the cooperating organization. Selective information which facilitates operations of the cooperating organization is communicated to members in the cooperating organization.

Figure 1C:
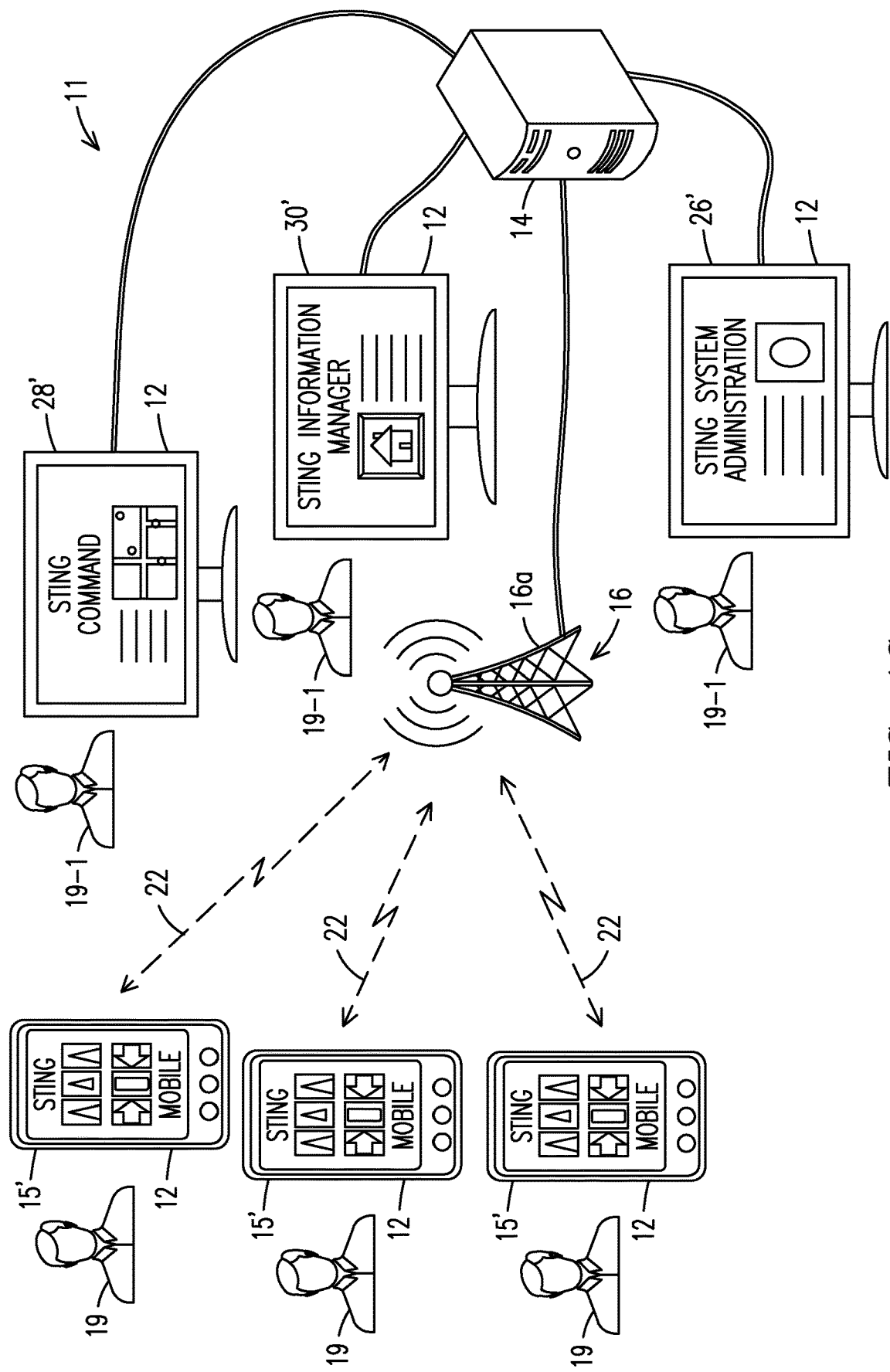
FIG. 1C illustrates another distributed processing network system, referred to as a STING system, also having both static and mobile client devices connected to a server.

The software applications directly associated with the SWARM system 10 can operate with little or no active involvement of personnel in the field environment. In many instances, the applications automatically collect, analyze and display information which is easy to visualize. An embodiment of the SWARM system 10 includes a suite comprising two native mobile applications and three web based applications. With reference to FIG. 1A, the SWARM Alarm application 13 and the SWARM Mobile application 15 are the native mobile applications which operate on hand-held clients, e.g., smart phones. The SWARM Administration application 26, the SWARM Incident Manager application 28 and the SWARM Information Manager application 30 are web based applications which run on the server or another network based computer system. With respect to the STING system 20 as described in the '260 patent, the SWARM Administration application 26 has functionality like the STING System Administration application 26' through which user profiles within an organization are added and managed. See, also, FIG. 1C. The SWARM Incident Manager application 28 has functionality like the STING Map/Roster Command application 28' which provides a list of logged-in users 18, and a map displaying all of the active polling users 18; and the SWARM Information Manager application 30 has functionality like the STING Situational Awareness Information Manager application 30' to enable users to quickly collect and share information and quickly view information shared by other users.

An optional implementation combines the SWARM Incident Manager application 28, the SWARM Information Manager application 30 and the SWARM Administration application 26 into a single web application or combines only the SWARM Incident Manager application 28 and the SWARM Information Manager application 30 into a single web application. Additional applications can be added to the SWARM system as more functionality is required by the user. Examples include a text note application, a photo capture application and a user notebook viewer application as disclosed for the STING system 11.

Native mobile applications for the SWARM system 10 are designed for a variety of mobile devices, including smart phones, tablet computers and tactical radios. Although the invention is described in the context of a smart phone it is to be understood that the invention can be practiced with other handheld devices running suitable operating systems, e.g., operating systems running on Android™ phones, BlackBerry™ devices and iOS (the mobile operating system used in smart phones marketed by Apple Inc). The SWARM web based applications are accessible with many common internet browsers on a wide variety of devices, including notebook computers and even via tablet computers having data connectivity to the internet, e.g., through a cellular link.

The overall system topology is a client-server distributed networking architecture utilizing cloud based computing methodologies.

Generally, by providing the combination of an IP-based network and a cellular system, persons logged into the SWARM system 10 have access via smart phones, and various other mobile devices, such as tablets, and wired devices. Other wireless systems such as WiFi networks can also provide connectivity. A SWARM system server 14 stores all user profiles, performs calculations necessary for whole system performance and stores the data collected or input by the client devices. The server 14 may be secured with a firewall appliance that can require VPN access, and by having all data encrypted during transmission with TLP over HTTPS.

The SWARM software architecture provides minimal data storage on the clients 12 to provide additional security to responding personnel in the field. No data is permanently stored on the mobile clients. Hence, records of events are not available to be retrieved later from data located within the smart phone's internal memory, whether the memory is of the volatile or non-volatile type. One feature of this data storage architecture is to avoid dependence on data stored on the phone during an incident. Also, should critical information be provided to school faculty or students during an emergency, the data cannot be misused during an incident or for later illicit purposes off campus. This is particularly important since any of these users may access the SWARM system 10 on personally owned devices. For responding groups, in particular security personnel who might have more sensitive information, if the device is lost or stolen, critical information is not available to the unauthorized individual accessing the device. In the SWARM system 10 the only permanent data is data stored in the SWARM server database 24. No data is permanently stored on any of the client devices.

In one embodiment, history of GPS data obtained for each user is not saved in the system. Only current GPS location data are placed in the server database. These are updated (i.e., over-written) immediately, when data for a position are received from the mobile device. All GPS-based position data is completely removed from the server when the user logs off the SWARM system. Another embodiment allows for retention of stored location data (e.g., a time history of GPS data collection) to provide location histories of individuals and events. These may be useful for training, preparation of after-action reports or other needs. This embodiment may also be useful to review particular movement patterns of individuals during an emergency.

In embodiments having text note applications, photo capture applications and user notebook viewer applications installed on the client devices 12 (as disclosed for the STING system 11 in the '260 patent), text notes and photographs are uploaded from the client device to the SWARM server and are stored on the system for a limited time period in order to minimize theft or loss of information in the event of a security breach or system failure. The data is only available to be retrieved by appropriate personnel during a defined time period (e.g., a 30 day period) after being collected. The same data may be stored on the system for an additional time period, consistent with retention policies, during which period access may be limited to a system administrator, before being totally deleted from the SWARM system database. These time periods can be modified as desired by the organization. Use of pre-determined data retrieval and storage periods ensures that if a security breach occurs, the entire data base of information will not be compromised, since only a predetermined portion of the history is retained on the SWARM system 10. Another embodiment of the SWARM system 10 stores photographs and text notes permanently. This might be valuable for organizations not having secure evidence or report databases as might be used in a law enforcement department.

Another feature of the SWARM system 10 is that the client mobile devices 12 do not have to be uniquely or permanently assigned to users. For users who purchase new phones or are given new company owned devices, there is no need to modify or replace data on the phone. Rather, the individual can simply acquire the mobile application on the new device, log into the application with the existing username and password; continued operation is assured. For responding personnel this also means the same mobile device may be shared among users at different times, e.g., during different shifts, or be kept in reserve for use on an ad hoc basis when additional mobile devices are distributed, e.g., during emergency situations. To facilitate transferability, the unique identification numbers and telephone numbers of the mobile devices are only reassigned to a user 18 in the SWARM system 10 upon login and they are removed from the system upon logout. This capability provides significant flexibility to the organization and lowers the cost of acquisition of the technology by minimizing the cost of hardware. In order to improve security using this particular mobile device sharing technique, an option can be provided to authenticate the user upon first use of the mobile device. The SWARM System Administration application 26 can provide this function and the smart phones can also be deactivated from a particular user upon completion of an operation using the phone. For example, should a member of the organization purchase a new smart phone and redeploy any of the SWARM mobile applications 13 and 15, the SWARM server 14 will recognize the new phone and ask the user 18 to re-authenticate on the new device. If user authentication occurs on the new smart phone, the older device can be automatically deactivated by the SWARM System Administration application 26.

Figure 5:
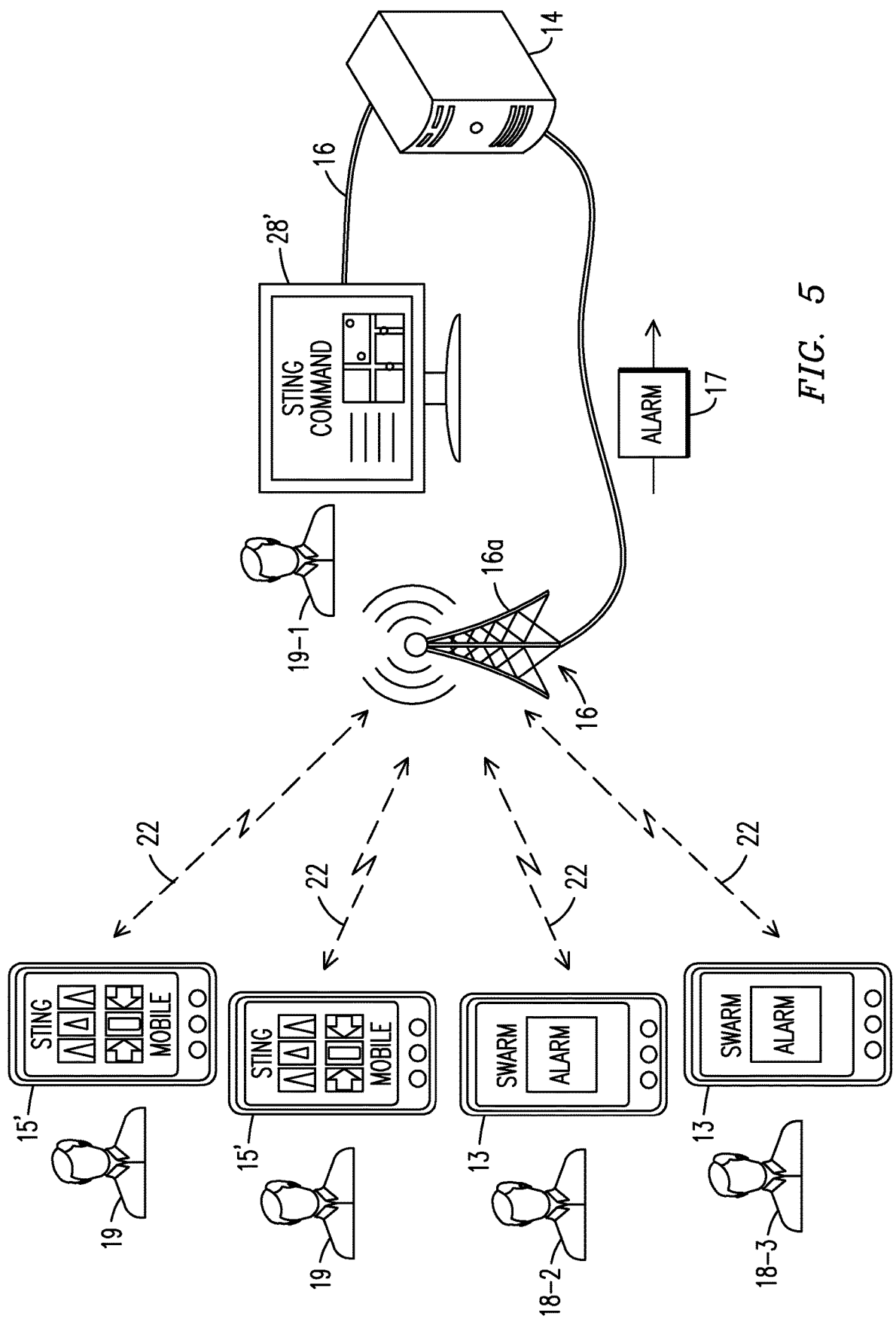
FIG. 5 illustrates communication to within the STING system of an alarm set by a client with a SWARM alarm mobile application.

An additional feature of the invention enabled with the SWARM Administration application is the ability for integration of the components or the entire SWARM system 10 with a STING system 11. This integration is particularly useful when, for example, a law enforcement officer responds to a gunshot event on the premises of a school. For those organizations not having internal responders on their staffs (as may be the case with most primary and secondary schools), it is advantageous to deploy only the SWARM alarm application 13 (alone or in combination with other mobile applications), in conjunction with a STING system 11. FIG. 5 illustrates such an embodiment in which an alarm signal 17 is sent to the server 14 of a STING system 11. In still another embodiment (not illustrated) the STING services software 20' may have the necessary SWARM services placed in the software core 20' (instead of, or in addition to, placement in the SWARM services software 20), i.e., the alarm activation service initiated by the alarm signal 17. In addition, an alternate embodiment of the STING database 24' enables users of the school organization 18 who can create alarms to be members of the STING organization, but only for purposes of creating the alarm. The law enforcement dispatcher 19-1 and responding officers 19 receive the same alert that the SWARM security organization receives as described earlier. The resulting STING system 11 is similar to the SWARM system 10 except that the responding users are external law enforcement organizations rather than internal school security organizations.

In additional embodiments comprising the integrated alarm functionality with a STING system 11, only local law enforcement officers, i.e., users 19 operating in the STING system, receive information on their client devices 12' (which are logged into the STING system 11), in any of a list view, a map view or a radar view which can include position information presented in a Common Operating Picture. This results in a more efficient automated response while the law enforcement dispatcher 19-1 can decide on additional responders necessary for the emergency who are farther away. For example, when the location that the alarm originates from is a school, law enforcement officers 19 within a predefined distance of a user 18 who initiates the alarm signal 17 can view themselves and other officers 19 who are within the predefined distance of the location with identification of each by name. An additional embodiment of the SWARM Alarm application under these circumstances creates the same COP for the school faculty 18-2 or students 18 to enable evacuation or to find the closest law enforcement officer.

Figure 6:
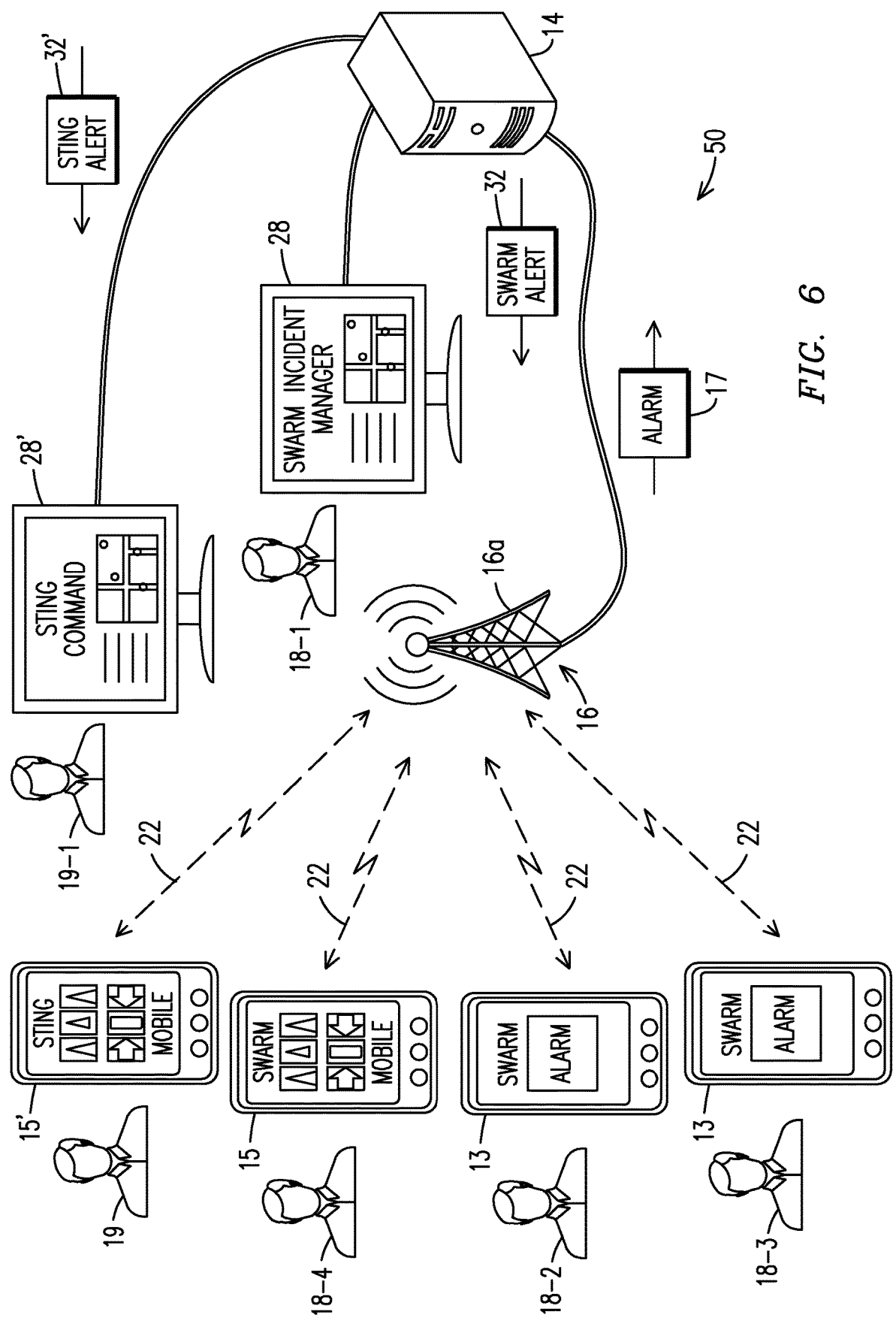
FIG. 6 illustrates a functional integration of SWARM and STING systems utilizing a single server.

According to another embodiment shown in FIG. 6, a complete SWARM system 10 is integrated with an entire STING system 11. The SWARM system 10 and the STING system 11 share a common server 14. The SWARM system 10 has an alert signal function 32 similar to the alert signal function 32" of the STING system 11. In still another the embodiment shown in FIG. 7, each system 10, 11 is supported by a separate server 14A, 14B. With either server configuration, when a school faculty member or a student activates an alarm via a mobile client device, the alarm information is initially sent to the SWARM server 14A. The SWARM Services Software 20 in server 14A initiates a service request to the STING services software 20' in server 14B to change data in the database 24' indicating that the SWARM system has an alarm signal 17. This information is delivered into the STING system 11 for viewing by members of the organization (e.g., by officers, dispatchers, or supervisors in a law enforcement operation) who are assigned to monitor and react to events. The STING system 11 receives and manages the information generated in the SWARM system 20 and utilizes the data within the STING system 11 to facilitate responding to the incident by combining the situational awareness information. This may include location information for the alerting faculty member 18-2 or student 18-3, and level of danger. In other embodiments of the SWARM alarm application 13, photographs and texts may be created and sent by users 18-2 and 18-3, as well as other situational awareness information of interest to the law enforcement operations, e.g., normally generated by the STING system 11. Law enforcement personnel 19 are most quickly deployed to the parts of the school facility having a high danger level to augment or replace responding personnel from the school organization.

Both the SWARM system and the STING system provide situational awareness information for first responders. Embodiments of the invention provide for rapid transmission of situational awareness information among differing organizations. In the past it has been difficult to achieve rapid communications between, for example, different Public Safety organizations, such as police, fire and rescue units because they traditionally have had different or limited communications technologies. It is nonetheless desirable that rapid sharing of time critical information occur between organizations. In this regard, numerous embodiments of the SWARM system 10 can be operated in conjunction with situational awareness systems (e.g., the STING system 11) such as disclosed in the '260 patent.

Generally, a response system may combine two or more distributed network systems such as the SWARM system 10 and the STING system 11, where one system, e.g., the SWARM system 10, processes and provides situational awareness information (e.g., location or alarm information or occurrence and location of a gunfire incident) which may be knowledge among operating personnel in that organization. The second system receives the situational awareness information directly or indirectly from a resource (e.g., from the SWARM Server based Services Software 20) in the first network system, e.g., based on a change in a flag setting and a service request. The second system processes and provides that information to clients in the second organization so that appropriate persons in the second organization may also have timely knowledge of the occurrences and respond accordingly. The systems configuration enables the second system (e.g., the STING system 11) to receive and display, for viewing on mobile clients by first responders, important information about persons associated with the first organization (e.g., specific students in a public school system) based on predetermined criteria or a decision made by a person in the first organization. The following embodiments are exemplary.

Figure 7:
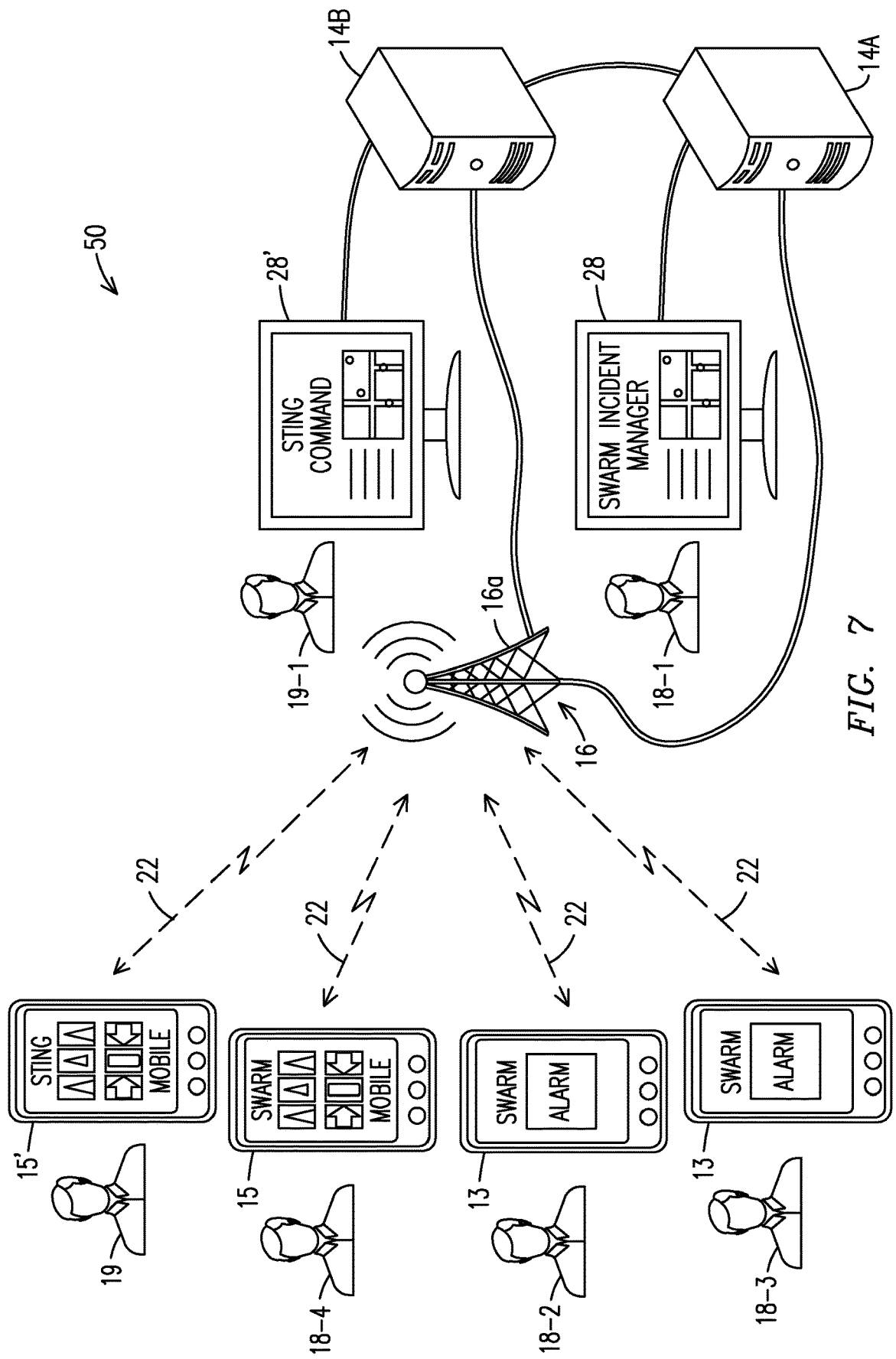
FIG. 7 illustrates a functional integration of SWARM and STING systems utilizing two servers.

Functionality of the SWARM system 10 can be integrated with other systems to create a larger, more encompassing response system 50 with more operational value. Such a combined system of systems enables a more optimal or timely response or other needed assistance from external organizations that are necessary for a particular incident, (e.g., an active shooter incident, a bomb threat, or an explosive fire) in addition to receiving a rapid response from personnel in the organization of the system 10 (e.g., school security officers). These collaborating systems could include a STING system 20 as illustrated in FIGS. 5, 6 and 7, but any Situational Awareness system or subsystem could be cooperatively coupled with the SWARM system 10, such as CAD (Computer Aided Dispatch) or RMS (Record Management Systems) or commercial security systems to generate rapid responses. Exemplary system architectures are illustrated in FIGS. 6 and 7 for coupling two otherwise complete or stand-alone systems to form a response system 50.

In the response system 50 of FIG. 6 a SWARM system 10 and a STING system 11 share a common server 14. It is to be understood that for embodiments of the distributed network systems (e.g., systems 10 and 11) which form the more encompassing response system 50 comprising two or more distributed processing network systems, the associated computer systems may at times, or entirely, function as servers, comprising processors, volatile memory and permanent storage that houses a database. That is, the term server as used herein refers to a hardware system comprising a processing device which physically executes instructions. The storage includes media portions of which can each be regarded as a block of a non-transitory computer readable medium for storage of computer instructions thereon to provide functionalities according to numerous embodiments of the invention. The instructions are adapted for execution on the computer system processor to perform tasks in isolation from the clients or in conjunction with the clients. Similarly, and to effect distributed processing in each of the networks, the client devices 12 (e.g., including hand-held mobile telephones and desktop computers) may include individual blocks of non-volatile storage which may each be regarded as a non-transitory computer readable medium and may contain, for example, computer instructions stored thereon and adapted for execution on a processor of one or more of the hand-held devices to implement a method. The method may provide alarm generating information over a first distributed network processing system in response to an alarm situation communicated from one in a first plurality of hand-held devices to the computer system acting as a server in association with the SWARM system 10.

In the response system 50 of FIG. 7 a SWARM system 10 and a STING system 11 each utilize a different computer system or server 14A, 14B but nonetheless information is actively shared between the two or more stand-alone distributed network systems. Both of the exemplary systems may utilize a REST based service software architecture for server and user computational efficiency, i.e., the services are only executed when they are absolutely needed.

Utilizing the system topology of FIG. 6, combined with the SWARM system diagram 1A and the STING system diagram 1C, any of the numerous situational awareness (e.g., STING) application architectures and SWARM application architectures both operate within the same network 16 and share common resources to separately deploy SWARM services software 20 and STING services software 20' to acquire information from the SWARM database 24 and/or the STING database 24'. Alarm signals 17 generated by the SWARM alarm application 13 are utilized by both the SWARM system 10 and the STING system 11 to provide alarm generating information over both network systems (e.g., where the alarm signal 17 is activated by a school faculty member 18-2 and/or a student 18-3). For example, the alarm generating information may initiate a response in the computer system/server 14 of the SWARM system 10 by altering data (e.g., setting a flag) under the control of the server 14 to indicate an alarm state detectable by other devices having a client server relationship with the computer system 14 in the first network system. This may be accomplished by sending service requests to the server. The several SWARM and STING software applications on the server 14 receive the service request, process the alarm signal 17 and send SWARM ALERT signals 32 to the SWARM Incident Manager application 28, which are utilized by the school security dispatcher 18-1 and the security personnel 18-4 via the SWARM Mobile application 15. The server 14 also sends STING ALERT signals 32' to notify the STING users 19 and 19-1 of an alarm situation. A software module referred to as combined services software 20" performs the services function of services software 20 and 20' for both systems 10 and 11 within the server 14. This function automatically populates the Incident Manager 28 and the STING Command Roster/Map 28' with information associated with the SWARM ALERTS initiated by the faculty members 18-2 and students 18-3. This includes positioning the locations from which the ALERTS are generated on the respective maps.

A first exemplary method for operating the systems 10 and 11 cooperatively functions with the server based software applications of each network system running on the same server 14. According to another embodiment, a joint set of services is created such that combined services software 20" runs within the server 14 in FIG. 6 to achieve all functions of both the SWARM system services software 20 and the STING system services software 20'. While some of the services and the various fields of the respective databases may differ, the congruence and similarity of other services and common database fields present an opportunity to maximize performance and minimize cost. The SWARM system 10 and the STING system 20 perform some identical functions, e.g., providing user locations and user profile information. With services that are common to users in both systems this design minimizes the total number of service routines required thus reducing the size of the software footprint. For example, an "update position" service exists on the STING system which allows, for example, a mobile hand-held client 12 to update a law enforcement officer's position on the server 14 by sending current GPS data with a client/user identification. This identical service could be used by the SWARM users 18 to update the school faculty 18-2 and student 18-3 locations as well as locations of school security personnel 18-locations in the SWARM server database 24. However an "obtain list of law enforcement officers" service would normally be utilized only by STING users 19 and 19-1 since the school safety responses do not require (and it may not be desirable to provide) officer locations be available to SWARM users 18. An alarm service request generated by an alarm signal 17 may be a single software service within the server 14 that would be executed for both the SWARM system 10 and the STING system 20.

With reference to FIG. 7, the SWARM system 10 and the STING system 11 can each operate on different servers 14A and 14B while communicating with each other to provide a response system which emulates one larger single system. The STING system 11 would have the entire SWARM services software 20 integrated into the STING services software 20'. This would allow the STING system 11 to directly process data from the SWARM database 24 in Server 14B in order to integrate useful SWARM data with the necessary STING data in server 14B for an effective response from the STING system 11. The capabilities of the SWARM services software 20 may be a more limited than those of the STING services software 20' but the STING services software 20' may include the SWARM services software 20 as a subset of the services 20'.

Communication between the two systems of FIG. 7 could be enabled with either of two methods. In the first embodiment, a service could be initiated periodically by the STING services software 20' on the STING server 14B to the SWARM services software 20 on the SWARM server 14A to request whether any SWARM users 18-2 or 18-3 have activated an alarm. If an alarm has been activated within the SWARM system 11 which is determined by user alarm states within the SWARM database 24, additional services could then be requested by the STING services software 20' to provide additional information to the STING server 14B. These may include many of the user profile fields, the location of the user, the danger level and any initial texts or photographs the SWARM users 18 have created. The SWARM services software 20 within server 14A will then automatically send service requests to the STING services software 20' on server 14B to update the alert information and users. This will continue until the alerts are discontinued by either the school faculty users 18 logging out of the SWARM alarm application 30 or until the security officers viewing a common operating picture (COP) via the Incident Manager application discontinue the alarms within the SWARM Incident Manager application 36. These services would be continually initiated until all alarm states have been deactivated. The STING system 11 would then start over at the initial condition, i.e. requesting the SWARM services software 20 for alarms.

In another embodiment, the SWARM services software 20 first updates an alarm status in the SWARM database 24 for the SWARM users 18-2 and 18-3 who are activating an alarm. The SWARM server 14A then forwards an alarm service request to the STING server 14B which causes the services software 20' to set an alarm flag in the STING database 24'. The STING system 11 can now directly access the SWARM database 24' for information relating to the ALARM 17. In essence, service requests with alarm signals 17 are automatically forwarded by the SWARM server 14A to the STING server 14B while the SWARM database 24 is updated.

SWARM Administration Application

The administrative function of the SWARM system 10 is performed by a SWARM Administration Application 26 which creates, maintains and deletes user profile data in an associated database located on the server within the SWARM system 10. This is the starting point for initiation of service. A first time use of the system includes an initialization process where the first user logs into the SWARM Administration application 26 and populates all users in an organization to begin operation. The initial user profiles for all personnel are defined by the following exemplary fields:

1. Username
2. Password
3. First Name
4. Last Name
5. Nickname
6. Classification: School Educational Faculty, Student, Other Personnel or SWARM Integrator API
7. Badge/Employee #/Student #
8. Map name/Call Sign
9. Title/Job Function/Rank
10. Department/Assigned Role
11. Building/Room #/Job Location
12. Shift/Class Schedule
13. Known Medical Issues
14. Other important personal information
15. Photograph
16. Authorization level
17. Organization (automatically set when the organization is created)

Field 6 combined with Field 9 may require additional subsets of these fields as well as additional specialized fields pertaining to a particular competency of the individual's assignment. These might include age, language proficiency, special skills (e.g. locksmith), medical competencies, weapon type or other important user attributes. Other embodiments include the use of the other SWARM applications (SWARM Mobile 15, SWARM Alarm 13, etc.) within the SWARM system 10 to complete a partially created user profile that was begun with the Administration application 26 or even create a new user profile entirely. For example, photographs might be easier to insert into the user profile using a mobile device rather than a PC since a camera is included on all smart phones today. Users having authorization to access to the SWARM Administration application 26 may also modify user profiles and reset passwords after they are initially setup. Applications in the SWARM system 10 may also have permissions to change these fields outside of the SWARM System Administration application 26 as necessary once a user profile is completed.

Each username associated with each organization supported by the SWARM system 10, and used to log into the SWARM system 10, must be a unique identifier throughout the entire SWARM system 10. The username points each user to the particular organization (e.g., Trailbrook Elementary School, Duke University, Tall Oaks High School) within the system and the system does not allow the user access to any information associated with a different organization. To minimize possible errors and confusion, the username can be the user's unique email address for that organization.

Different fields can facilitate different features and usage scenarios within the system. For example, the authorization level in field 16, assigned to each user, determines the level of system access each user has to each of the applications. In a university, an external IT administrator might only have access to the SWARM Administration application 26; school faculty and students might only have access to the SWARM Alarm application 13; and facilities management and medical personnel might have access to both the SWARM Mobile application 15 and the SWARM Alarm application 15. On the other hand, university police might have access to a different set of applications, e.g. the SWARM Mobile application 13, the SWARM Incident Manager application 28 and the SWARM Information Manager application 30, in order to coordinate and respond to an incident. Other fields can facilitate quick batch operations and sorting of users (e.g., students versus faculty) for selective dissemination of certain types of data in the other SWARM applications.

The department or assigned role, input in Field 10, assigns each user to membership in a group of users, e.g., a joint team. Members of a group are displayed on the smart phone screen, e.g., in map displays. The assigned role is used to define special groups or departments within an organization. In a public school there may typically be school faculty, facilities management, medical and security users. This field can be used to display these teams as differently coded elements within the application, e.g. using different colors or different icons on maps, or to completely separate teams from each other in the application, thereby recognizing their disparate daily functions, especially during non-emergency day-to-day operations.

Another embodiment of the SWARM System architecture provides an ability to easily join different organizations and/or roles within different organizations into a single operation or group. This can be effected automatically according to predetermined criteria. For example, given two standalone systems SWARM 10 and STING 11, when certain conditions are met, personnel in certain organizations such as a university campus security operation and an external law enforcement organization can share time sensitive information in emergency response situations, within a single integrated system. Thus the field might be the same for two different organizations. As one example, this can enable external police to know where campus police are without including display of campus medical personnel.

SWARM Alarm Application

The SWARM Alarm application 13 is a native mobile application that could be run on any commercially available smart phone with commercially available operating systems such as Android, iOS or Windows Mobile. The application provides four core functions: a) logging into the application which arms the alarm functionality, b) activation of the alarm, c) determining and reporting location of the individual activating the alarm and d) creating the information exchange with responding personnel for real time situational awareness of ongoing events.

The SWARM Alarm application 13 is designed as a native application for mobile devices, including smart phones, to provide improved response and user experience over a web application which could implement the same functionality. Operating the alarm function in the native mobile environment is advantageous. That is, the SWARM system 10 uses the native application to perform computations on a local level to minimize network traffic and avoid speed limitations that would otherwise affect overall application performance. Use of local memory allows the SWARM system 10 to deploy or process large resource intensive data operations in the mobile device, including information setup tasks such as creation of user lists and map data.

Another advantage of executing the SWARM Alarm application 13 as a native application is that capabilities of this application which are not dependent on server interaction can function independent of the network. Data generated locally can be temporarily stored on the mobile device and uploaded to a network computer at a later time. The overall efficiency of the SWARM system 10 can be optimized with this approach. The application can also be customized based on the exact screen size of the mobile device and its functionality as opposed to a "one size fits all" approach typical of web applications which centrally process information and transfer results to mobile devices. This is to be contrasted with web applications which, in general, are relatively slow and more prone to network service issues.

Figure 8A:
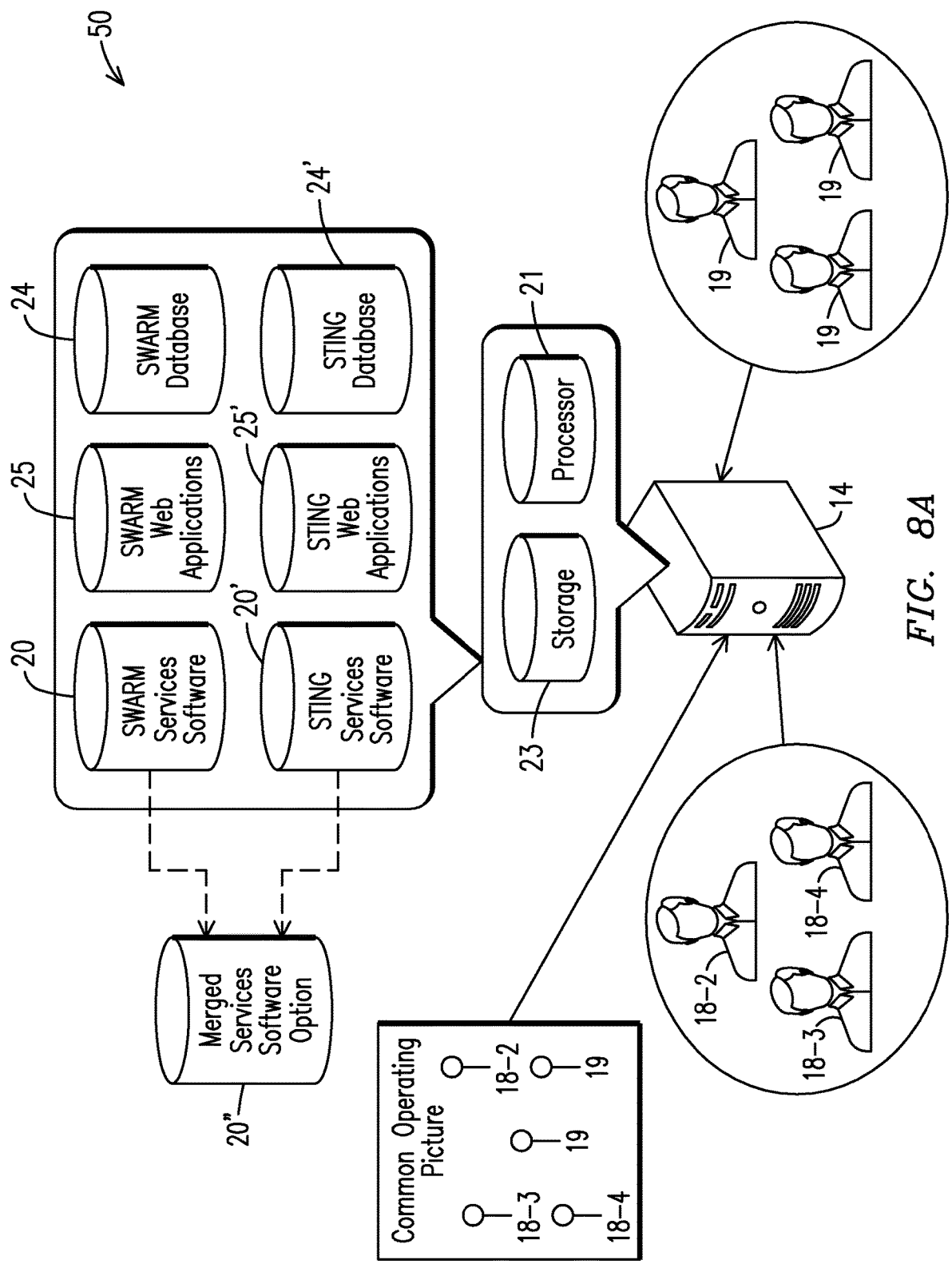
FIG. 8A illustrates diagram of alternate architectures for integration of SWARM and STING systems.
Figure 8D:
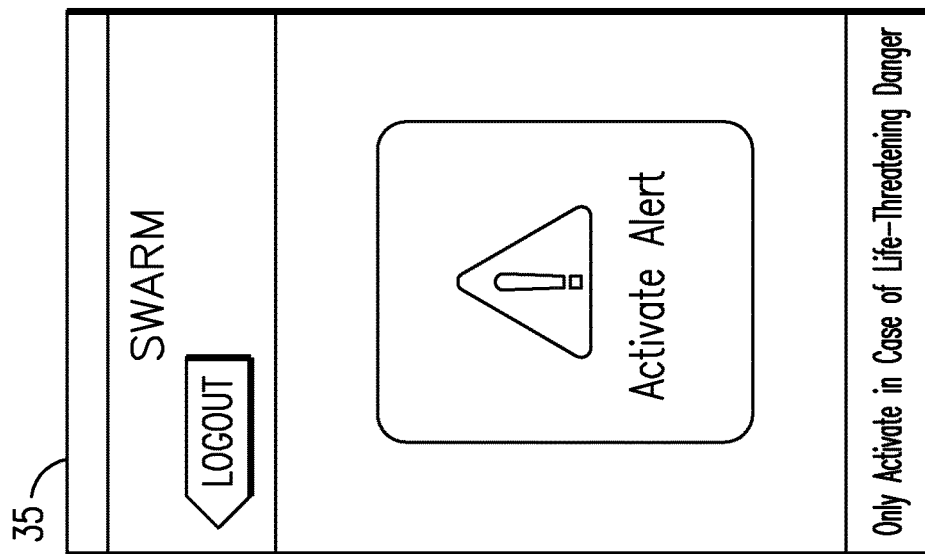
FIGS. 8B, 8C and 8D illustrate the login, unlock and alarm screens of a SWARM alarm mobile application.
Figure 8C:
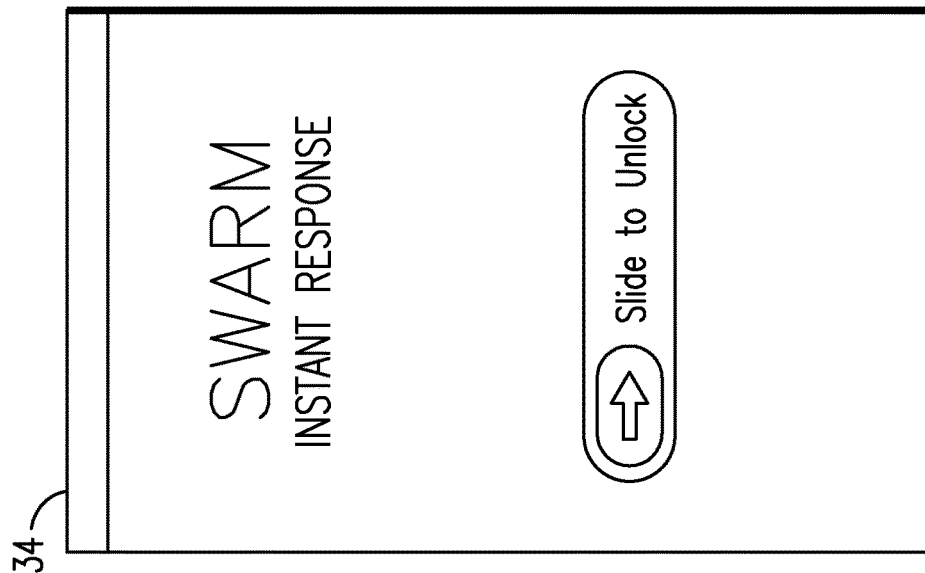
Figure 8B:
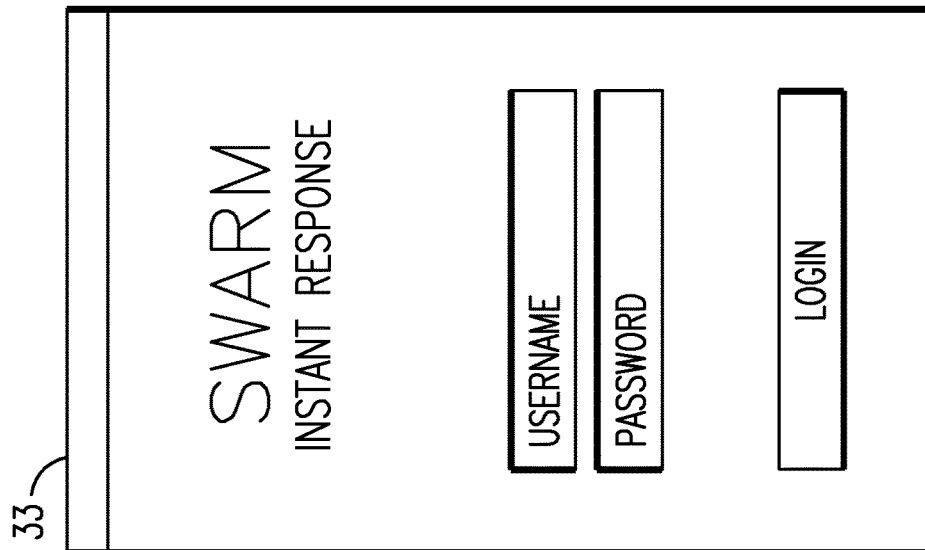

FIGS. 8B, 8C, 8D, 9A, 9B and 9C show example operation and functionality of the SWARM alarm mobile application 13. A user 18 must have first authenticated user credentials before initiating an alarm in the SWARM system 10. After issuing a SWARM ALERT 32 to initiate the ALARM 17, the user may then provide additional situational awareness information to First Responders. As shown in FIG. 8B, the user 18 utilizes the SWARM alarm login screen 33 and enters a username and password to authenticate user identity. If the user 18 has access to other SWARM applications, the same username and password are utilized for other applications as well. In one embodiment the user may immediately create an alarm immediately after or automatically upon verification of the user credentials. However this alarm initiation method may not be very practical since stress and poor fine motor skills during an emergency might make it difficult to correctly and swiftly enter a username and password at the time an emergency occurs. In another embodiment, the validated user credentials only arm the SWARM Alarm application 13 so the user 18 may later initiate an ALARM 17 by issuing a SWARM ALERT 32. If the user does not logout of the SWARM alarm application 13, the user 18 will always be in an armed state, even if the phone powers off and is turned back on at a later time. A user 18 may also choose to log in and log out based on work schedule. The user 18 enters a username and password at the beginning of a work shift (for example, when an elementary school teacher arrives at school for work) so the alarm is easily available to be manually activated should an emergency occur. Having logged into the SWARM alarm application 13 once in the morning, the user 18 logs out of the SWARM alarm application 13 at the end of each work shift.

In an emergency, the user opens the SWARM alarm application 13 and the alarm unlock screen 34 in FIG. 8C is available immediately to the user 18. To create an alarm 17, the user 18 moves the slider to the right on the lock screen 34 and then upon appearance of screen 35 shown in FIG. 8D, presses the alarm button on this alarm mobile screen. The two step process to create the alarm signal 17 from the SWARM Alarm application 13 prevents accidental or false alarms. False alarms are particularly intractable for critical response systems given the expense and intensity necessary to respond to an emergency. Therefore methods to minimize the potential for false alarms are useful embodiments.

In embodiment which prevents false alarms the SWARM system 10 automatically performs a logout of the user 18 based on shift information in the user profile or to not allow the user 18 to authenticate in non-working hours or on non-working days such as weekends. Another embodiment is to utilize the live location of the user 18 to automatically log the user 18 out if the mobile client device 12 is brought outside a designated geographic boundary zone, e.g., outside a school zone. This prevents creating alarms that are not related to school emergencies. Another embodiment to prevent false alarms includes further verification that an alarm is desired after pressing the alarm button in FIG. 8D. This verification could include a simple voice activated response to a question such as "Do you want to activate the alarm?" or another gesture based response, e.g., shaking the phone, pressing the top volume button three times, or pressing three dots on the mobile screen 60.

Other embodiments which both prevent false alarms and detect emergencies without human intervention enable the SWARM system 10 to automatically create alarms using real time environmental information obtained from sensors located within the client mobile device 12. Today's smartphones include many sensors that can collect information which can be utilized to extract conditions that would indicate an emergency situation. Common sensors include microphones, video recorders, accelerometers, gyroscopes, magnetometers, barometers, light sensors and RF detectors. One embodiment incorporates gunshot detection capability, such as described in the '273 patent "System and Method for Detecting and Analyzing Near Range Weapon Fire," in which situation a gunshot detected by smartphone sensors results in an automated alarm signal 17. Other possible events include an abnormal increase in temperature indicative of a large fire; a large vibration or shock indicative of an explosion or earthquake, or an unnatural acceleration indicative of someone falling. The method of authenticating the user and allowing the SWARM alarm application 13 to be armed is particularly effective for these automated sensor embodiments. The SWARM alarm application 13 enables the appropriate sensors upon being armed to be ready to detect environmental anomalies in order to automatically trigger an alarm event.

Once the alarm is activated, the application sends an "Alarm created" message to the SWARM Alarm application 13 on the mobile client device 12 that created the alarm, either manually or automatically. The "Alarm created" message gives confirmation to the user 18 of the device that the alarm is being processed by the SWARM system 10 and an emergency response has likely been initiated. After this message has been delivered, the SWARM system 10 must determine the location of the user 18 who created the alarm for an accurate emergency response.

Using an embedded GPS sensor in the mobile client device 12 to provide user location to the SWARM system 10 is preferred, given that the smartphone may continuously obtain location information from the GPS sensor. Hence, live automated real-time locations can be displayed and used for tracking and providing location history. However when a GPS signal is not available, e.g., in a multi-floor structure with particular building materials and features such as a metal roof, the SWARM system 10 must use other methods to provide location information. This can be quite common in the school building environment. Additional embodiments to create a position for school personnel after an alarm has been created include the following:

I. Providing an electronic floor plan, blueprint or similar school building diagram on a mobile client screen which enables the user 18 to place an icon on the diagram on the mobile client device 12 to notate current location. The diagram is provided to responding personnel via the network to facilitate locating the user.

II. Providing a list view of all rooms within a school and enable the user 18 to select a location from the list. A possible simplification of this option enables the SWARM alarm application 13 to prompt the user 18 for specific location information, such as inquiring whether the user is in a homeroom or an assigned room in accord with a normal class schedule. If the school faculty member replies yes, then the location is known to the system using information from the user profile (e.g., a schedule). An additional simplification is to use a local beacon, e.g. a WiFi router signal, in order to minimize the number of options in the list based on the proximity of locations to the beacon that the user needs to choose from.

Figure 9C:
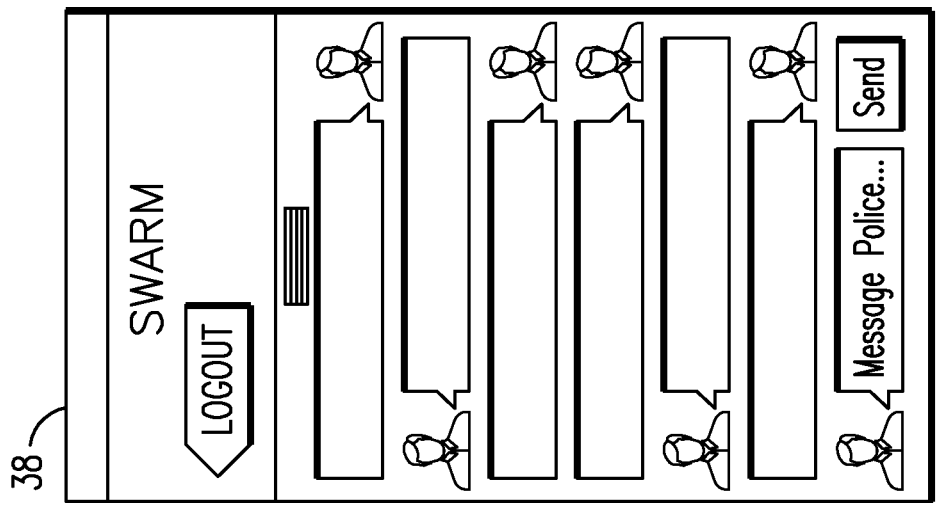
FIGS. 9A, 9B and 9C illustrate functionality screens for a user of the SWARM alarm mobile application of FIG. 8.
Figure 9B:
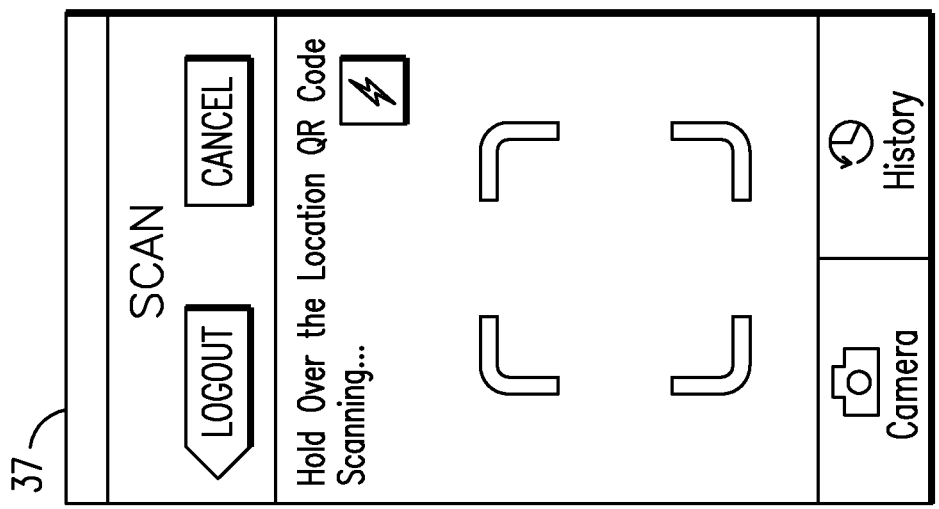

III. Providing QR codes as an alternative to acquiring precision location information of school personnel on a real time basis. The codes can be utilized to store precise latitude and longitude information as well as other useful location information, e.g., room number, room name and floor number. Common QR code readers are available as open source software modules and can easily be embedded in the SWARM Alarm application 13. FIG. 9B illustrates a QR code reader screen 37 which allows the user 18 to take a picture of the QR code utilizing the SWARM alarm application 13 and immediately determine the precise location of the user 18. The position data then updated with the application 13 and the information is uploaded by the SWARM system 10 for use by responding personnel to assist with an emergency response. QR codes with this embedded location information can be placed in all rooms and key locations within any facility using the SWARM system 10. Since emergency exit information is required in all public buildings, the QR codes could be conveniently placed close to this exit information for easy location. As another physical placement option, a very large QR code could be placed in an easily viewed spot that could be quickly scanned by the user 18 with the SWARM Alarm application 13 from any location in the room. Creation of QR codes is extremely inexpensive and the codes are easy to scale to add more locations or update as necessary.

The user 18 can at any time update a location in the SWARM alarm application 13 in the event the user 18 moves from the starting location when a GPS signal is not available. An embodiment of the invention enables the SWARM system 10 to monitor GPS availability and accuracy. If an accurate GPS location signal can be acquired, use of this location information overrides other manual methods to locate position. This methodology is useful in the event the user has moved from the initial location which was manually created, for example, by method I, II or III, and the user 18 does not, or is not able to, update a new manual location. By way of example, the user 18 may have moved to another room in the building. Also, if the user has evacuated the building successfully, responding personnel will have better situational awareness as GPS location data is easily acquired outside buildings and the client 12 can then provide a very accurate location to the SWARM system 10. The static data is immediately removed and replaced by the real time GPS position.

Real time location data also has utility in off-campus sanctioned school events that require monitoring for potential emergencies, e.g. school field trips, off-site sporting events or other similar activities not on a fixed educational site. The SWARM system 10 is not fixed to a particular geographic location, i.e., a particular building, campus, or similar area and the mobile client devices 12 enable dynamic mobile portability of the system. In an additional embodiment, the SWARM system 10 can create an arbitrary security boundary to enable alarm creation by users 18 who are inside this boundary. The perimeter is constructed by drawing a geo-fence around the encapsulated area, e.g. a stadium, museum, etc., which requires security monitoring during the event. A geo-fence is a closed shape on a map that outlines a particular geographic area. The geo-fence would be drawn by the dispatcher or supervisor in charge of the event within the SWARM Incident Manager 28 and is removed when the event is over.

Figure 9A:
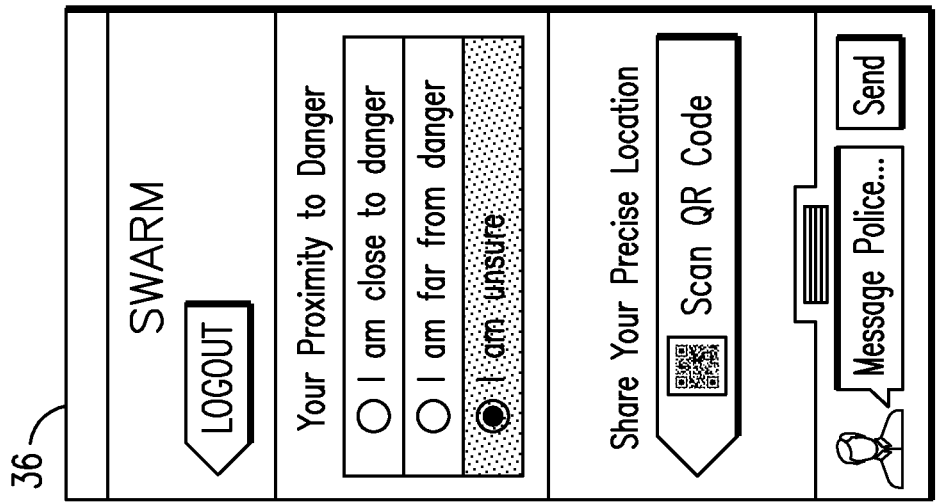

Once the alarm has been triggered successfully and the user's initial location has been determined, the user 18 can also provide additional real time situational awareness information to the SWARM system 10 utilizing the SWARM Alarm application 13. FIGS. 9A and 9C illustrate additional information that can be provided to responding personnel.

FIG. 9A illustrates a simple danger level indication that can be selected by the user 18. In this embodiment, the touch screen can provide three levels of increasing threat as chosen by selections or buttons displayed on the danger level screen 36. For example, a user 18 could select from among the options "I am far from the Danger", "I am unsure", and "I am close to the danger." The system may include filters or human judgment by which responders only view users 18 having selected the option "I am close to danger" in order to pinpoint highest priority response locations. In another embodiment the standard stoplight color indicator may be used for indicating increasing danger, with green indicating the threat is far away or "I don't know where the threat is"; yellow indicating the threat is close but that the individual is not in immediate danger and red indicating the user is in immediate danger. As an example for an emergency based on gunfire, the color selection could be made according to the loudness of gunshots as heard by the user or as registered on the mobile device. For a fire, the colors could indicate greater visual confirmation of the event: green could indicate that the user smells smoke, while yellow indicates that the user sees smoke, and red indicates that the user sees fire.

FIG. 9C illustrates a secure data link between the user 18 accessing the SWARM Alarm application 13 and responding personnel. The conversation screen 38 is enabled to allow the user 18 to text directly with a security dispatcher 18-1 or with responding security guards 18-4 utilizing a SWARM Mobile application 18-4. The conversation is utilized to send information about the emergency and receive instructions from responding personnel to the user 18. If integrated with a STING system 20, this conversation can occur with a law enforcement dispatcher 19-1 or a responding officer 19. This data link could also be extended to include photographs, audio and video information enabled by the user 18 on the client mobile device 12 so that first responders may listen and see real time visuals of the emergency.

In still another embodiment the user may choose the type of emergency from a list after determining user location, e.g. medical emergency, fire, active shooting or explosion. Once the emergency type is determined, there are options for how to provide and receive critical information. For example, if the user selects medical emergency, responders might include several medical staff and only one security guard instead of deploying a whole team of security personnel as might be appropriate for an active shooting incident. In another embodiment the SWARM Alarm application 13 may continually send information to responding personnel to gain more real time information. Temperature, user compass reading, if moving, and acceleration are additional discoverable data.

In another embodiment an emergency broadcast system notifies various users 18 who are authenticated on SWARM Alarm applications 13 of an alarm created by other users 18. Embodiments include notifying all users who are associated with a particular school organization at once or only users 18 within a particular area close to a specific alarm or a nucleus of created alarms. Messages could be created with specific instructions, e.g. evacuate immediately, lock your doors and hide or wait for further instructions. In an alarm situation, the locations of users 18 who do not create alarms can be determined to facilitate a better emergency response while eliminating the need for all users to create alarms when it is obvious there is an emergency. This real time, accurate situational awareness information provided by the school faculty members is useful for determining everyone who could be affected by the emergency.

SWARM Incident Manager Application

The incident management function in the SWARM system 10 is performed with the SWARM Incident Manager Application 28. The Incident Manager application 28 includes a display tool useful when large screen sizes are available to view graphic information normally shown on smart phone displays, e.g., when a user wants to visualize greater map detail or more easily manipulate map information. The SWARM Incident Manager Application 28 can be utilized at dispatch centers, control centers, command posts, in vehicles and in office environments by supervisors, dispatchers and others who monitor or oversee operations. The SWARM Incident Manager application 28 can also be used by authorized organizational members having notebook computers coupled to the SWARM system 10 via a network, e.g., a wireless link 22. The notebook computers may be located within security vehicles or at other locations throughout the campus.

Figure 10:
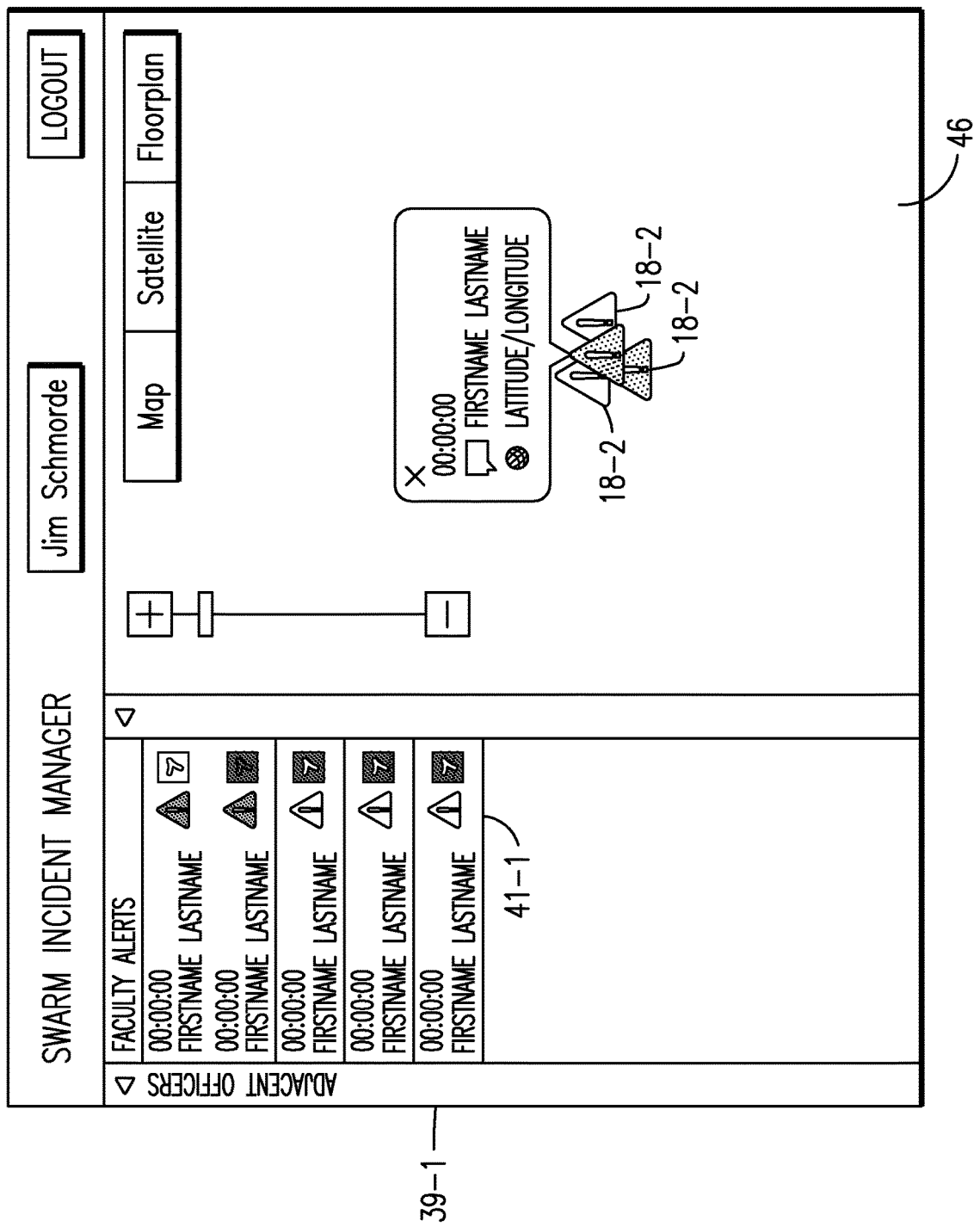
FIG. 10 illustrates a SWARM Incident Manager web-based application.
Figure 11A:
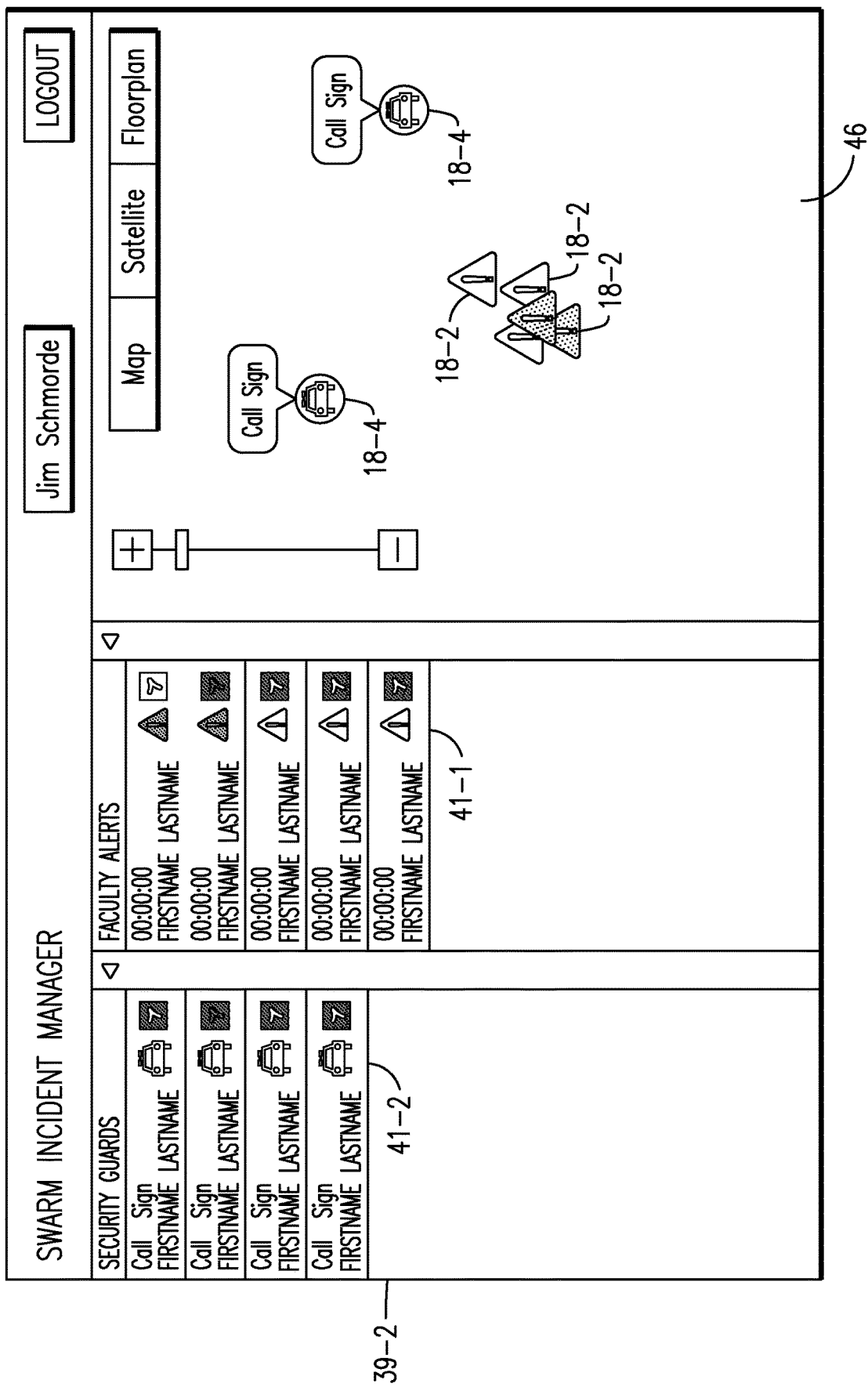
FIG. 11A illustrates the SWARM Incident Manager web-based application with both security guards and faculty alerts.

Other types of responders besides school security guards may utilize the system. During routine operations, only groups of response teams performing day-to-day operations may be shown. Examples of response teams include daily security patrol or facilities management. With reference to FIG. 11A, in an alarm situation, there are two separate lists of users: the users who are responding personnel and, as also shown in FIG. 10, a list of individual users who have activated an alarm. Responding personnel (e.g., dispatchers 18-1 and school security 18-4) have their call signs, first names, last names and current transportation modes shown in the list view. Lists of users 18 who have activated an alarm are each displayed in list form along with the time at which the alarm was activated, first names, last names and a danger level of the alarm, e.g., using a two or three tiered system such as described in FIG. 9A for the SWARM alarm application 13. The embodiment of FIG. 10 illustrates two levels of danger: a dark icon indicates that the user 18 is in immediate danger; and a light icon indicating that the user doesn't know if danger is near or the user is not in immediate danger. FIG. 10 also illustrates these two states as seen in the list view for alarmed individuals.

Figure 12:
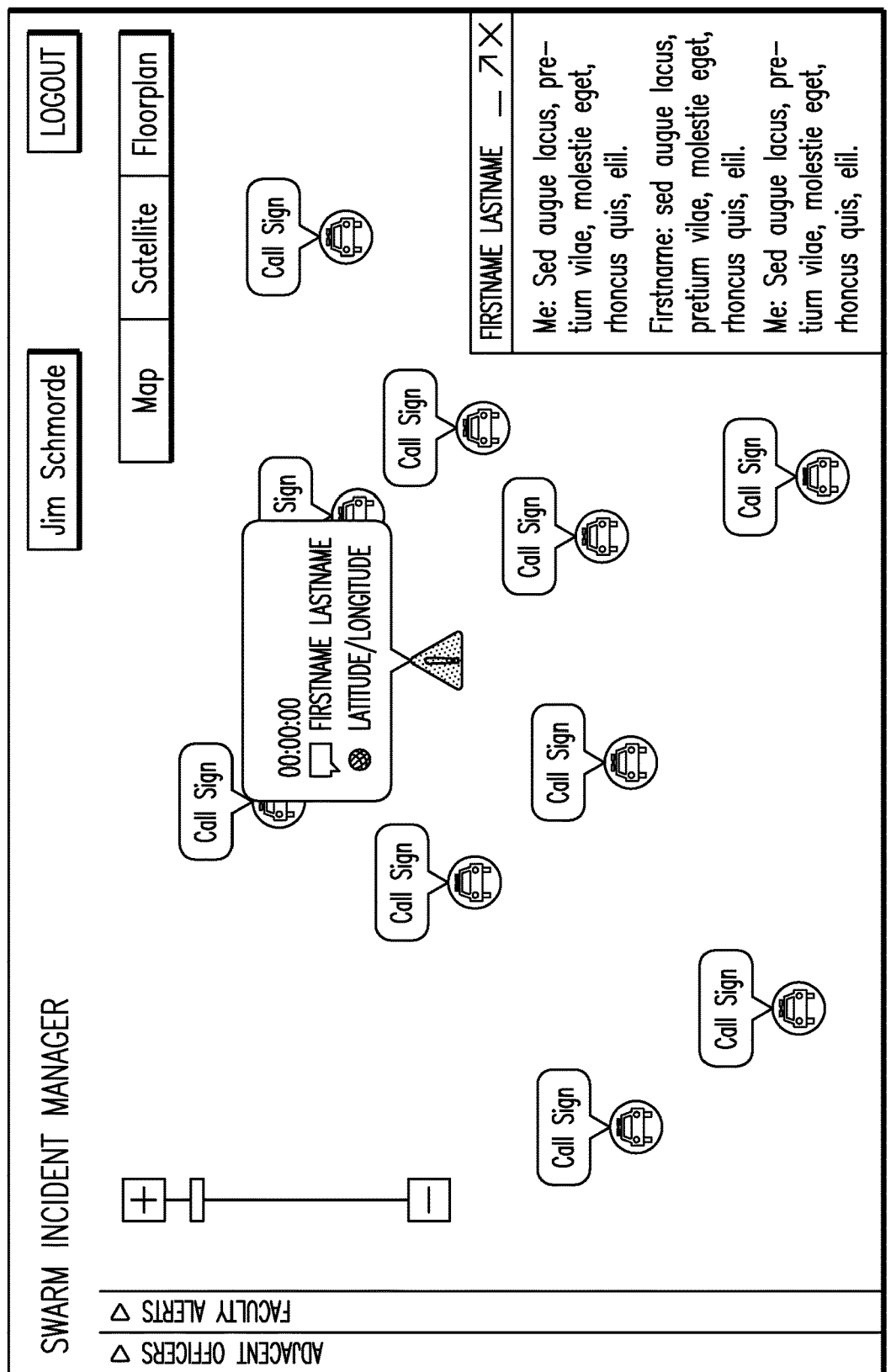
FIG. 12 illustrates a texting conversation in the SWARM Incident Manager application.

FIGS. 10, 11A and 12 illustrate sample functionality of the SWARM Incident Manager application 28. Within FIG. 10, the SWARM Incident Manager screen view 39-1 displays any alarms that have been created by faculty members. The faculty member alarm list 41-1 is located on the left hand side of Incident Manager screen view 39-1 and the locations of the faculty member users 18-2 who created the alarms are positioned on the map 46. If school security guard users 18-4 have been integrated into the SWARM system 10, the SWARM Incident Manager screen view 39-2 in FIG. 11A displays a Common Operating Picture (COP) showing both types of users. A list of faculty alarms 41-1 and a list of logged in school security guards 41-2 is presented, including school security guards 18-4 not actively polling (i.e., not collecting GPS signals and transmitting the location data to a database on the web based platform) or for whom the GPS position is uncertain. The map 46 displays security guards who have a reported location 18-4 and faculty members 18-2 who have created an alarm. An additional embodiment of the system allows for all faculty members and students, including those who have not created an alarm within the SWARM system 10, to be located on the map to assist all of the school organization in response during an emergency.

The map has functionality of the type that exists in well-known applications such as used for satellite imagery, zoom, rotation controls and a street view map option. Three options are possible to view the users on the COP: map view, satellite view and floor plan view. Another embodiment of the system is to look at individual or overlaid floor plans corresponding to multiple floors. Users who are responding personnel (e.g., school security 18-4) show up with their transportation state and call sign on the icon, and users (e.g., school faculty members 18-2 or students 18-3) who have activated an alarm show up as a hazard icon with an exclamation point. Other embodiments provide marker placement and additional information or functions which overlay the map view of the users. These may include weather information, drawing overlays, GPS history data, battery life remaining, GPS accuracy or maximum weapon firing range for each displayed user.

Figure 11B:
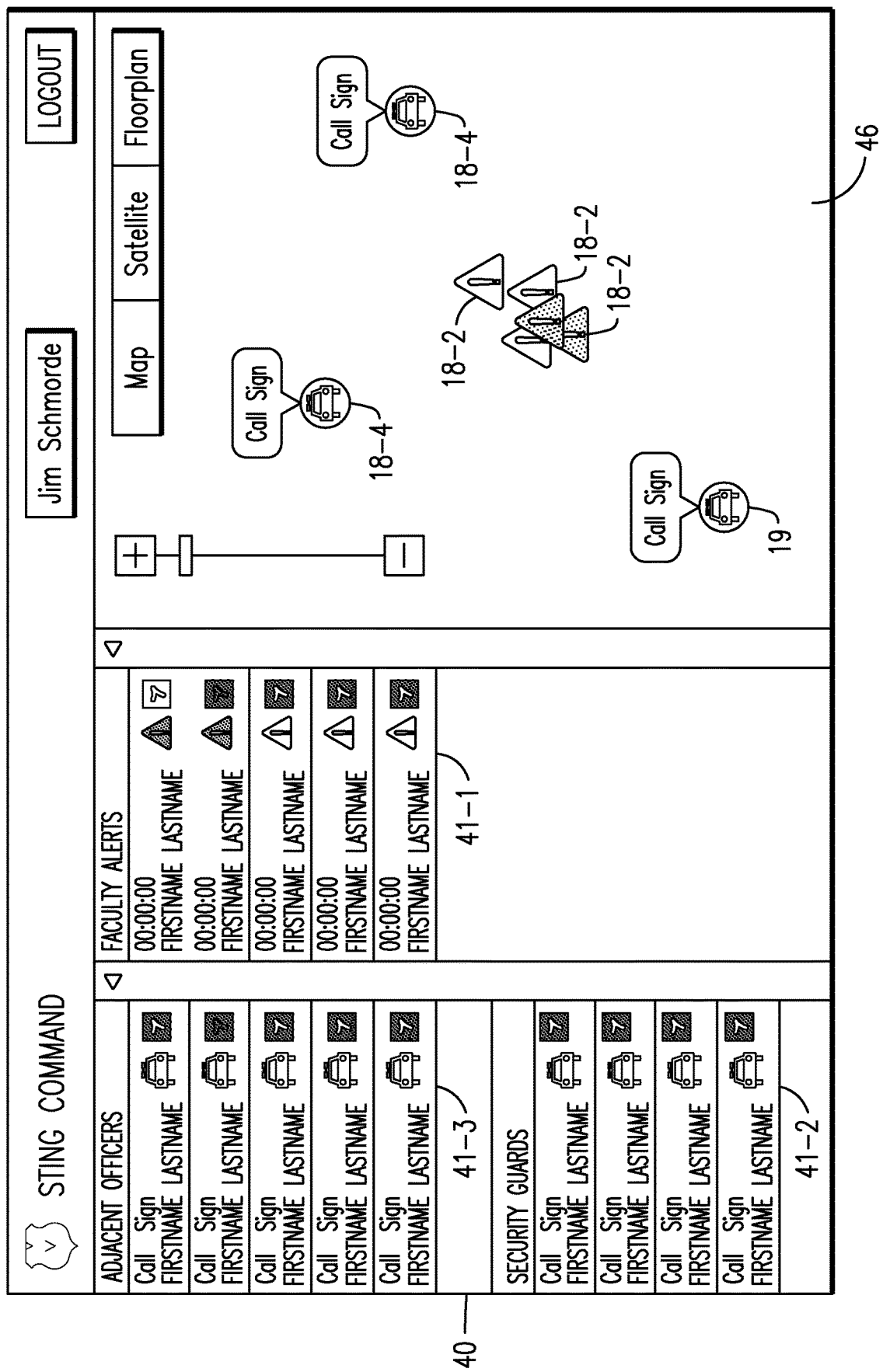
FIG. 11B illustrates a STING Command Roster/Map web-based application with law enforcement officers, security guards and faculty alerts.

FIG. 11B illustrates a response system 50 comprising an integrated SWARM system 10 and a STING system 11, with results displayed on the STING Command Roster/map application 28'. The same information is available as on the SWARM Incident Command application 28. However, as can be seen in the STING Command screen view 40, an officer list 41-3 is now available in addition to the security guard list 41-2 and the faculty alert list 41-1. In addition, law enforcement officers 19 are located on the map 46 with school faculty 18-2 and school security guards 18-4.

With reference to FIG. 12, by selecting a particular user 18, more information can be obtained in a pop-up window in the map view. In addition, a text conversation between any of the users 18 (e.g., a supervisor, a dispatcher or a responding individual viewing a display generated by the SWARM Incident manager application 28) can be started or viewed by clicking on either a user from the list or an icon on the map. The entire conversation can be monitored at once to see all communication for further response. All texts are stored in files which can be accessed by the SWARM Information Manager application 30 for later review. Additional embodiments (not shown in the figures) include a screen where all conversations can be viewed at once and with which the broadcast of messages to all users or subsets of users can be managed.

SWARM Mobile Application

After the SWARM Mobile application 15 is installed on mobile versions of the various clients 12 (e.g., smartphones), the first time each of the responding personnel (e.g., school security users 18-4) uses the application on a particular phone, the user completes his or her profile and begins mobile use of the SWARM system 10. The initial login screen and screens for the profile completion process are illustrated in FIGS. 13A-13C. At the time of the first login, the user enters the mobile application for the first time with the assigned username (e.g., an email address) and password that have previously been created in the System Administration application 26. See FIG. 13A. After the user is authenticated, the initial profile setup is completed by inserting data in the screens 13B and 13C. In this initial profile setup the user adds a call sign to his or her profile. An option also exists to include a nickname and a personal photograph. The call sign may be of any length but, in operation, only the first 15 alpha-numeric characters will be displayed during system operation. After successful completion of the screen of FIG. 13B, the user designates a transportation state on the screen shown in FIG. 13C, which selection is used to determine a particular icon 42 for placement on a map such as the map 46 shown in FIG. 15B, e.g., icons indicative of being on foot, in a motor vehicle, or on a bicycle, motorcycle or horse. The transportation state may also be used to calculate times of arrival when traveling between locations of two users, e.g. when a school security user 18-4 will arrive to provide backup. More generally, the transportation states could include boats, helicopters, airplanes and four wheel ATVs. Selections in FIG. 13C may also include particular roles in an organization, e.g. school faculty, student, medic, etc. and the icon would be visually representative of this role instead of indicating a transportation type. Therefore the transportation state would be assigned directly as the most natural possibility, for example a student on campus would have on foot transportation state. The SWARM Mobile application 15 also includes an option to add additional fields for data entry in the first login process similar to that of the SWARM Administration application 26, e.g., shift, medical training, language proficiency, weapon type or other important user attributes relevant to the organization.

After completion of the screens of FIGS. 13B and 13C, the user initialization is complete and these inputs do not need to be performed when the user logs in again. For subsequent use of the SWARM Mobile application 15, the user need only provide user name and password information to a log-in screen 50 to enter into the SWARM system 10. Also, the username is stored in the client device so that when the user logs in again with the same client device (e.g., a smart phone) for any future work period the user does not have to enter the username to effect log-in or other operations which require entry of a user name and password. In one embodiment, if the user never logs out of the SWARM mobile application 15 (e.g., during a shift) the user will always be able to access the application as a logged-in user without having to again provide a username and password entry, even after the phone has been powered off and powered back on. After initial setup, anytime the user 18-4 successfully completes the log-in, illustrated in FIG. 14C, the home page screen 52 of the SWARM Mobile application 15 appears on the display 60 of the mobile client 12 indicating the SWARM Mobile application 15 is operating in the SWARM system 10.

FIG. 14A illustrates the screen 60 of a mobile, handheld version of a client 12 while FIG. 14B illustrates a settings menu 64 of the application 15 displayed on the screen 60 and FIG. 14C illustrates the home page screen 52 of the SWARM mobile application 15. From the home page screen 52 the user 18 can access different functionality screens to view and create information on the client 12. The SWARM Mobile application 15 provides a true Common Operating Picture (COP), i.e., a common visualization among all users of the application 15 of important assets and information in a single view, which may be in a list format or a map view. This enables multiple users in the organization to view the same operational information. In the context of a public safety or security organization (e.g., in a school), all users can visualize the same information in a common view of themselves as well as others in the organization. The system 10 also provides the ability to collect, distribute and view critical information among a select group (e.g., subset) of users for sharing and retention. The information may be created by a user or shared by one user among other users.

Figures 15A, 15B, 15C:
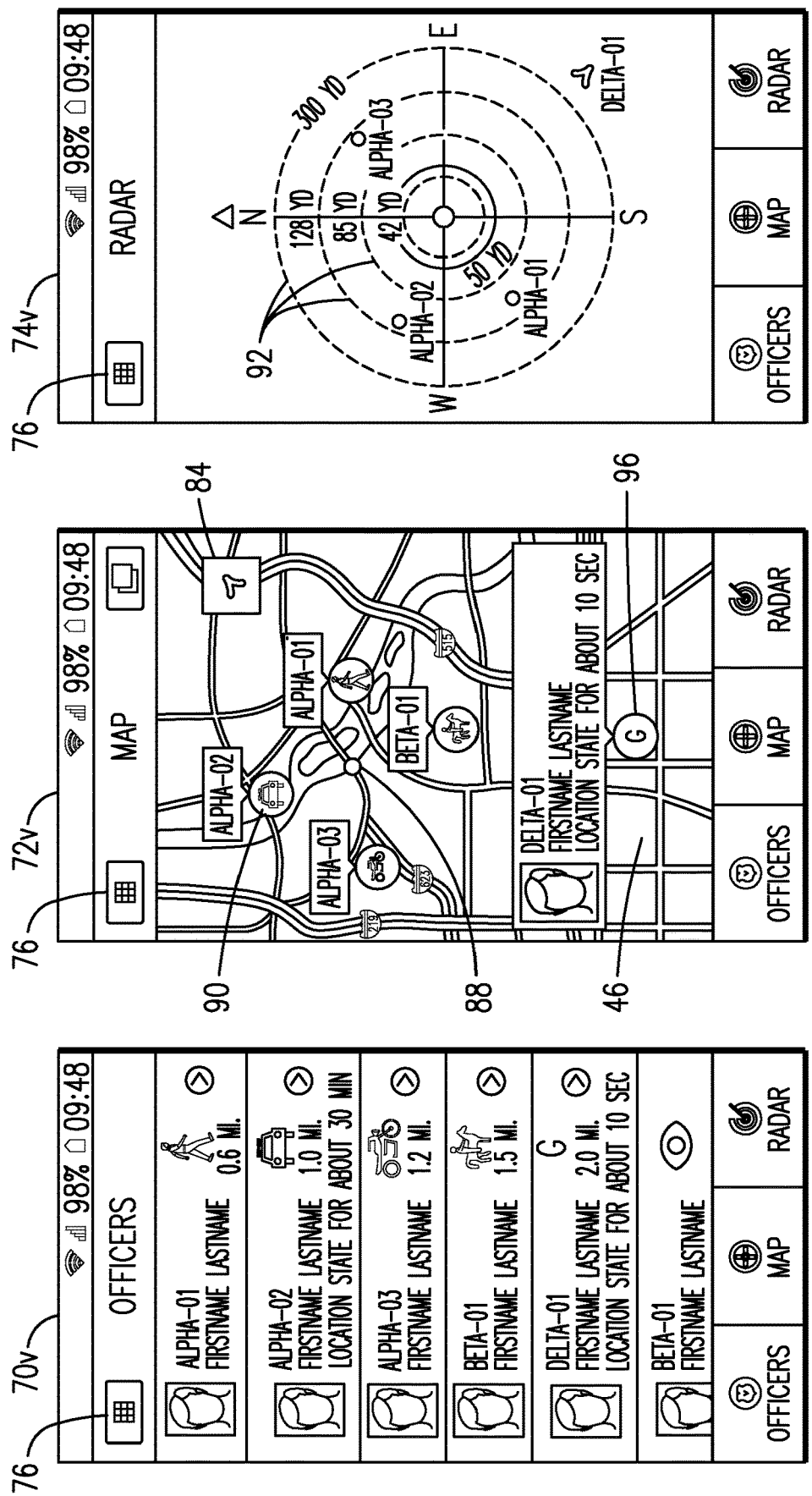
FIGS. 15A, 15B and 15C illustrate list, map, radar and roster screen views for the SWARM Mobile application.
Figure 15E:
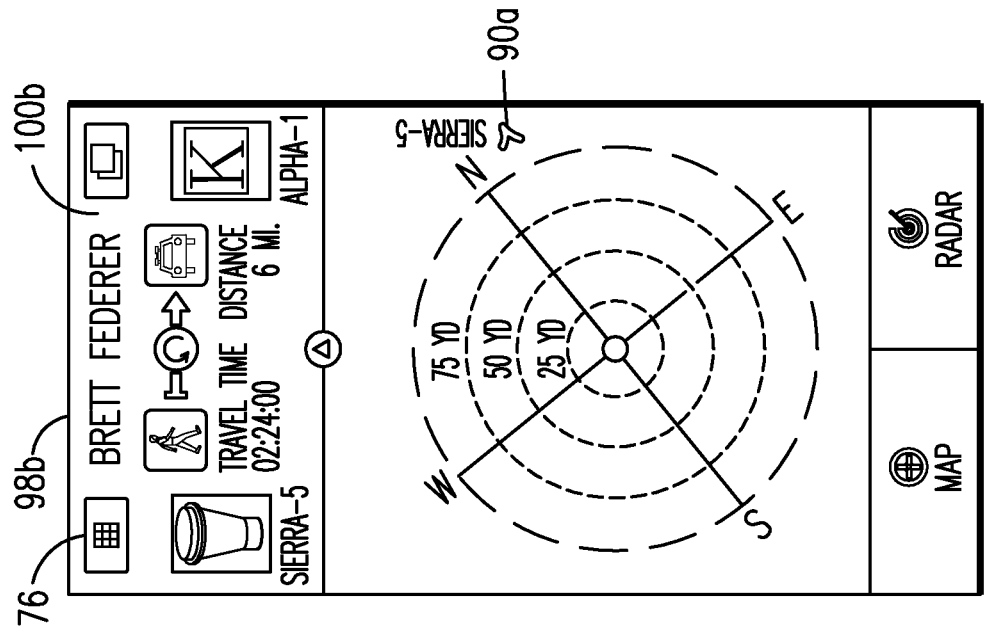
FIGS. 15D and 15E illustrate the map and radar screen views in isolation for the SWARM Mobile application.

The SWARM Mobile application 15 is a native application for mobile devices which provides improved response times and enhanced user experience over a web application. Operating the SWARM Mobile application 15 in the native mobile environment is advantageous because it offloads operations from the SWARM services software 20 to the SWARM Mobile application 15 that can be more quickly performed locally in the client device 12 and which are too difficult or resource intensive to serve to the mobile client device 12. For example, graphical static interfaces, as shown in FIGS. 15A, 15B and 15E, that are repeatedly utilized by the user 18-4 are better created and stored in the mobile application. Creating an active compass based radar screen 74v would also be too intensive to be performed quickly on the server 14. The continuous need for gyroscope readings from the phone to adjust the orientation of the radar would not function as smoothly as processing the adjustments directly within the mobile application 15. Hence some system computations are better performed on a local, i.e., mobile client, level to minimize network traffic and avoid speed limitations that would otherwise affect overall application performance. In the illustrated embodiments each of multiple mobile client devices performs local computations to generate data which is used by and among other devices, at times in native applications. The shared usage is provided through the server which acts as a hub to transfer data between the clients 12. Use of local memory 234 in the client device enables the system 10 to deploy or process resource intensive data operations in the mobile device, including setup information such as user lists and map data.

Processing speed is another advantage of executing the functions of the SWARM Mobile application 15 as a native application as opposed to an application stored on a server and which is processed one line at a time by the mobile client's JavaScript or HTML interpreter. Because the SWARM Mobile application 15 is written for the hardware platform of the mobile client, it runs faster than an application in which all or some parts of the software are downloaded from the Web each time it is run. No translation processing is required. Performance capabilities are not dependent on server interaction and, instead, function independent of the network. Data generated locally can be temporarily stored and used on the native application 15 or otherwise used on the mobile device and uploaded to a network computer at a later time. The overall user experience can be optimized with this approach. In doing so, the SWARM Mobile application 15 can be customized for viewing presentation based on the exact screen size and mobile device functionality of each client, as opposed to a "one size fits all" approach typical of web applications which centrally process information and transfer results to mobile devices. This distributed software architecture avoids performance limitations arising because web applications, in general, are relatively slow and more prone to network service issues.

The home page screen 52 of FIG. 14C presents the user 18 with eleven options to select from. Core functionality is accessed on the client device touch screen display 60 through six relatively large square buttons while the settings and secondary functions are accessed with smaller buttons. The settings menu 64 for the application is accessed by making touchscreen contact with a settings menu button 66, in the upper right hand corner of the home page screen 52, containing an image of a sprocket. Within the settings menu 64, the user 18 may choose to change the password, adjust the screen brightness or receive updates for the application 15. The user can also logout of the application from the settings menu 64.

Three large buttons 70, 72, 74 on an upper half of the home page screen 52 provide access to (i) a list view of users 18 who are responders, including school security 18-4, and (ii) positional information for some or all of the responders, e.g., based on distance from the location at which an alarm situation has occurred. Generally, the positional situational awareness is visualized through any of multiple display formats which indicate the location and status of responders within a predefined distance of the user 18-4 viewing the COP or the location of a user 18-2 and 18-3 who has initiated an alarm situation. The display options of the illustrated embodiment are accessed via the three buttons 70, 72, 74 which, from left to right, provide access to the display screens 15A, 15B and 15C, respectively: a list view 70v of responders, a map view 72v of the COP and a radar view 74v of the COP. The user 18 can return to the homepage at any time by pressing the home button 76, illustrated as a box containing 9 small squares. In the list view 70v, users 18 (e.g., responders) are sorted by linear distance from the user viewing the list to each of the other users 18 within the predefined distance. Each of the users within the predefined distance is identified by first and last name, along with a personal photograph, a call sign and transportation state. Users who are logged into the mobile application but who (i) are outside the predefined distance, or (ii) have polling turned off, or (iii) cannot otherwise be located (e.g., users logged into the browser applications only); appear at the bottom of the list. Including these users in the list ensures that everyone logged into the system is accounted for. The map view 72v displays all users who are within range of the current boundaries of the map 46 on the client screen 60 and who have an active position location on a map or satellite representation. The map 46 can be zoomed in or out to observe greater or less map detail. Pressing the identification arrow 84 in the upper right hand corner of the map view 72v centers the map on the user operating the mobile client device. As the user moves with the mobile client device, the map remains centered on that individual. The transportation state and call sign of each user is displayed in the map view 72v with an icon for ease of identification.

The radar view 74v is useful for close-in visualization of users 18 and also provides a compass-like orientation to quickly determine pointing directions along which other users are located relative to the client 12 on which the other users 18 are viewed. The range is adjustable by swiping a single finger up and down on the radar screen. In the map and satellite views, the position of the user 18 in possession of the client is indicated with a colored (e.g., blue) dot 88, while other users are displayed as colored (e.g., green) icons 90 and while school faculty members 18-2 are displayed as other icons 96 of other color or shape. In the radar view, the position of the user possessing the mobile client 12 is at the center of the radar view, while other users are shown as dots according to a color code that distinguishes, for example, school faculty members 18-2 from students 18-3. Custom color selection for each icon within the SWARM Mobile application 15 or within the web applications is an option. The radar view includes the display of a series of concentric rings 92 which are highlighted in different colors to represent the effective firing range of a weapon from the position of each armed user viewed on the display. The embodiment includes provision of two standard concentric ring sizes 92 which are fifty yards or meters, to represent the range of a pistol, and three hundred yards or meters to represent the range of a rifle. The radar view 74v may also be centered on a different user 18, such as a faculty member 18-2 or student 18-3 to provide distance information which may be more pertinent to responding to an alarm set off in a school. This helps responders determine whether other users are potentially within a line of fire or if it is possible to hit an individual or object, provided that other information displayed within the radar view accurately approximates relevant distances. Users for whom the position is considered inaccurate or uncertain may be shown with gray icons.

Figure 15D:
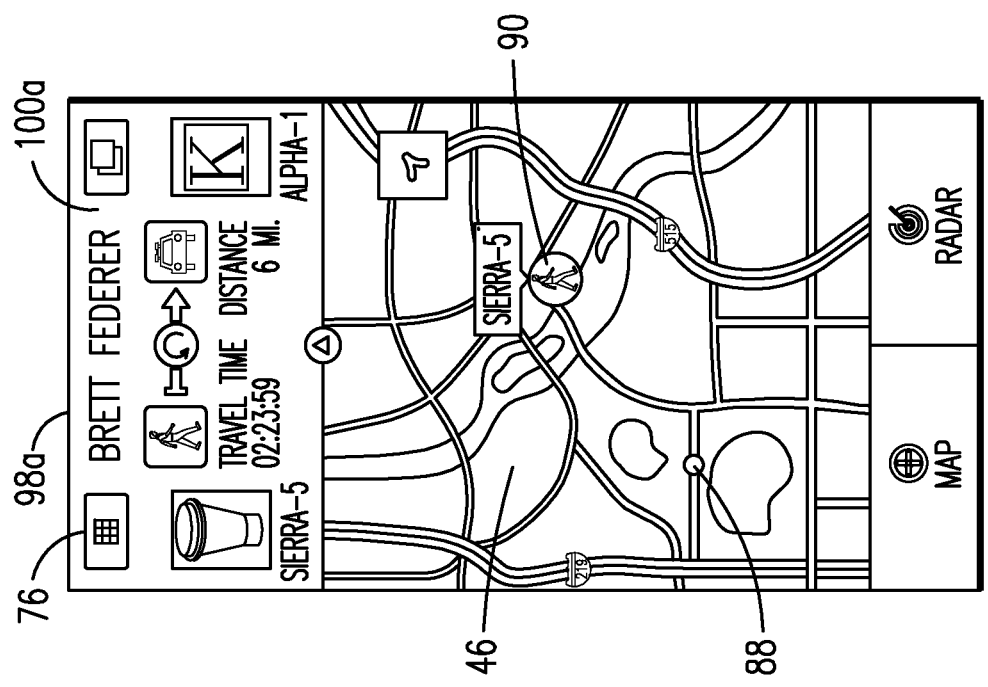

FIGS. 15D and 15E illustrate an isolation map view 98a of the SWARM Mobile application 15 in which a single user 18 (e.g., school security 18-4), is represented on the map 46 by an icon 90 (as shown in FIG. 15B). The icon 90 is shown isolated with the viewing user 18v (i.e., the user in possession of the client device which generates the view). In FIG. 15D the viewing user 18v is represented on the map 46 by the user dot 88. The viewing user 18v and the dot 88 each indicate the person in possession of the client device which generates the isolation view 98a. Within the isolation radar view 98b the single user 18 is represented by the radar icon 90v and the viewing user 18v is at the center of the radar screen. This de-cluttering allows the viewing user 18v to quickly and easily locate one individual. This can be especially important when the viewing user is in a stressful or distracting environment. To generate an isolation map view 98a for a particular user, the viewing user can click on that individual in the list view 70v of FIG. 15A. Also, as shown in FIG. 15E, after clicking on the icon of an individual user 18 the SWARM Mobile application 15 displays a pop-up box screen 100a and 100b providing the full name, photograph and call sign of the user as well as other useful information. Then, by tapping on that user icon a second time, pop-up box screen 100a and 100b is removed as the display transitions to show the full isolation view 98a. The isolation radar view 98b is displayed by pressing the radar button at the bottom of the screen 72v. The user 18 can move back to the isolation map view by utilizing the map button at the bottom of the screen 98b.

Within the isolation view 98a, the viewing user 18v can center the map on the individual of interest by pushing the identification arrow 84 towards the upper right hand corner in the map. By accessing a pull-down box 100a in the header at the top of the screen, the user can view additional information about that particular user or the person's location. One advantageous parameter is the ETE (estimated time in route) in the pop-up box 100a and 100b which is labeled TRAVEL TIME. The ETE is a computation of an estimated amount of time required for that individual to arrive at the viewing user's location, taking into account optimum routing, traffic and transportation state as, for example, made available through a map service. The computation of the ETE is for each of two directions of travel, i.e., from the viewing user to that individual and from the individual to the viewing user.

Returning to FIG. 14C, below the list, map and radar view buttons 70, 72, 74, are three relatively small setting option buttons. The first (left-most) setting option button 104 allows the user to update the call sign and photograph. The second (middle) setting option button 106 allows the user to modify the position polling rate which can be adjusted up or down to save battery life. Current polling options in the application range from the fastest position capture, based on the processing characteristics within each mobile device, to periodic position capture at a slow interval setting, e.g. every 60 seconds. The user can also turn tracking off to save battery life or when at locations where it is not important or possible to receive location information. The last (rightmost) button 108 of the three on the middle part of the dashboard allows the user to modify the transportation state.

With further reference to FIG. 14C, three large buttons 110, 112, 114 on a lower half of the home page screen 52 incorporate several typical smartphone functions. The leftmost button 110 accesses a text note application 110a. The middle button 112 accesses a photo capture application 112a, and the right-most button 114 accesses a user notebook viewer application 114a.

The SWARM system 10 provides a high level of integrated functions resulting from the client-server distributed networking architecture. When a user 18 is logged into the system 10 the applications 110a, 112a and 114a function entirely within the system network and in accord with constraints imposed to control storage and access to the application data. In the disclosed embodiments the constraints are consistent with those of the STING System 11 for law enforcement activities and evidence considerations. Specifically, provision of the SWARM Mobile application 15 and the SWARM Information Manager application 30 assures that, after data is generated on the mobile client device, the data cannot be permanently stored or retained on the client device of the user that generated the data. Nor can the data be stored or retained on the client device of any other user that is permitted to view the data. Integration of the SWARM Mobile application 15 with the server-based Information Manager application 30 enables the users 18 to quickly collect and share information and quickly view information shared by other users. The information can be collected as a combination of text and photographs (referred to as photo notes) which are created using the text note button 110 and the photograph capture button 112 on the home page screen 52. Further, the server-based SWARM Information manager application 30 enables capture and integration into the SWARM system 10 of audio, video, accelerometer and other sensor data, also subject to constraints imposed to control storage and access to the application data. The foregoing data can be viewed with the Information Manager application 30 by pressing the Notebook button 114.

Figures 16C, 16D:
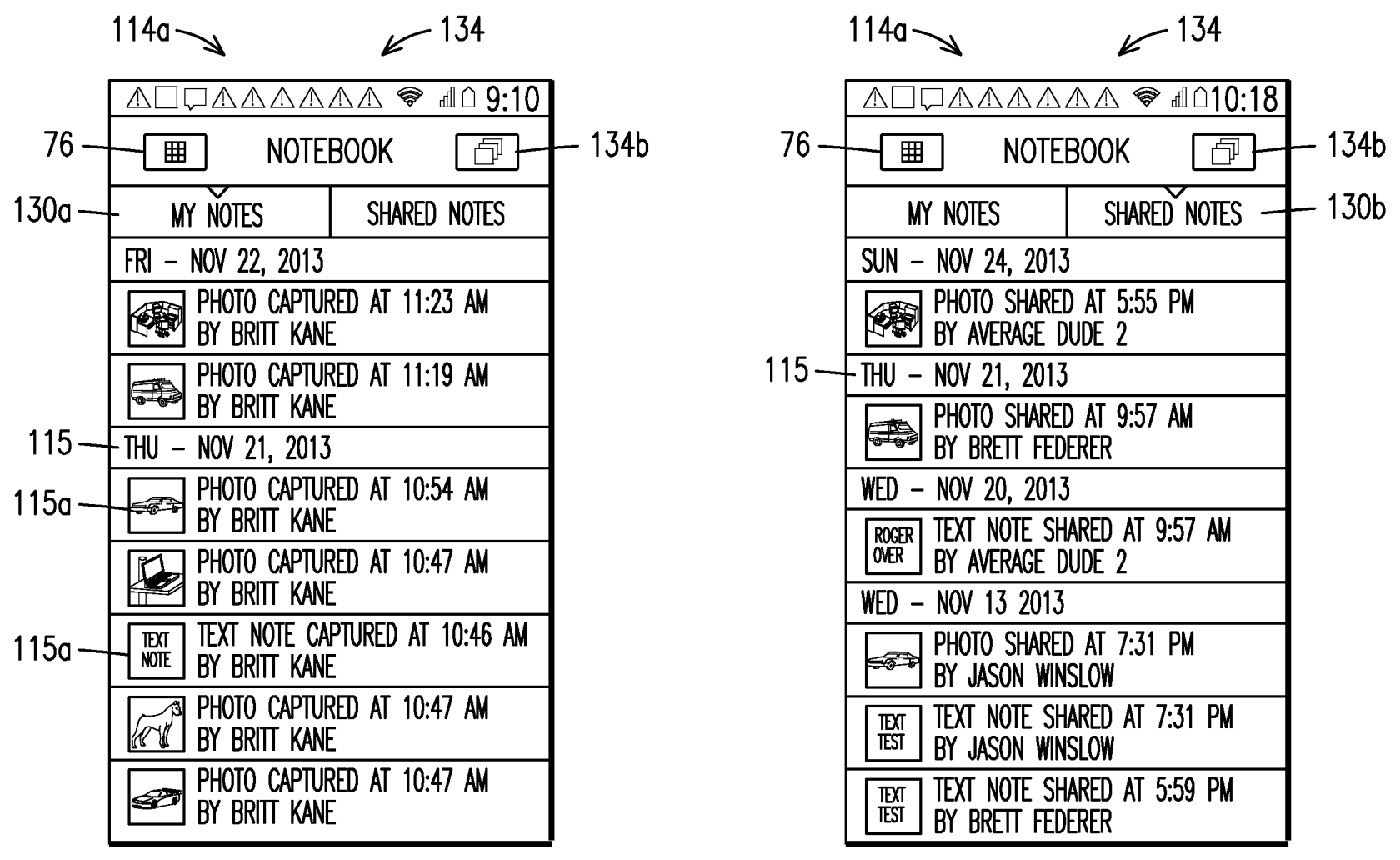

With reference to FIGS. 16A through 16D, the text note application 110a, the photo capture application 112a and, with reference to FIGS. 16C and 16D, the notebook viewer application 114a may each be a pre-existing mobile client native software application designed to run in an original operating mode on the particular client device to ensure compatibility with the client device. In addition, these applications are also configured in a second operating mode, a SWARM text operating mode, which only runs when the application is launched from a screen generated on the display by running the SWARM Mobile application 15. The text entry mode of the text note application 110a enables a user 18 to type a note, i.e., generate text note data 110t, with a graphical keypad 120 on the touch screen display 60, or to use a speech-to-text option such as is available on many smart phones to generate recordable data. In both embodiments, the data 110t is held in volatile memory only (e.g., RAM) when data is created or presented for the creator to review. The voice-to-text option may require a connection to the internet so that the appropriate OS, e.g. Android, iOS, etc., may correctly interpret the desired entry. After pressing a DONE button 97 on the touch screen display 60, the text note data 110t is uploaded to the server 14 and saved to the database 24, and the display 60 returns to a view of the home page screen 52. The SWARM Mobile application 15 also deploys the pre-existing mobile client native camera application in a reconfigured SWARM operational mode, as the photo capture application 112a to generate photo note data 110p. The SWARM operational mode only runs on the client device when the application is launched from a screen generated within the SWARM Mobile application 15. Initially, the photo and note data is retained in volatile memory (e.g., RAM) and presented on the display 60 for the creator to review. The user may delete any acquired photograph data 110p by using the smartphone back button or by not accepting the photograph in accord with typical operation of a native camera application. Choosing acceptance of the photograph or deleting the photograph results in display of the home page screen 52. The client 12 will also include metadata as part of the text data 110t or photo data, e.g. time, data, compass orientation, position, name of the user who has logged into the system 15 through the particular client 12, phone identification, etc. as further documentation characterizing or authenticating the information and for compliance with reporting requirements of the organization.

Figure 16E:
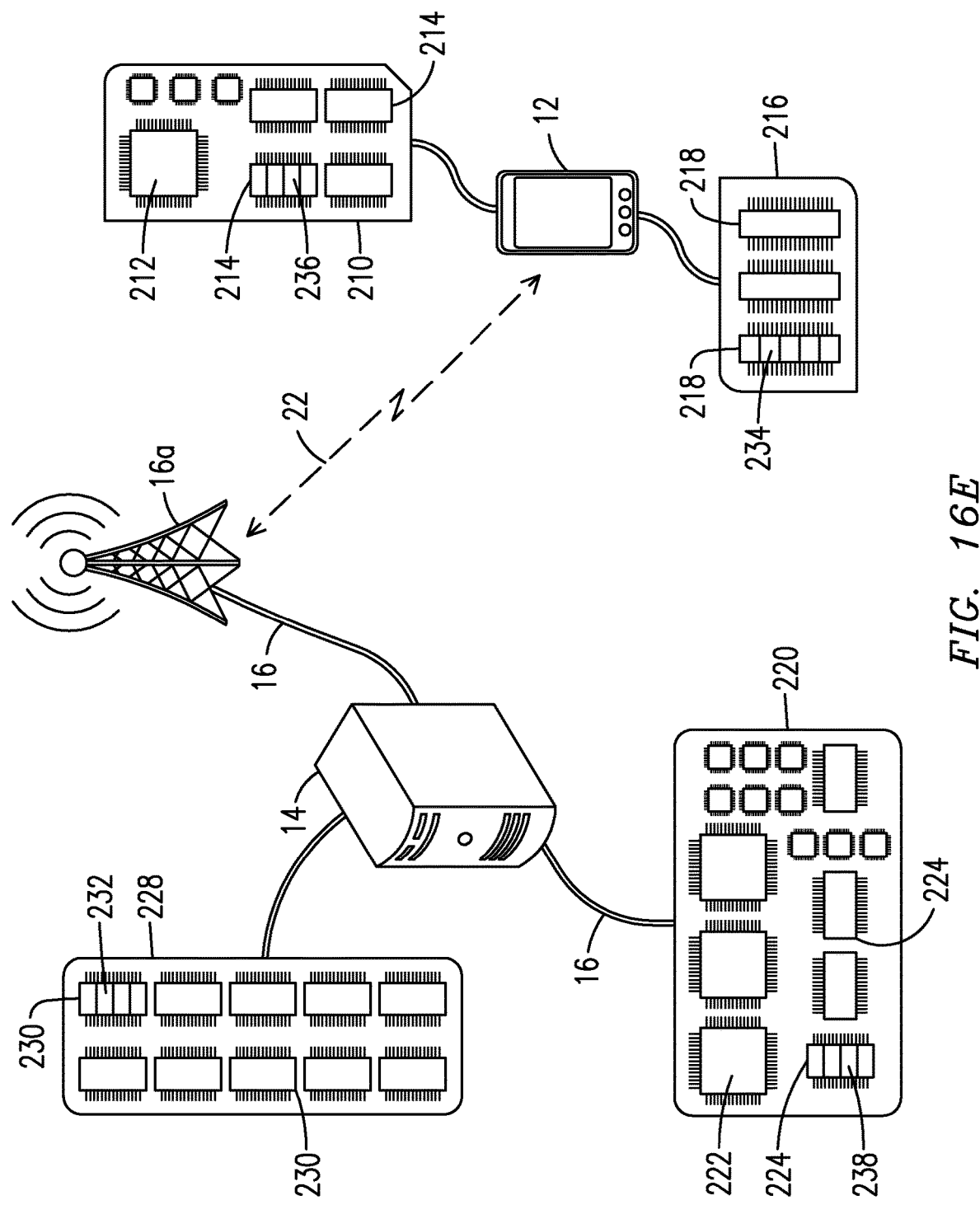
FIG. 16E illustrates the physical components of a server and a mobile client device of the SWARM system and the STING system.

Referring also to FIG. 16E, exchange of information between the server 14 and mobile client 12 occurs after creation of either text note data 110t (e.g., a text file), or photo note data 110p (e.g., including an image from a camera). Components within the server 14 include (i) a server CPU circuit board 220, on which resides a server processor 222 and a volatile memory medium 224, and (ii) a server storage circuit board 228 comprising server non-volatile storage media 230. FIG. 16E also illustrates several components within the hand-held client device 12: (i) a smartphone CPU circuit board 210 comprising a device processor 212 and a client volatile storage medium 214, and (ii) a client storage circuit board 216 with a resident client non-volatile storage medium 218. Both server non-volatile memory 230 and client non-volatile memory 218 may also reside on their respective CPU circuit boards 210 and 228. The storage media 214, 218, 224 and 230 each have separately addressable memory locations: client volatile addressable memory blocks 236, client non-volatile addressable memory blocks 234, server volatile addressable memory blocks 238 and server addressable non-volatile memory blocks 232. These separately addressable memory locations may be utilized by the situational awareness system to store data which is not accessible outside the SWARM system 10.

Figure 17A:
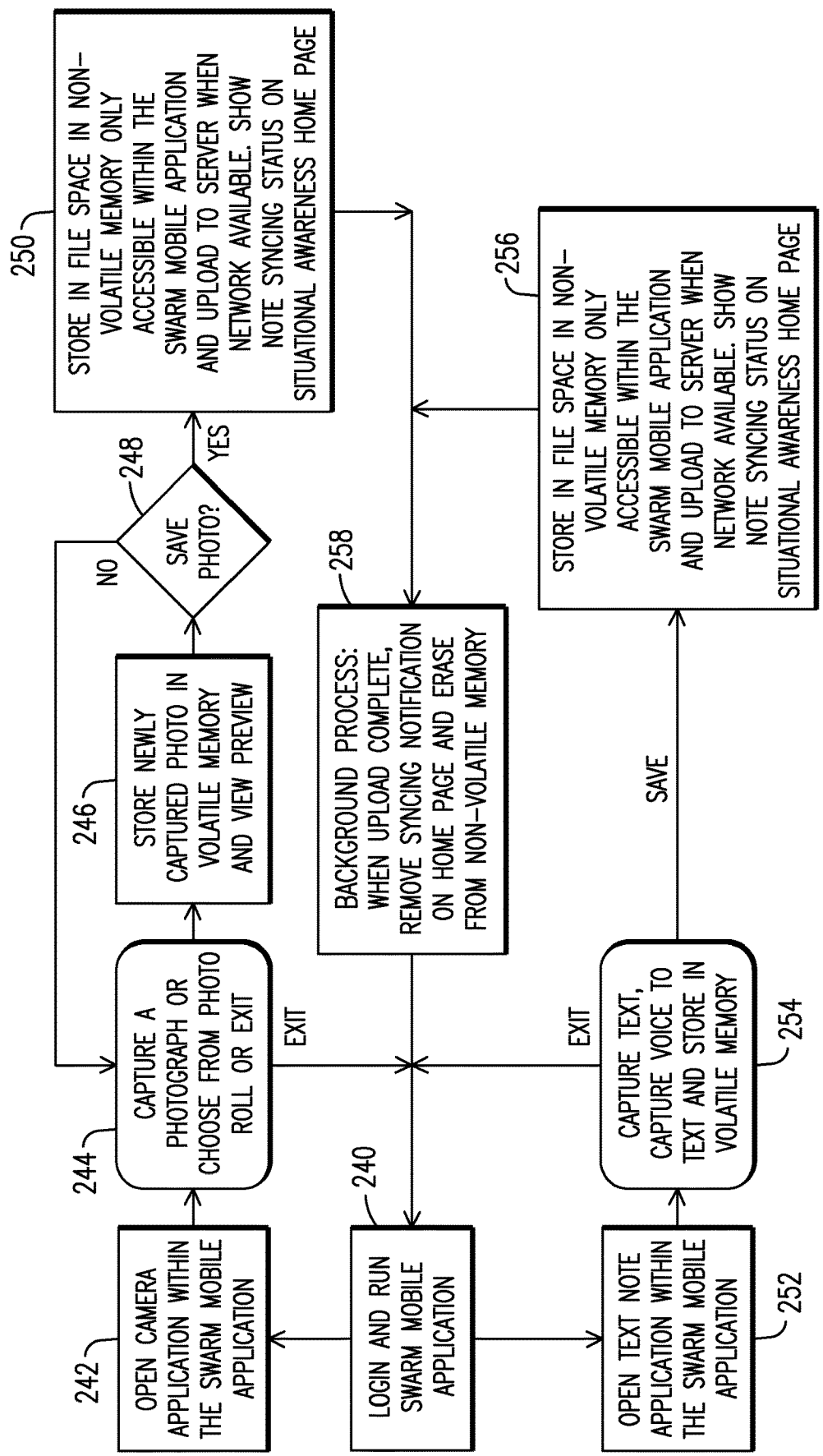
FIGS. 17A and 17B illustrate a situational awareness system process for text note and photograph creation within the SWARM Mobile application.
Figure 17B:
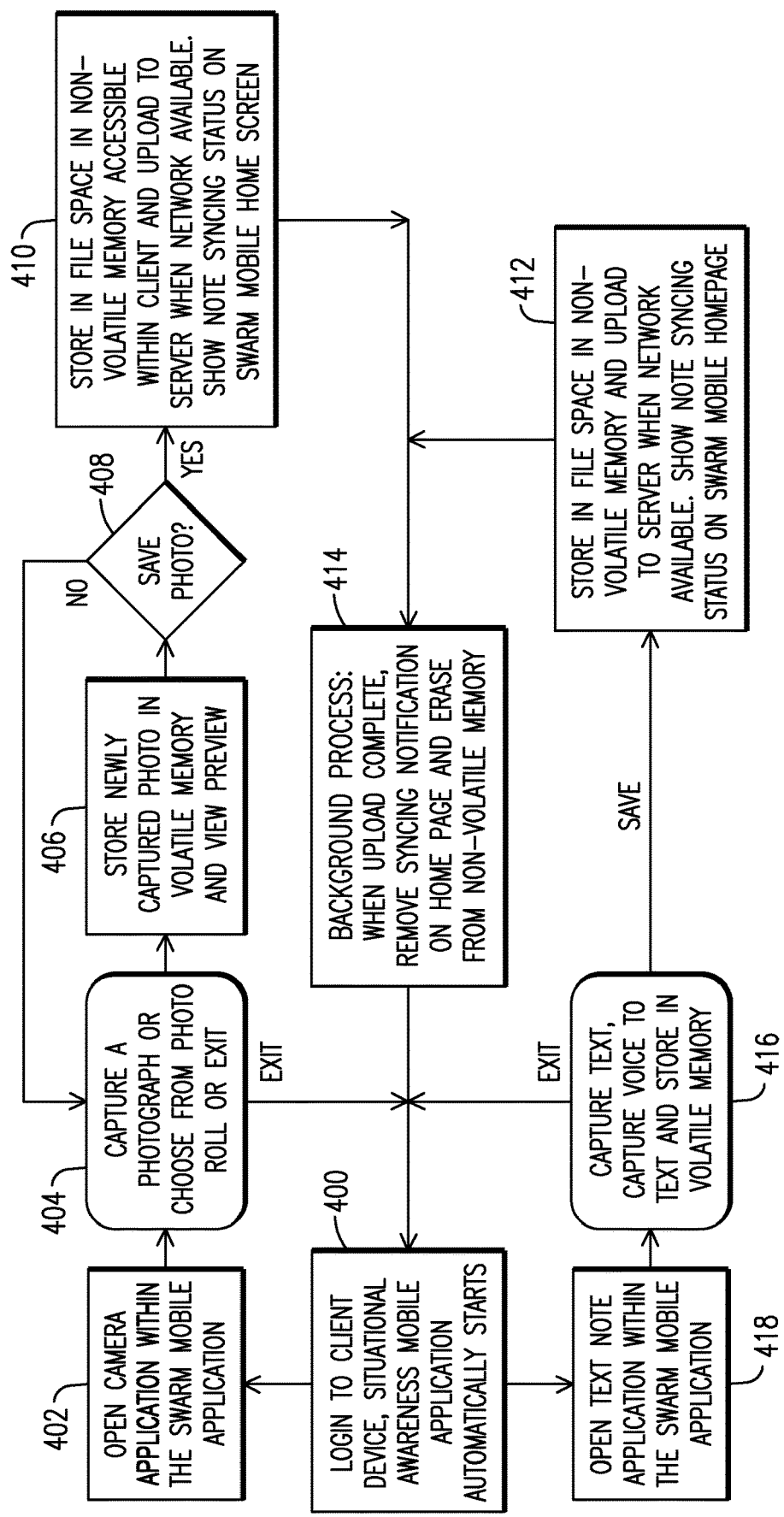

FIG. 17A illustrates an embodiment of a process for capture of a text note or photo image note. After the login step 240, creation of a text note or photo note begins with the selection of capture photograph 242 or capture text note 252 with the client 12, using the text note capture application 110a or the photograph capture application 112a. As previously noted, the text note application 110a and the photo note capture application 112a may be applications resident on the client 12 which are selectively reconfigured for operational modes with the SWARM system 10. The text note application 110a or photo note capture application 112a may also be custom built for the SWARM Mobile application 15. After initial capture of a photo note or a text note is complete for a photograph 110a in step 244 or a text note in step 254, the data is temporarily stored within the client volatile storage medium 214 under the control of the client processor 212 in both steps 256 or 246 in a memory storage location known to the SWARM Mobile application 15. The data may be uploaded to the server 14 and removed from the volatile memory 218 (e.g., RAM) in the client device. If the user 18 aborts either process then the text note data or photo note data is erased or can be overwritten in client volatile memory 214 upon next capture of text note data or photo note data. If the user elects to save the text note data 110t or the photo note data 110*p*, the data may be next written to the non-volatile memory 218 of the mobile client 12 and stored in a file space on the client 12 which is only accessible to the user, i.e., only when the user of the client is logged into the SWARM Mobile application 15 as shown in steps 250 and 256. In step 258, the text note data 110*t* or photo note data 110*p* is retained in the non-volatile memory 218 until it is uploaded to the server 14, under control of the server processor 222 for storage in the server non-volatile storage medium 230. After storage on the server 14, the note data is removed from the client non-volatile memory 218 so that the client processor 212 can no longer directly access the data from the client non-volatile memory 218. To effect uploading the text note data or photo note data to the server, the client device initiates a service request to upload the note data to the server. An alternate embodiment of the SWARM system 10 does not require that the photo note data or text note data be moved to client non-volatile 218 memory but, rather, the data may be directly uploaded from the client volatile memory 214 to the server 14.

Upload of text data 110*t* and photo data 110*p* begins immediately after capture so long as a network connection is available. If a network connection is not available, the client 12 continually tries to access the server 14 to upload the data. When a network connection is created, and the server 14 is accessed, the server acknowledges that the note data is to be uploaded and establishes a location in the database 24 to store the data within the user's account. The server creates a file access permission matrix which indicates owner identification and includes an initial list of potential viewers authorized by the owner. The owner is the user for whom the client 12 uploaded the data 110*t*, 110*p* and the viewers are other users first selected by the owner to have access to view the note data when the data is initially shared by the owner. Hence, viewers are the set of, or a subset of, all other users within the organization who have initially been given access to the note data by the owner. Once the viewers receive access to the note data, they can allow other users access to the data without the owner's permission. However, once the note data is uploaded to the database 24, only the owner may delete the note data from the server database. After the data upload has been confirmed by the server, a message is sent back to the client 12 that the upload is completed. The SWARM Mobile application 15 then deletes the note data from the non-volatile memory in the client 12. Visual confirmation of upload activity is shown on the home page screen 52. The status of the upload process is displayed in the synching notification area 124 in the lower left hand corner of the home page screen 52 as shown in FIG. 14C. If an upload is pending or in process, a syncing icon 126 displaying the number of notes waiting to be uploaded will be spinning. When all notes have been uploaded, the syncing icon is no longer spinning and an "ALL NOTES SYNCHED" message is displayed.

Activation of the Notebook button 114 shown in FIG. 14C initiates the notebook viewer application 114*a*, to present options to view contents of either a My Notes folder 130*a* or a "Shared Notes" folder 130*b*. See FIGS. 16C and 16D as well as FIGS. 18A, 18B, 18C, 18D and 18E. The My Notes folder 130*a* provides a line item listing 115 in chronological order of all available notes created by the user 18 of the client 12. This view presents the files in daily groups with each group placed under a header indicating the day, e.g. Monday, Tuesday, etc. and the date, i.e. Nov. 18, 2013 on which each file was created. Line items in the listing contain the thumbnail 115*a* of each photograph or text note, the time of day the note was created as well as the creator's first and last name. The user may see a detailed view of the text or photo note he or she has created by clicking on that particular line item. This displays a copy of the note for viewing on the client device. With reference to FIG. 18B, a screen 302 containing text note data 110*t* illustrates an entire text note saved on the server 14. With reference to FIG. 18C, a screen 304 containing photo note data 110*p* displays a full photograph saved on the server 14. When the selection is text note data, the user can edit that note data from this view using the edit button 500 in the upper right hand corner of the screen 302. In an alternate embodiment of the SWARM system 10, a history of all edits to the note data can be stored in the server database 24 for purposes of preserving file integrity and tracking data. The Shared Notes folder 130*b* shown in FIG. 18D contains a line item listing 115 of files made available to the user by the server in a chronological order of file sharing dates similar to the format of the My Notes folder 130*a*, but containing data provided to the viewing user by other users. In FIG. 18D, the name of the user who has shared the data is shown in each of the line items of the listing 115 along with the thumbnail 115*a* that was shared and the time the note was shared. With reference to FIG. 18E, text note screen 308 displays data of an entire text note saved and shared on the server 14. Similarly, photo note screen 310 displays a full photograph saved and shared on the server 14. In the Shared Notes folder 130*b*, a viewing user may remove note data from the line item listing 115 as seen by the viewing user, but not as seen by other users. The viewing user cannot delete note data from the server database 24.

Figure 18F:
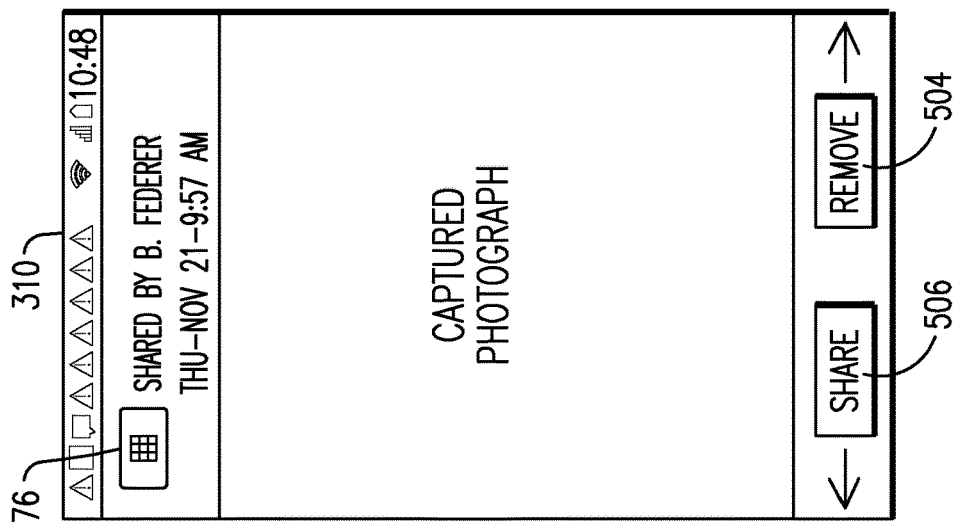
FIGS. 18D, 18E and 18F illustrate screen views for features relating to viewing shared notes, sharing notes with users and removing notes with the SWARM Mobile application.
Figure 18E:
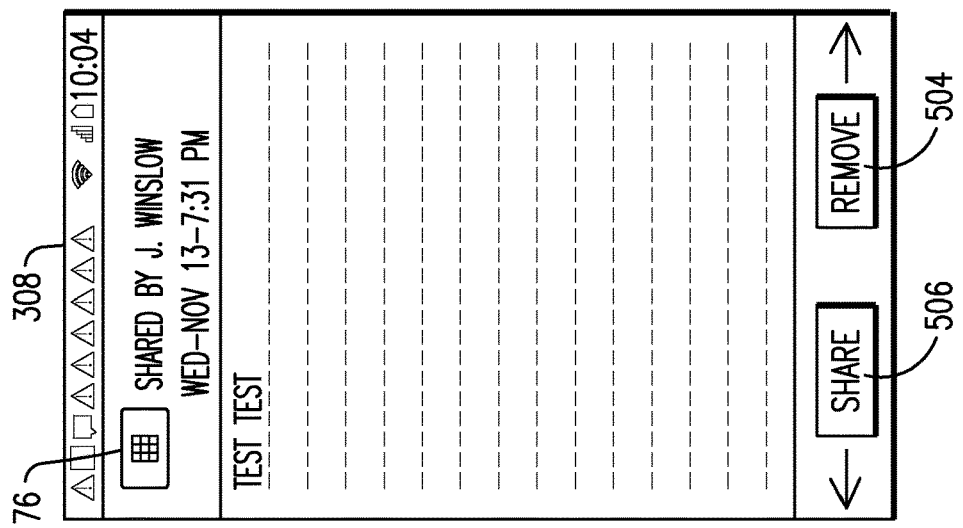
Figure 18D:
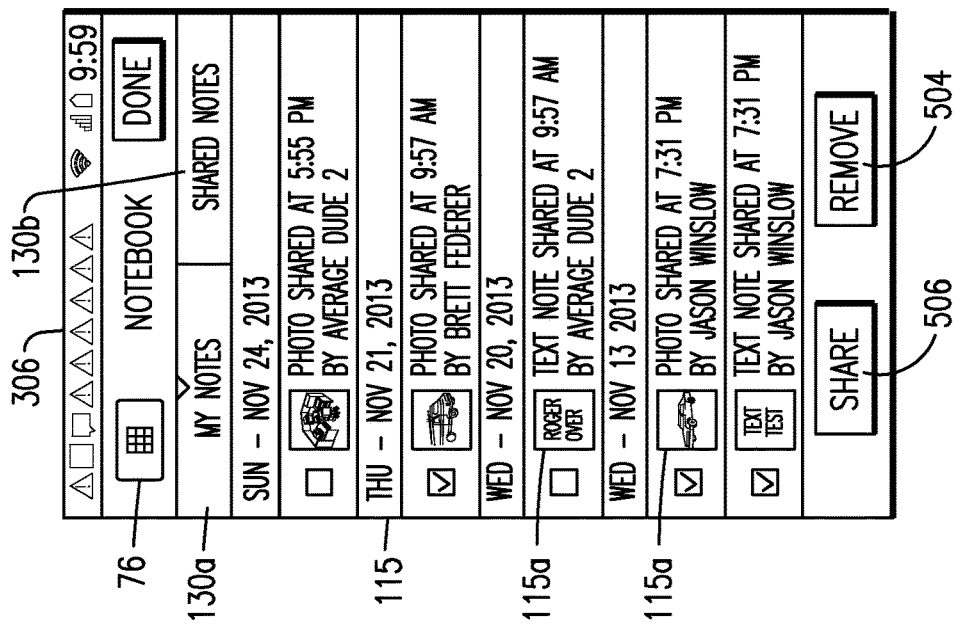

As illustrated in FIGS. 18A through 18C, both photo and text notes can be deleted in the My Notes folder 130*a* via DELETE button 502; and as Illustrated in FIGS. 18D through 18F, within the Shared Notes folder 130*b*, photo and text notes can be removed via a REMOVE button 504. Because removal of note data only has the effect of removing access for viewing by the user performing the removal, the same note data can be re-shared with the viewing user who has selected the remove option. Shared text note data cannot be edited by the viewing user. Both user owned notes and shared notes may be deleted individually or multiple listings can be deleted simultaneously using the batch option accessed with the batch button 134*b* shown in the screen views of FIGS. 16C and 16D, indicated by three overlapping rectangles. Individual files are selectable for individual or batch deletion or removal by inserting check marks on appropriate screens as shown for the screens 300 and 306 of FIGS. 18A and 18D. Deletion of individual or multiple listings is processed by pressing the Delete button 502 and removal of listings is effected by pressing the Remove button 504. FIG. 10 illustrates options for deleting as well as sharing data in both folders 130*a* and 130*b*.

Figures 18I, 18J:
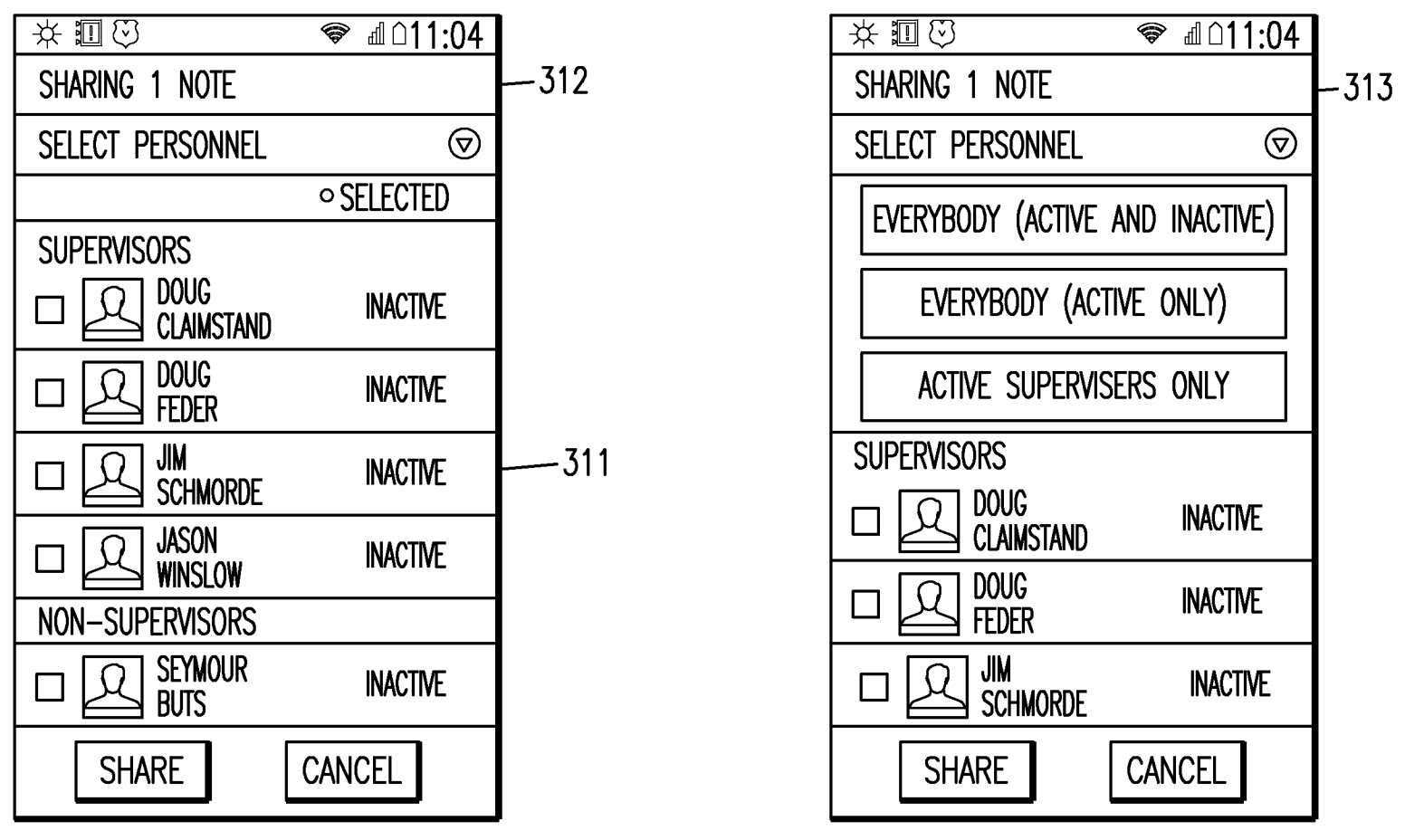

FIGS. 16C and 16D also illustrate note sharing options within the notebook viewer application 114*a* from both folders 130*a* and 130*b*. The shared note data may be shared for individual files in the line item listing 115 by using the SHARE button 506. Groups of note files can be shared simultaneously using the batch button 134*b*. Individual files are selected with check marks as shown in FIGS. 18A and 18B to create a group of selected files for the batch operation. With reference to FIGS. 18G through 18J, once information to be shared is selected, the user selects persons to share the information with as shown in the sharing list view screens 313. With reference to FIG. 18H, persons are selected from a list view of all users 311 who are in the list of individuals in the organization. If other officers are logged into the Situational Awareness system and are actively position polling, they would have an ACTIVE status in the list, while officers not logged into the SWARM system 10 are designated INACTIVE. FIGS. 18H, 18I and 18J illustrate INACTIVE users in the list. In an alternate embodiment of the system 10, users 18 (e.g., school security responders) are either logged into the system, or a different set of user conditions are provided, as the requirement to define the ACTIVE status. The user can select one or several individuals from the list view as recipients of a selected note or, as shown in the sharing list view screen 313, that user may deploy an option to immediately send the selected information to a particular group of other users, e.g. all faculty 18-2 or security 18-4.

Figure 19:
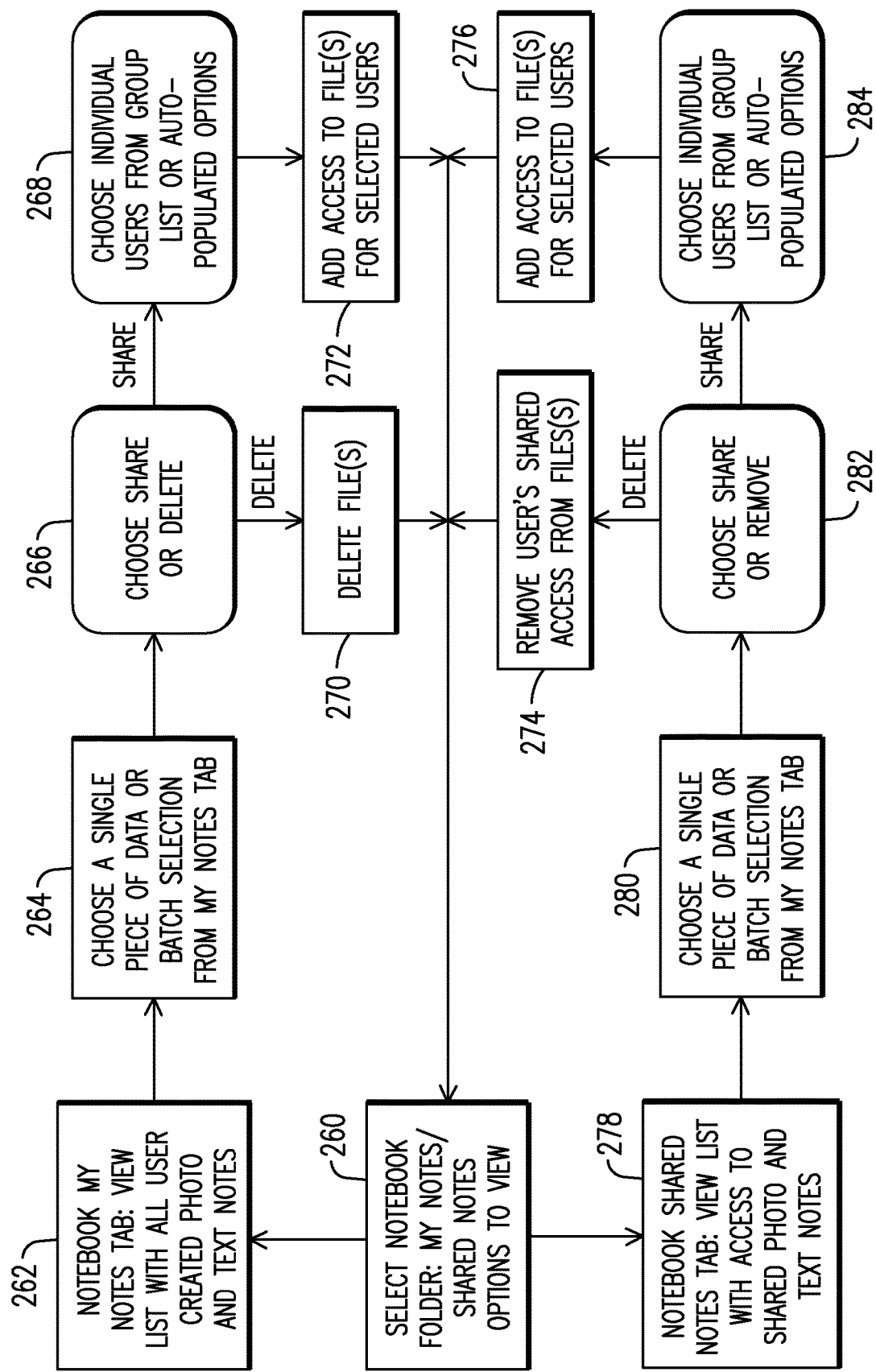
FIG. 19 illustrates a process of note sharing and note deletion.

Referring to FIG. 19, when the sharing REST service request is received at the server from the sharing client 12, the server 14 allows access to the note(s) by other clients 12 based on the corresponding list of users 18 identified by the sharing client (FIG. 18J) and sends a notification to all selected users from the list to be allowed access. In one embodiment this notification to all the clients is effected by sending a notification request to one or more third party providers having access to standard messaging services on the specific client devices (e.g., smartphone) based on the particular OS running on the client, e.g., for an Android, Amazon or Apple product. Each third party service delivers the notification to the phones that shared notes are available with a message created by the situational awareness system which also states the number of unread messages. The SWARM Mobile application 15 also updates the number of unread shared notes displayed on the home page screen 52.

FIGS. 18G and 18H illustrate a SWARM notification external to the application. When a file has been shared with another client, a notebook icon 142 is displayed in the task bar at the top of the smartphone screen of the client 12 having received the file. This indicates to the recipient user that a new file has been added to the Shared Notes folder 130*b* in that client device. Accessing the standard notification list on the smartphone will display the shared note notification, along with any other general smartphone notifications that exist. Selecting the notebook icon 142 displays the Shared Notes folder within the SWARM Mobile application 15.

As shown in FIG. 14C, the home page screen 52 of the SWARM Mobile application 15 displays a touch screen-enabled auto-share button 128 located in the lower right hand corner of the screen by which a user 18 can automatically share created notes to a preselected set of other users 18 (e.g., security 18-4) every time a text or photo note is created. This eliminates a set of steps (e.g., key strokes) which may be beneficial when encountering a threat or requiring quick reaction times.

SWARM Information Manager Application

FIGS. 20A through 20D illustrate the SWARM Information Manager application 30 which actively manages information that a first user 18 has created as well as information being shared with the first user by other users within the organization. The application 30 is used for both real time requirements, e.g. in a command center for managing an ongoing operation, or for after action reports and analysis of data. The application 30 (*i*) analyzes existing data, including timelines and spatial relationships on a map, (*ii*) shares any critical data in the user's database with other users in the organization, (*iii*) creates and downloads information in either raw format (text files or standard photograph output formats such as jpg) or using standard report templates available in the application, and (*iv*) adds information to existing entries for clarification or accuracy.

The SWARM Information Manager application 162 provides the user 18 with two basic screen views of notes 162 to analyze existing information: a Tile view 164 and a Map view 166. The tile view 164 contains individual thumbnails 170 of all text data 110*t* and photo note data 110*p*. The thumbnails 170 are displayed in chronological groups, similar to how data would appear in a handwritten logbook. The files may be searched by date selection, i.e., by choosing the desired day or date on a calendar 172 on the left hand side of the appropriate application screen. See, for example, the screen 330 shown in FIG. 20C for the MY NOTES folder. The user 18 can also choose to delete, share or download photo and text note data with button selections 176*a*, 176*b*, 176*c* located at the bottom of each thumbnail 170. Touch screen contact made with individual thumbnails 170 displays more detailed information such as an enlarged photograph or text note data, location of the information when recorded, and several time metadata tags for accuracy.

Three different time stamps are collected to ensure the note accuracy: (i) the time when a record is made on the mobile client (e.g., a written note or a photograph), (ii) the time recorded when the information is uploaded to the server 14 and (iii) the time when each location is acquired. By using all three types of time stamps, further understanding and improvement in the accounting of events becomes possible. This removes practically all doubt about whether the information was tampered with or was not in evidentiary control. The complete list of metadata is displayed for each note 162. An exemplary list may comprise all of the following: Capture Date, Capture Time, Upload Time, Mobile Device MEI Number, Officer Name, Badge Number, Latitude and Longitude, GPS accuracy, GPS capture time, Time Difference between photograph capture and GPS capture, Azimuth of mobile device, Pitch of mobile device and Roll of mobile device. Additional metadata may be included, e.g., altitude, temperature, acceleration, pressure and weather conditions.

Figure 20B:
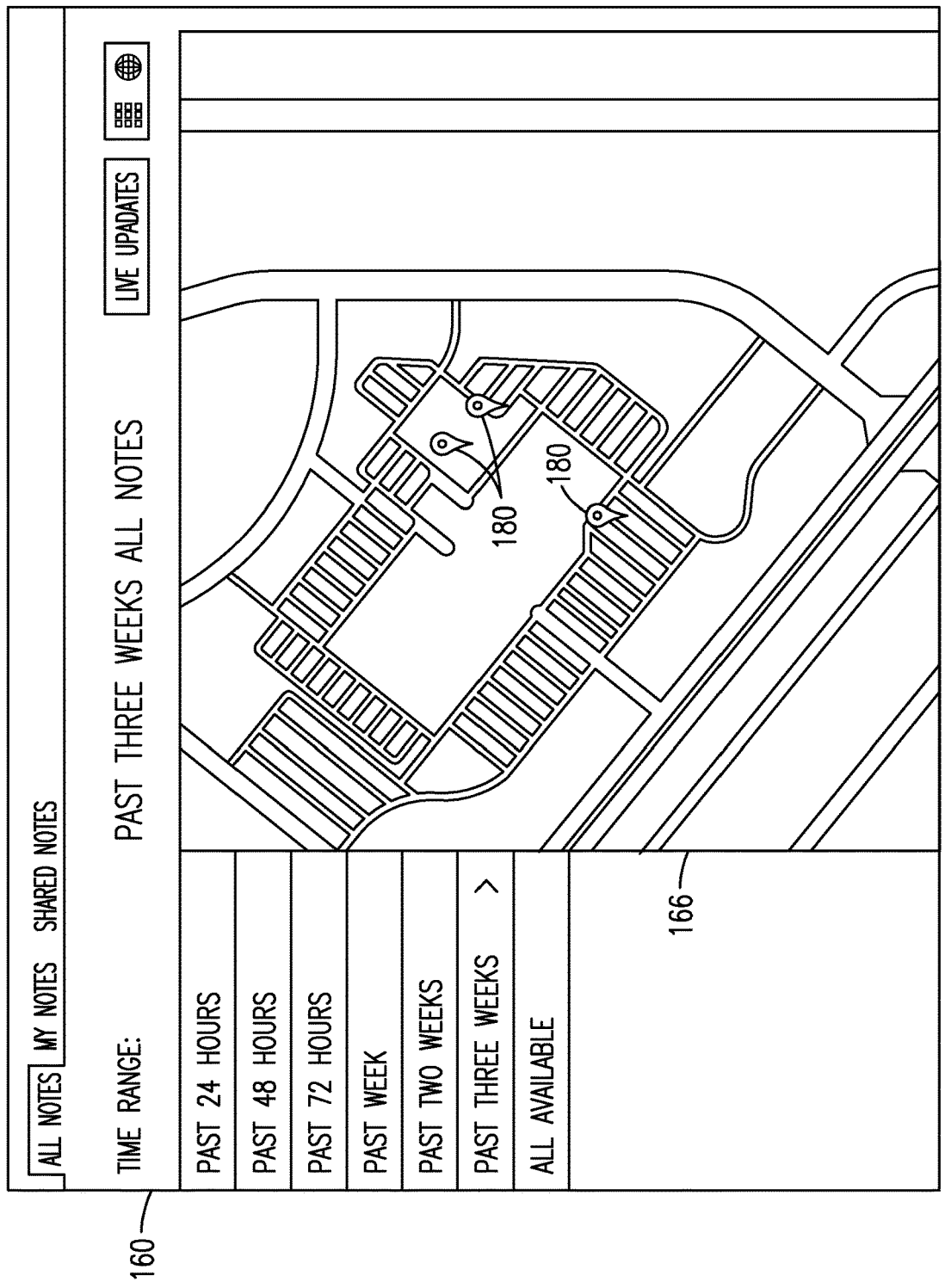
Figure 20C:
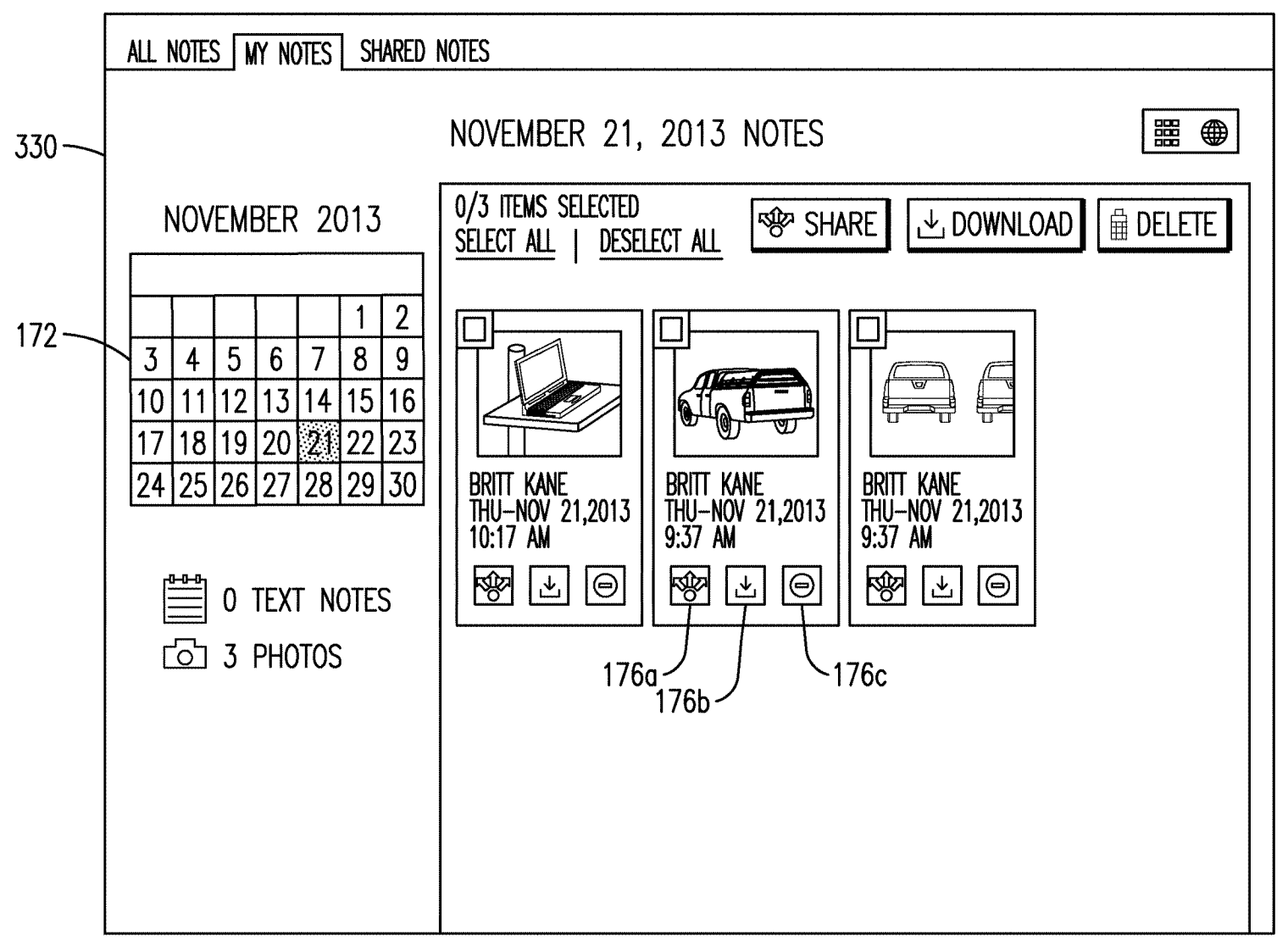

The Map view 166 of the SWARM Information Manager application 30 shown in FIG. 20B displays all data collected for a particular day with pins 180 placed on a map 182 or satellite view. Using the map view, the user 18 can analyze the spatial relationship of displayed information. Clicking on an individual pin 180 on the map 182 displays the individual thumbnail 170 of that particular photo or text note. Although not illustrated, the system 10 includes two additional views: a List view and a Timeline view. The List view provides a simplified, line-by-line, chronologically accurate list of photo note data and text note data similar to the notebook view within the SWARM Mobile application 15. The Timeline View provides a different visualization of the chronology of events by showing a time axis with notes attached along that axis.

Figure 20D:
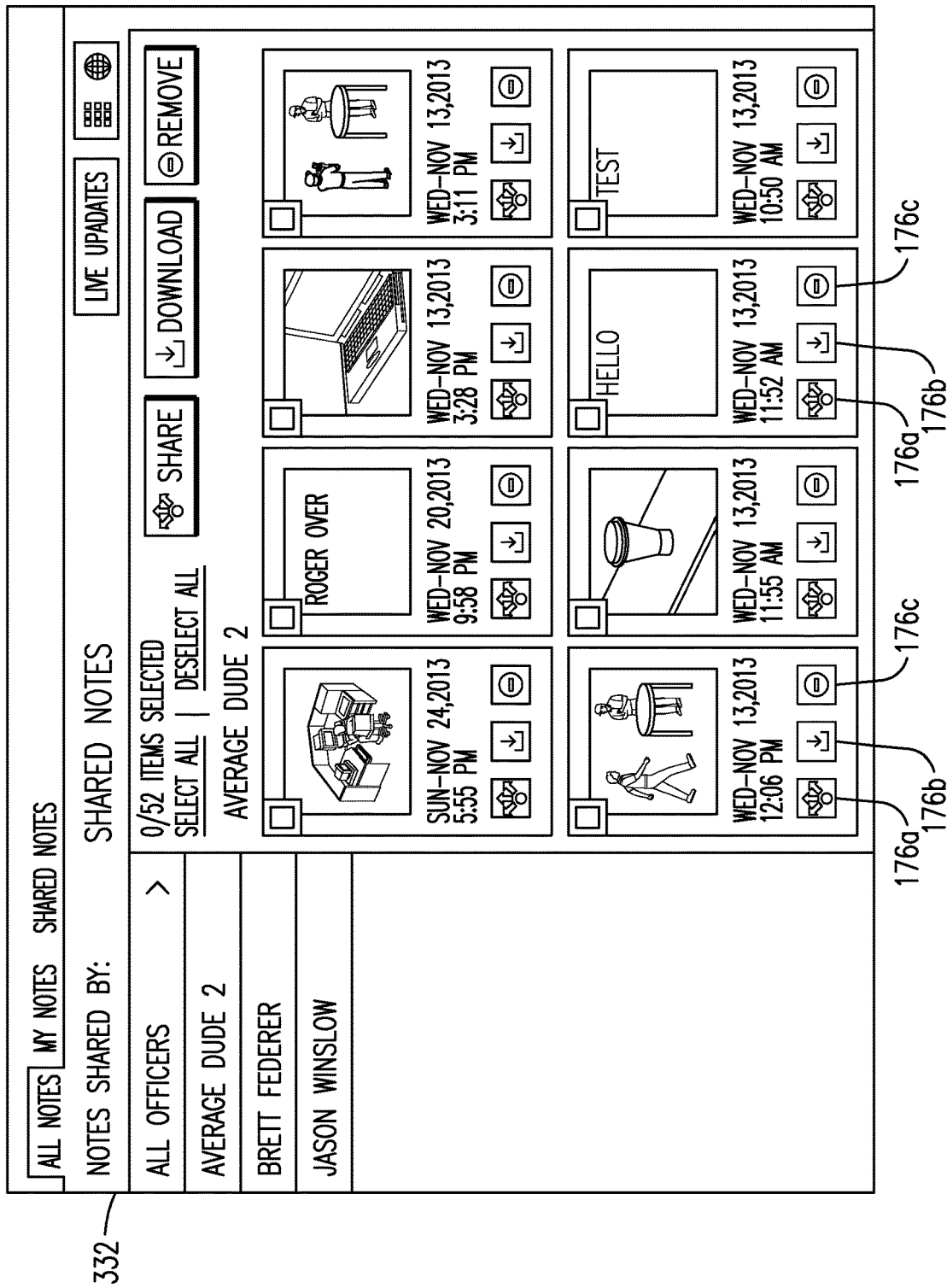

With features of the SWARM Information Manager 30, as illustrated in FIGS. 20A, 20B, 20C AND 20D, the user also has access to three folders: (i) the All Notes folder, which contains notes created by the user and shared with other users, (ii) the My Notes folder which only contains notes created by the user and (iii) the Shared Notes folder which contains notes only shared by other users. The same Tile views and Map views shown in FIGS. 20A and 20B are provided in all three folders as well. In the All Notes folder a real time information selection is also available. By enabling this selection, the user does not have to refresh the browser manually to view any notes which are created or shared. This automated capability provides a real time operational feed of information from all individuals within the organization. As illustrated in FIG. 20D, the user can select to see all shared notes from all users or only shared notes from a particular user within the Shared Notes folder.

All note data can be downloaded to a desktop or laptop either individually file by file or by using a batch process which is initiated by pressing the small box in the upper left hand corner for each note. All photo and text note data, including the associated metadata for each file will be downloaded. FIG. 21 illustrates an automated report template 200 that can be obtained from the SWARM Information Manager 30. The report template 200 is formatted to display photo data, a map with a pin 180 of the location where the photograph was captured and the associated metadata. For photo note data, the user 18 may also add a title and additional written information which are added to the report on a second page. FIG. 21 also illustrates how data initiated from a client 12 can be obtained as a printed output for reports, evidence documentation or other requirements. An embodiment of the system is an automated collation of several notes with a similar report template 200 into a single report output.

With reference to FIG. 22, the user may also share notes from the SWARM Information Manager 30 with similar functionality as described for the SWARM Mobile application 15. A user 18 first decides to share an individual file of note data or multiple files of data via a batch selection. Then the user decides on the group of viewers that will receive access to the note.

Accuracy and chain of custody of information may be vital to the organization which the SWARM system 10 supports, to relevant law enforcement operations and possibly for prosecution of criminal actions. The SWARM system 10 provides a highly automated and integrated approach to generate and preserve relevant data. By using the combination of the SWARM Mobile application on a mobile client 12 to collect information and the SWARM Information Manager application 30 to analyze data and create concise reports, the users (e.g., school administrators, security and law enforcement officials and supervisors) maintain secure control of field intelligence. The web based application 30 can be used within a vehicle or at the office with a suitably larger screen in an environment in which personnel can attend to the collected data with less distraction.

The ability to create a highly accurate accounting of events with the situational awareness system 10 (e.g., by automating data retention processes, by minimizing the handling of data and controlling access to data) improves credibility of the evidence. The situational awareness system 10 also provides enhanced details to records, e.g., multiple time stamps, date stamps, greater location information, data describing the orientation of a smartphone, etc., while improving efficiencies with which ever greater amounts of useful information are generated, recorded and authenticated. The situational awareness system 10 also minimizes or removes doubt regarding credibility and accuracy of events and it reduces the time spent preparing information for prosecuting attorneys and court appearances. Improved accuracy made available with the response system 50, coupling the system 10 to a law enforcement situational awareness system also facilitates decisions on whether criminal cases should be brought. When cases are brought, the data generated through each situational awareness system improves the credibility of evidence acquired and later used in legal proceedings.

Often routine procedures and coordinated operations, e.g. school fights, student and faculty injuries, etc. require creation of post-action reports. Post action reports often require time consuming efforts to collect data from each of the participating responding individuals, and amalgamate the data. Also, in the past, much of the data has been retrieved from personal memories. The SWARM system 10 enables rapid access and assimilation of credible and pertinent data. The preserved data records include time-dated field notes relied upon when personnel are preparing detailed incident reports. Since these reports could be generated hours after the incident, the auto-generated data can be especially useful when constructing detailed time lines of key events and when using GPS location information to track movements.

The SWARM system enables unparalleled improvement in accuracy over conventional school security operations. With the SWARM system, the inefficient use of voice communications can be limited to emergency communications while data transfer with the SWARM system avoids significant errors (e.g., error in location information) descriptions. The ability to write time-dated text notes of actions and to record time-dated photographs of events within SWARM Mobile allows the school security guards to more efficiently and precisely record important details of an emergency. With automated integration of time/date and GPS functions into the data collection process (via the SWARM Mobile application 15), the need to manually write down or remember critical ancillary details associated with written notes is eliminated (e.g., time, date, location or compass orientation). The SWARM system 10 elevates this information to a business record status, improves credibility of the information and removes the possibility that recordation of this information may be overlooked. Automatic recording of this information, using a combination of phones utilities and on board sensors, increases the value of the acquired information and, hence, the demand for such information. Other information which an officer can record with the SWARM system includes temperature and acceleration data.

Advantageously, the SWARM system can utilize smart phones on existing commercial cellular networks and deploy the mobile applications 13, 15 on those devices. The system deploys web applications into existing IT infrastructure and operates with most advanced web browsers on desktops, MDTs and laptop or tablet computers. Communication can be encrypted, e.g., using advanced TLP/SSL. A secure remote cloud based server can perform all complex SWARM system computing tasks and house the database. A firewall appliance can be networked in front of the server 14 for added security. The system can be deployed on internal IT hardware of a public safety organization or institution such as a school system.

The claimed invention is:

1. A communications system which communicates information relevant to an emergency or alarm situation to one or more members in a group of users, comprising:

a first computer system having a first processor, memory and storage for a data base, the first computer system connectable over a network to a first plurality of first hand-held devices where, during connection, each first hand-held device is assigned to a person having an association with a first organization, the first computer system selectively connectable for communication with each of the hand-held devices in a first client-server relationship;

a first non-transitory computer readable medium having first computer instructions stored thereon for execution on one or more of the hand-held devices to implement a method of providing information from a first device in the first plurality of first hand-held devices over a shared network to the first computer system, information descriptive of urgency or danger level in an emergency or other alarm situation where, utilizing services software running on the first computer system, the first processor processes service requests from one of the first hand-held devices in a manner that delivers via a display on a hand-held device information descriptive of urgency or danger level to enable response by a person in a second organization distinct and different from the first organization via a second client-server relationship;

a second non-transitory computer readable medium, where the services software includes second computer instructions stored thereon to implement with the first processor of the first computer system a method of communicating information descriptive of urgency or danger level from the first computer system over the network to one or more devices in a second plurality of the first hand-held devices, each device in the second plurality of the first hand-held devices assigned to a person having an association with the first organization; and a third non-transitory computer readable medium having third computer instructions stored thereon to implement with a processor, in a computer system
  (a) having memory and storage for a data base and connectable over a network to a third plurality of second hand-held devices, each of the second hand-held devices assigned to a person having an association with the second organization, and
  (b) selectively connectable for communication with each of the second hand-held devices in the second client-server relationship:

a method of communicating information descriptive of urgency or danger level, with the third computer instructions from over the network, to one or more devices in the third plurality of the second hand-held devices, each device in the third plurality of the second hand-held devices assigned to a person having an association with the second organization separate and distinct from the first organization.

2. The communications system of claim 1 further comprising a second computer system comprising a second processor, second memory and second storage and, when executed, the second computer instructions are executed on the second processor associated with the second computer system to implement the method which communicates information descriptive of the emergency or alarm situation.

3. The system of claim 1, wherein the computer instructions of the third non-transitory computer readable medium enable communication of the information descriptive of urgency or danger level to devices assigned to persons in a law enforcement organization separate and distinct from the first organization.

4. The system of claim 1 wherein:
  the computer instructions of the first non-transitory computer readable medium also enable providing location information over the shared network, from the first device in the first plurality of first handheld devices over the shared network to the first computer system; and
  the computer instructions of the second non-transitory computer readable medium also enable communication of the location information over the network from the first computer system to the one or more of the devices in the second plurality of hand-held devices.

5. The system of claim 4 wherein:
  the computer instructions of the first non-transitory computer readable medium also enable providing texts or photographs over the shared network, from the first device in the first plurality of first handheld devices to the first computer system; and
  the computer instructions of the second non-transitory computer readable medium also enable communication of texts or photographs over the network from the first computer system to the one or more of the devices in the second plurality of hand-held devices.

6. The system of claim 5 wherein the instructions of the first non-transitory computer readable medium implement the method of providing the information descriptive of urgency or danger level by enabling a selection from among multiple levels of threat or danger displayable on a screen of the first device.

7. The system of claim 6 wherein the instructions of the first non-transitory computer readable medium implement the method of providing the information descriptive of urgency or danger level by enabling a selection from among colors displayable on the screen of the first device, each color associated with a different level of threat or danger.

8. The system of claim 6 wherein the instructions of the first non-transitory computer readable medium implement the method of providing the information descriptive of urgency or danger level by enabling a selection from among icons differing in appearance and displayable on the screen of the first device, each icon associated with a different level of threat or danger.

9. The communications system of claim 1 where the second non-transitory computer readable medium and the third non-transitory computer readable medium are both portions of computer readable media associated with the first processor of the first computer system or the third non-transitory computer readable medium is associated with a second processor in a second computer system separate and distinct from the first computer system.

10. The system of claim 1 wherein the instructions of the first non-transitory computer readable medium implement the method of providing the information descriptive of urgency or danger level by providing sensor information registered on the first device.

11. The system of claim 1 wherein the instructions of the first non-transitory computer readable medium implement the method of providing the information descriptive of urgency or danger level by providing loudness of gunshots as registered on the first device.

12. A communications system which communicates information relevant to an emergency or alarm situation to one or more members in a group of users, comprising:
  a computer system having a first processor, memory and storage for a data base, the computer system connectable over a network to a first plurality of first hand-held devices, each first hand-held device assigned to a person having an association with a first organization, the computer system selectively connectable for communication with each of the first hand-held devices in a client-server relationship; and
  a first non-transitory computer readable medium having computer instructions stored thereon for execution on one or more of the first hand-held devices to implement a method of providing information from a first device in the first plurality of first hand-held devices over the network to the computer system, the information descriptive of urgency or danger level in an emergency or other alarm situation, the communications system further including a second non-transitory computer readable medium having computer instructions stored thereon, to implement with the first processor of the computer system a method of communicating the information descriptive of urgency or danger level from the computer system over the network to one or more devices in a second plurality of second hand-held devices, each device in the second plurality of second hand-held devices assigned to a person having an association with the first organization or assigned to a person having an association with a second organization, wherein:

the computer instructions of the first non-transitory computer readable medium also enable providing location information over the network, from the first device in the first plurality of first hand-held devices over the network to the computer system; and the computer instructions of the second non-transitory computer readable medium also enable communication of the location information over the network from the computer system to the one or more of the devices in the second plurality of second hand-held devices;

the computer instructions of the first non-transitory computer readable medium also enable providing texts or photographs over the network, from the first device in the first plurality of first handheld devices to the computer system;

the computer instructions of the second non-transitory computer readable medium also enable communication of texts or photographs over the network from the computer system to the one or more of the devices in the second plurality of second hand-held devices;

the instructions of the first non-transitory computer readable medium implement the method of providing the information descriptive of urgency or danger level by enabling a selection from among multiple levels of threat or danger displayable on a screen of the first device in the first plurality of first hand-held devices; and the instructions of the first non-transitory computer readable medium implement the method of providing the information descriptive of urgency or danger level by enabling a selection from among colors displayable on the screen of the first device in the first plurality of first hand-held devices, each color indicating a different level of sensing of a fire, one color corresponding to sensing of smoke and another color corresponding to seeing fire.

\* \* \* \* \*